US012505192B2

(12) United States Patent
Lal et al.

(10) Patent No.: US 12,505,192 B2
(45) Date of Patent: Dec. 23, 2025

(54) SYSTEMS AND METHODS FOR GESTURE-BASED VERIFICATION

(71) Applicant: Adeia Guides Inc., San Jose, CA (US)

(72) Inventors: Dhananjay Lal, Englewood, CO (US); Aldis Sipolins, Somerville, MA (US); Mathew Adams, Matthews, NC (US)

(73) Assignee: Adeia Guides Inc., San Jose, CA (US)

( * ) Notice: Subject to any disclaimer, the term of this patent is extended or adjusted under 35 U.S.C. 154(b) by 62 days.

(21) Appl. No.: 18/602,615

(22) Filed: Mar. 12, 2024

(65) Prior Publication Data

US 2025/0291886 A1 Sep. 18, 2025

(51) Int. Cl.

*G06F 21/32* (2013.01)
*G06V 10/774* (2022.01)
*G06V 40/20* (2022.01)

(52) U.S. Cl.

CPC ............ *G06F 21/32* (2013.01); *G06V 10/774* (2022.01); *G06V 40/20* (2022.01); *G06F 2221/2133* (2013.01)

(58) Field of Classification Search

CPC ............ G06F 21/32; G06F 2221/2133; G06V 40/2006
USPC ............ 726/17
See application file for complete search history.

(56) References Cited

U.S. PATENT DOCUMENTS

| | | | | |
|---|---|---|---|---|
| 7,986,816 | B1 * | 7/2011 | Hoanca | G06V 40/18 382/280 |
| 8,970,348 | B1 * | 3/2015 | Evans | G06F 21/32 340/5.83 |
| 9,619,723 | B1 * | 4/2017 | Chow | G06V 40/45 |
| 10,360,464 | B1 * | 7/2019 | McKay | G06V 40/172 |
| 10,986,087 | B2 | 4/2021 | Watson et al. | |
| 11,122,078 | B1 * | 9/2021 | Streit | H04L 63/1466 |
| 11,502,841 | B2 * | 11/2022 | Streit | G06N 3/044 |
| 11,521,326 | B2 * | 12/2022 | Leroyer | G06T 7/97 |

(Continued)

FOREIGN PATENT DOCUMENTS

| | | | | |
|---|---|---|---|---|
| CN | 105993022 A * | 10/2016 | | G06F 21/32 |
| KR | 10-2593934 B1 | 10/2023 | | |

(Continued)

OTHER PUBLICATIONS

U.S. Appl. No. 18/602,608, filed Mar. 12, 2024, Dhananjay Lal.

(Continued)

*Primary Examiner* — Tauqir Hussain
(74) *Attorney, Agent, or Firm* — HALEY GUILIANO LLP

(57) ABSTRACT

Systems and methods are provided for gesture-based verification of a user. A method includes receiving a request for verifying a user for an application, prompting the user to perform a series of gestures, capturing a data indicative of the user performing the series of gestures, and accessing a plurality of sets of weights, wherein each respective set of weights corresponds to a respective gesture of the series of gestures. The method includes configuring a gesture recognition model multiple times, each time of the multiple times corresponding to a respective set of the multiple sets of weights, where each set of weights corresponds to a gesture of the series of gestures. In response to recognizing all the gestures of the series of gestures, the method includes causing the application to provide access to at least one resource of the application based on the verifying the user.

19 Claims, 24 Drawing Sheets

(56) References Cited

U.S. PATENT DOCUMENTS

| | | | | |
|---|---|---|---|---|
| 11,936,787 | B2 * | 3/2024 | Keith, Jr. | G06F 21/32 |
| 12,130,900 | B2 * | 10/2024 | Tussy | H04W 12/06 |
| 12,210,603 | B2 * | 1/2025 | Deng | G06V 40/28 |
| 12,216,754 | B2 * | 2/2025 | Lee | G10L 17/24 |
| 12,262,111 | B2 * | 3/2025 | Dellinger | H04N 23/617 |
| 2010/0158327 | A1 * | 6/2010 | Kangas | G06F 21/32 382/124 |
| 2011/0282785 | A1 * | 11/2011 | Chin | G06Q 20/108 705/42 |
| 2017/0318019 | A1 * | 11/2017 | Gordon | G06V 40/67 |
| 2019/0095681 | A1 * | 3/2019 | Lee | H04N 23/60 |
| 2020/0028843 | A1 * | 1/2020 | Watson | G06F 3/011 |
| 2020/0065569 | A1 * | 2/2020 | Nduka | G10L 13/02 |
| 2020/0066071 | A1 * | 2/2020 | Budman | H04L 63/08 |
| 2020/0410078 | A1 * | 12/2020 | Jones | G06V 40/172 |
| 2021/0173914 | A1 | 6/2021 | Keith, Jr. | |
| 2021/0201911 | A1 * | 7/2021 | Syrdal | G06F 21/32 |
| 2021/0374221 | A1 * | 12/2021 | Markhasin | G06V 40/70 |
| 2024/0045942 | A1 * | 2/2024 | Lal | G06F 21/36 |

FOREIGN PATENT DOCUMENTS

| | | | | |
|---|---|---|---|---|
| WO | WO-2018090251 | A1 * | 5/2018 | G06V 40/10 |
| WO | WO-2021074032 | A1 * | 4/2021 | G06F 18/214 |

OTHER PUBLICATIONS

Chen et al., "MFA-Net: Motion Feature Augmented Network for Dynamic Hand Gesture Recognition from Skeletal Data", Sensors, vol. 19, No. 2, Jan. 10, 2019, pp. 1-16.
"CAPTCHA: Telling Humans and Computers Apart Automatically," http://www.captcha.net pp. 1-4.
"What is a botnet attack and how does it work?," https://datadome.co/learning-center/what-is-botnet-how-does-botnet-attack-work/ pp. 1-17 (2022).
"Qualcomm Unveils Snapdragon AR2 Platform". In XR Today. https://www.xrtoday.com/augmented-reality/qualcomm-unveils-snapdragon-ar2-platform/ (2022).
"Trusted Execution Environment (TEE) 101: A Primer", Secure Technology Alliance Whitepaper, https://www.securetechalliance.org/wp-content/uploads/TEE-101-White-Paper-FINAL2-April-2018.pdf (2018).
"Understanding the Three Factors of Authentication", Pearson. https://www.pearsonitcertification.com/articles/article.aspx?p=1718488 (2011).
Ahn et al., "Telling Humans and Computers Apart Automatically," Communications of the ACM, 47(2):57-60 (2004).
Arkose Labs, "Two-Factor Authentication Doesn't Replace CAPTCHA," Medium pp. 1-7 (2015).
GlobalPlatform Technology, TEE System Architecture, Version 1.2, https://globalplatform.org/wp-content/uploads/2017/01/GPD_TEE_SystemArch_v1.2_PublicRelease.pdf (2018).
GlobalPlatform Technology, TEE System Architecture, Version 1.2, https://globalplatform.org/wp-content/uploads/2017/01/GPD_TEE_SystemArch_v1.2_PublicRelease.pdf (2018) pp. 1-9.
Kim et al., "Experience based domestic environment and user adaptive cleaning algorithm of a robot cleaner," 11th International Conference on IEEE Ubiquitous Robots and Ambient Intelligence (URAI), pp. 176-178 (2014) (Abstract only).
Li et al., "Biometric recognition via texture features of eye movement trajectories in a visual searching task," PLOS One https://www.mdpi.com/1424-8220/22/8/3002 pp. 1-24 (2018).
Ma et al., "Integrating Gaze Tracking and Head-Motion Prediction for Mobile Device Authentication: A Proof of Concept," Sensors, 18:1-18 (2018).
Nair et al., "Unique Identification of 50,000+ Virtual Reality Users from Head & Hand Motion Data," In Proceedings of the 32nd USENIX Conference on Security Symposium 'SEC '23). USENIX Association, USA, Article 51, 895-910 (2023).
Parisi, "The Seven Rules of the Metaverse," Medium.com https://medium.com/meta-verses/the-seven-rules-of-the-metaverse-7d4e06fa864c pp. 1-23 (2023_.
Pei et al., "Trusted Execution Environment Provisioning (TEEP) Architecture", draft-ietf-teep-architecture-16, https://www.ietf.org/archive/id/draft-ietf-teep-architecture-16.html (2022).
Pino, "This new VR headset packs tracks your heart rate and pupil dilation". In Techradar.com. https://www.techradar.com/news/this-new-vr-headset-packs-tracks-your-heart-rate-and-pupil-dilation (2021).
Shakir, "Apple's Vision Pro headset uses iris scanning for logins with Optic ID". In The Verge. https://www.theverge.com/2023/6/5/23750147/apple-optic-id-vision-pro-iris-biometrics.
Simhi et al., "Dissociating gait from static appearance: A virtual study of the role of dynamic identity signatures in person recognition," ScienceDirect Cognition, vol. 205 (2020) (Abstract only).
Sir Tim Berners, "History of the Web," https://webfoundation.org/about/vision/history-of-the-web/ pp. 1-8 (2009).
Sivasamy et al., "VRCAuth: Continuous Authentication of Users in Virtual Reality Environment Using Head-Movement," 5th International Conference on Communication and Electronics Systems (ICCES), pp. 518-523, (2020) (Abstract only).
Skrzypczyk et al., "Surface covering algorithms for semiautonomous vacuum cleaner". In ACMOS 10, pp. 294-298 (2010).
Tristianto, "The Death of Captcha: Is It Time to Say Goodbye?". In Medium.com. https://medium.com/mlearning-ai/the- death-of-captcha-is-it-time-to-say-goodbye-36f8afc69b68 (2022).
Tschofenig et al., Trusted Execution Environment Provisioning (TEEP) Protocol, draft-ietf-teep-protocol-18, https://datatracker.ietf.org/doc/draft-ietf-teep-protocol/ (2023).
Yan et al., Using Pupil Light Reflex for Fast Biometric Authentication, In Proceedings of the ACM Turing Celebration Conference—China (ACM TURC '20), pp. 139-143. https://doi.org/10.1145/3393527.3393551 (2020).
Yin et al., "An Effective Gaze-Based Authentication Method with the Spatiotemporal Feature of Eye Movement," Sensors,22(8):3002, pp. 1-18 https://www.mdpi.com/1424-8220/22/8/3002 (2022).

* cited by examiner

302

[CAPTCHA image: Td4e Va]

Type the characters above:

[input field] Go okta (a) Reading Text from an Image

304 reCAPTCHA V2

☐ I'm not a robot | reCAPTCHA V2 Privacy - Terms

Invisible reCAPTCHA

Protected by reCAPTCHA Privacy Terms (b) Invisible reCaptcha

SYSTEMS AND METHODS FOR GESTURE-BASED VERIFICATION

BACKGROUND

This disclosure is directed to systems and methods for providing enhanced security to users, applications, providers, or any combination thereof in digital 3D spaces (e.g., virtual reality, augmented reality, extended reality, other related 3D spaces, or any combination thereof).

SUMMARY

Software applications (e.g., executing on a user device) are regularly subjected to attacks by malicious entities (e.g., bots, hackers, identity thieves, and other actors with malicious intent). In illustrative scenarios, such malicious entities may attempt to access a software application that they are not authorized to access (e.g., a bot attempting to access an application that is only intended for use by humans). For example, such malicious entities may attempt to access a personalized environment within a software application that they are not authorized to access (e.g., a hacker attempting to penetrate a database, or an identity thief attempting to steal a different person's information). Moreover, malicious entities may attempt to otherwise access protected data or computer infrastructures that they are not authorized to access. In some approaches, to safeguard against the threats posed by these malicious entities and their potential unauthorized access into various devices, databases, computer environments, and software infrastructures, various verification methods are implemented to protect against negative consequences including loss of property and dismantling of existing systems. For example, many different Completely Automated Public Turing Test to Tell Computers and Humans Apart (CAPTCHA) challenges may be used to distinguish bots (e.g., computers programmed to execute human-like tasks) from human users. In other examples, many different multi-factor authentication (MFA) challenges may be used to distinguish unauthorized users (e.g., hackers or identity thieves masquerading as authorized users) from authorized users.

Verification challenges and systems (e.g., CAPTCHA, MFA, systems for generating or inputting a password, and other suitable verification challenges and systems) face challenges in balancing between security and user-friendliness of their system interfaces. For example, if a verification challenge is too difficult, then authorized users may struggle to successfully complete the verification challenge, thus rendering the system either entirely unusable or unusable until administrative action is taken (e.g., the account may be manually unblocked). In another example, if a verification challenge is too easy, then unauthorized users may be able to succeed in their malicious intents and compromise the system, leading to negative consequences for the system including loss of data, ransomware attacks, or waste of computing resources (e.g., excess utilization of processor time, bandwidth, memory, API calls, or any combination thereof) in response to requests from devices that are not authorized to use those resources. Similarly, while a system may repeatedly use a given verification challenge (or variations thereof) to improve its user-friendliness (e.g., because authorized human users may become accustomed to successfully completing the challenge), such repeated use will also reduce the system's security by affording malicious entities time and opportunities to break the challenge and breach the corresponding security protocols. It is expected that systems will increasingly struggle to navigate this trade-off between security and user-friendliness when implementing verification challenges for use in augmented reality (AR), virtual reality (VR), extended reality (XR), and related software applications (e.g., as are accessed by sensor-rich devices including one or more types of immersive headsets, cameras, biometric sensors, haptic sensors, other suitable sensors, or any combination thereof). For example, the many degrees of freedom offered by a sensor-rich device may complicate the system's implementation of secure and user-friendly verification challenges. Moreover, the many degrees of freedom offered by a three-dimensional (3D) environment may also complicate the system's implementation of secure and user-friendly verification challenges. As used herein, the term 3D (or 3D environment, or other variations of 3D) may refer to a digital environment that creates, operates within, or otherwise interacts with an XR, AR, VR, or related experience for the user.

Accordingly, to overcome such problems, systems and methods are disclosed herein for securely verifying a user while preventing unauthorized verifications (e.g., by unauthorized devices) and maintaining desirable user-friendliness of the system interface. The systems and methods disclosed herein may be configured to permit a user to access an application and/or a resource of the application (e.g., to log into an account, access restricted data or environments, confirm an identity, verify that the request is coming from a human, submit a password or other confidential information, execute other suitable authorization tasks, or any combination thereof). The methods may be performed at a verification server, at a user device, at an intermediate computing node, or any suitable combination thereof. In some approaches, to solve these problems of unauthorized verifications, the verification server may operate using the following techniques.

In some embodiments, the verification server initially receives a verification challenge request from an application executing on a user device. The application may be unsecured or may otherwise not incorporate any security measures beyond standard protocols. Thus, the verification server may rely on a secured application (e.g., which may be implemented directly by hardware, which may be hardcoded into firmware, which may have additional layers of software-based security, or which may otherwise incorporate added security protocols) executing at the user device for completion of the verification challenge. However, the secured application may not have network-based communication capabilities, such that the verification server relies on another application for communication of the verification challenge. In some embodiments, all such communications are encrypted to be inaccessible to the application, such that the overall security of the verification system is improved. In some embodiments, the user device includes or is connected to multiple sensors, and the verification challenge request may include data characterizing these multiple sensors (e.g., sensor types, specifications, capabilities, or other suitable sensor data).

In some implementations, based on the data characterizing the sensors of the user device, the verification server determines one or more verification challenges to execute on the user device. In some embodiments, the one or more verification challenges includes a CAPTCHA challenge, an MFA challenge, or both. For example, the verification server may determine the one or more verification challenges using a trained model that takes as inputs (i) the data characterizing the multiple sensors and (ii) a multitude of possible challenges, and then provides as outputs one or more verification challenges to issue.

In some embodiments, the verification server delivers (e.g., via a network) the one or more verification challenges to the user device. The verification server may encrypt the delivery for selective access, such that the delivery is available to a dedicated, bespoke, purpose-built, and/or trusted application (e.g., the secured application) executing on the user device, but other applications executing on the user device, including the application requesting the verification and any other applications that may be used to access sensors of the user device, may not decrypt or otherwise retrieve data representative of the one or more verification challenges. In some approaches, the verification server realizes selective access to the verification challenge data by configuring the delivery to be decrypted at the secured application executing on the user device. In some embodiments, the corresponding encryption scheme uses a symmetric key that is generated by the secured application or the verification server, encrypted by the secured application using a public key of the verification server, communicated to the verification server by the application requesting the verification, and decrypted by the verification server using a private key of the verification server.

In some embodiments, the verification server additionally delivers the one or more verification challenges such that, in response to decrypting the one or more verification challenges, the secured application locks at least one sensor of the user device, where the at least one locked sensor is required to complete (e.g., participate in the one or more verification challenges via data collection and optionally perform computations on the collected data, where the computations may include compression, filtering, determination of whether the challenge was successfully completed, other suitable computations, or any combination thereof) the one or more verification challenges. Because the at least one locked sensor is locked by the secured application, neither the application requesting the verification nor any other application on the device, unless approved or provided access by the secured application, may retrieve data from or otherwise communicate with the at least one sensor while the verification challenge is being completed.

In some implementations, the verification server additionally delivers the one or more verification challenges such that, in response to locking the one or more sensors, the secured application records data corresponding to the one or more verification challenges. The verification server may also cause the challenge data to be encrypted by the secured application and communicated to the verification server via the application.

In some approaches, the verification server determines, based on the data received from the secured application, whether the user is verified. The verification server may determine whether the user is verified by using a trained model that is trained on verified and unverified responses to the one or more verification challenges being applied, takes as an input the data received from the secured application, and provides as an output a binary indication of a successful or unsuccessful verification (e.g., with or without a confidence score). In some embodiments, the verification server shares the trained model with the secured application, in which case the secured application may execute, on behalf of the verification server, the process to determine whether the user is verified.

In some embodiments, in response to a successful verification, the verification server causes the user to access at least one resource of the application. For example, the verification server may cause the user to log into a protected environment of the application. In some embodiments, the verification server authorizes access to the user via communication to a server of the application (e.g., by providing or releasing access to a session token or other suitable temporary or permanent key).

In some implementations, the abovementioned techniques result in a verification system that solves the security and ease of access problems described above. In some embodiments, the verification server requires that the verification challenge request includes data characterizing multiple sensors of the user device. Thus, the verification system assigns particular verification challenges that are suitable to a particular device based on its sensing and computation capabilities and that are effective for verifying or authenticating the user, are effective for preventing access of an unverified or unauthenticated user, and utilize at least one sensor available to the device. As a result, a malicious actor would have to be prepared to spoof many possible verification challenges involving several possible sensors and/or tasks, which significantly complicates unauthorized access attempts.

Furthermore, in some embodiments, the verification system protects the data of the verification challenge through encryption with a key that is only available to a secured application (and not to an application that requests the verification or to any other application). As described above and below, the application (in contrast to the secured application) may refer to any application that requests a verification or any application other than the secured application. Thus, even if the application was compromised by a malicious actor, the verification system still prevents the malicious actor from accessing the details of the verification challenge. As a result, the malicious actor would have to additionally hack the secured application, which further complicates unauthorized access attempts.

Moreover, in some embodiments, the verification server causes the secured application to operate in a special trusted environment created within the device's operating system and to lock the one or more sensors associated with the verification challenge. Thus, the verification server prevents a malicious actor from spoofing or copying the data needed to successfully complete the verification challenge. As a result, the secured application would return an error if a malicious actor tried to hack the verification system to generate or determine the data that is needed to successfully complete the verification challenge, which further complicates unauthorized access attempts.

Additionally, in some approaches, the verification server determines whether the user is verified using a trained model that is trained on verified and unverified (e.g., generated by bots or hackers) responses to the one or more verification challenges being applied. Thus, the verification server includes the capability to recognize unauthorized attempts at completing the verification challenge. As a result, a malicious actor would have to provide verification challenge data in a way that suitably mimics an authorized user to successfully complete the verification challenge, which further complicates unauthorized access attempts.

Furthermore, in some implementations, the verification server identifies hardware specifications of sensors of the user device, calculates verification success rates corresponding to possible verification challenges that may be completed using at least one of the sensors of the user device, and selects one or more verification challenges based on an expected success rate exceeding a threshold success rate.

Thus, the verification server includes the capability to dynamically configure the verification challenge with device-level specificity and with a suitable probability of successful completion by authorized users. As a result, a malicious actor may have to successfully complete the verification challenge after a minimal number of attempts, which further complicates unauthorized access attempts.

Moreover, in some embodiments, the verification server identifies a verification challenge based on a current condition of a user (e.g., based on an available range of motion or a density of people associated with an environment in which the user operates). Thus, the verification server includes the capability to dynamically configure the verification challenge with environmental specificity and with safeguards against unauthorized monitoring of an authorized access attempt. As a result, a malicious actor would have to mimic a realistic user environment to reproduce expected environmental conditions or engineer a complex user-monitoring scheme to monitor an authorized access attempt, which further complicates unauthorized access attempts.

Additionally, in some approaches, the verification server requests input of at least two known and sequential gestures in a series of gestures. The verification server (or a device that has received a gesture recognition model from the verification server) processes the data corresponding to the gestures using a gesture recognition model with a single architecture that is configured to, for each gesture, assign a particular one of multiple possible values (or a particular set of multiple possible sets of values) to at least one adjustable parameter (e.g., a set of weights, activation functions, memory functions, numbers of layers, or other suitable parameter for affecting the output of a trained model). In some embodiments, each particular value or set of adjustable model parameters is configured to recognize a single gesture, and by iterating through a plurality of values or sets of adjustable model parameters, the model is configured to iteratively recognize all the gestures in a series of gestures. Thus, the verification server includes the capability to process data for a challenge requiring at least two gestures using only one gesture recognition model. As a result, the verification server can support the verification of access attempts at any one of multiple possible environments (e.g., at the verification server, at the user device, at a remote server, or at an intermediate computing node) without undue computational, memory, and file-transfer burdens, which broadens the scope of available deployment of the present systems and methods for verifying a user.

Moreover, in some embodiments, the verification server causes the secured application to share data (e.g., as recorded by the at least one locked sensor) with the application, while the application cannot access the at least one sensor. Thus, the verification server permits the user to monitor the data that they provide to complete the verification challenge. As a result, the application seeking verification can continue normal functioning (e.g., rendering an environment on a display of the user device based on the user's pose and movement) while the verification challenge response is being recorded and evaluated, even if the application's normal functioning relies on a specific sensor (e.g., an accelerometer in the inertial measurement unit) that is used for the verification.

In some embodiments, because the verification system incorporates operations that are based on sensors and other properties of a device seeking the verification, and executes such operations with increased security, the corresponding verification challenge is easily completed by authorized users and is exceedingly difficult to be completed by unauthorized users.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
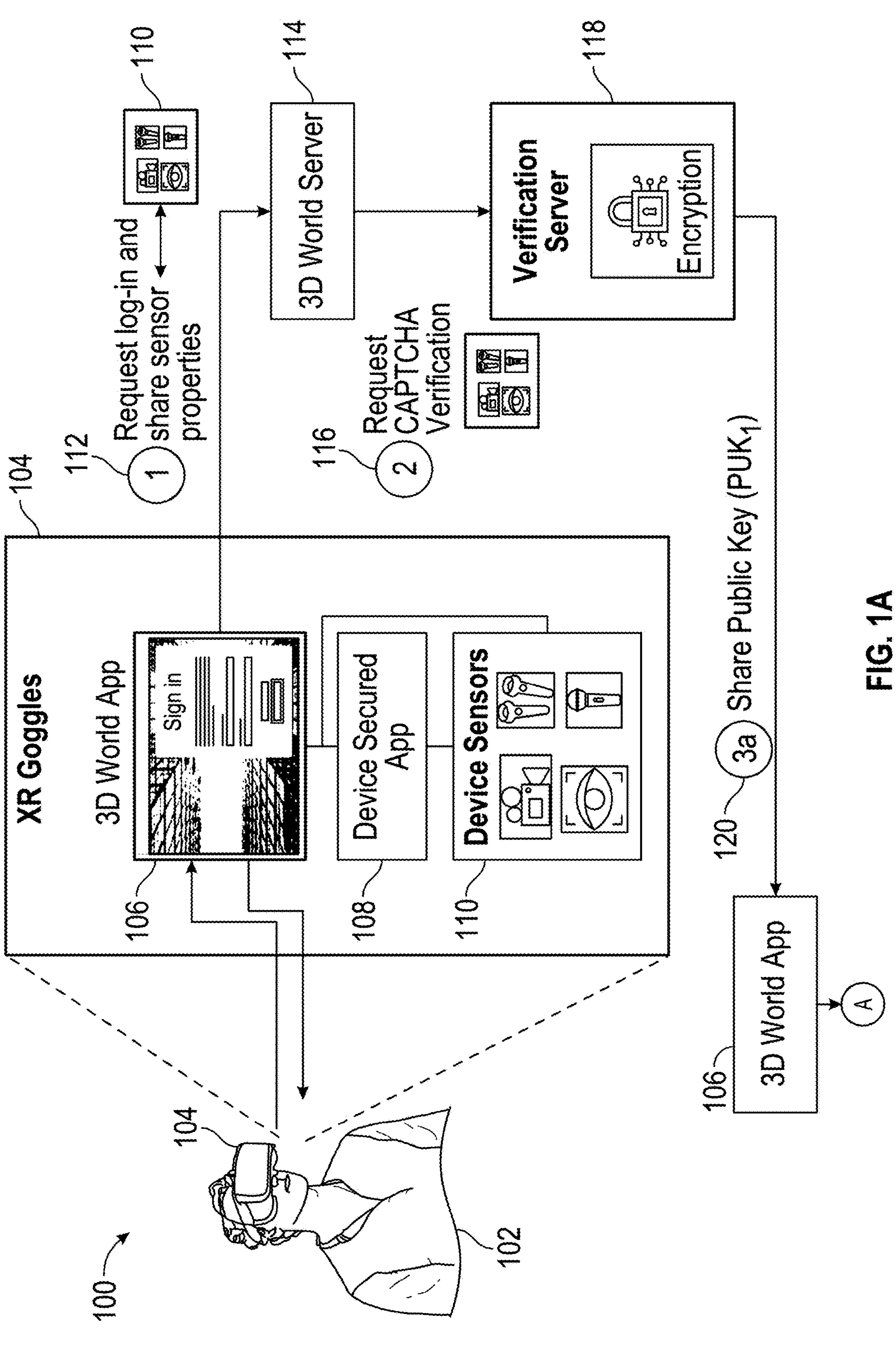
FIG. 1A shows an illustrative example of a verification server and related process for verifying a user device to access a resource of an application, in accordance with some embodiments of this disclosure.
Figure 1B:
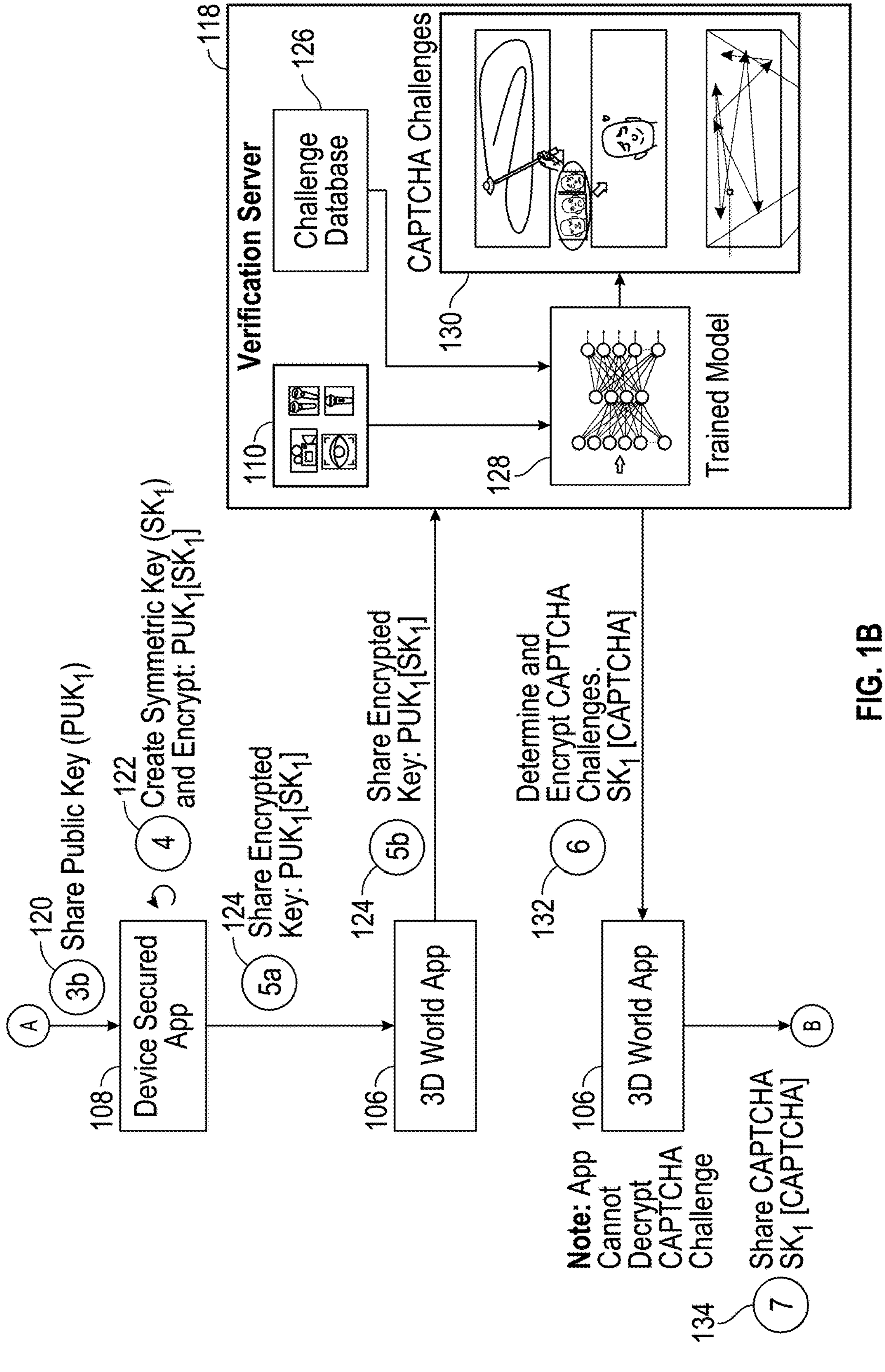
FIG. 1B continues the illustrative example of FIG. 1A of a verification server and related process for verifying a user device to access a resource of an application, in accordance with some embodiments of this disclosure.
Figure 1C:
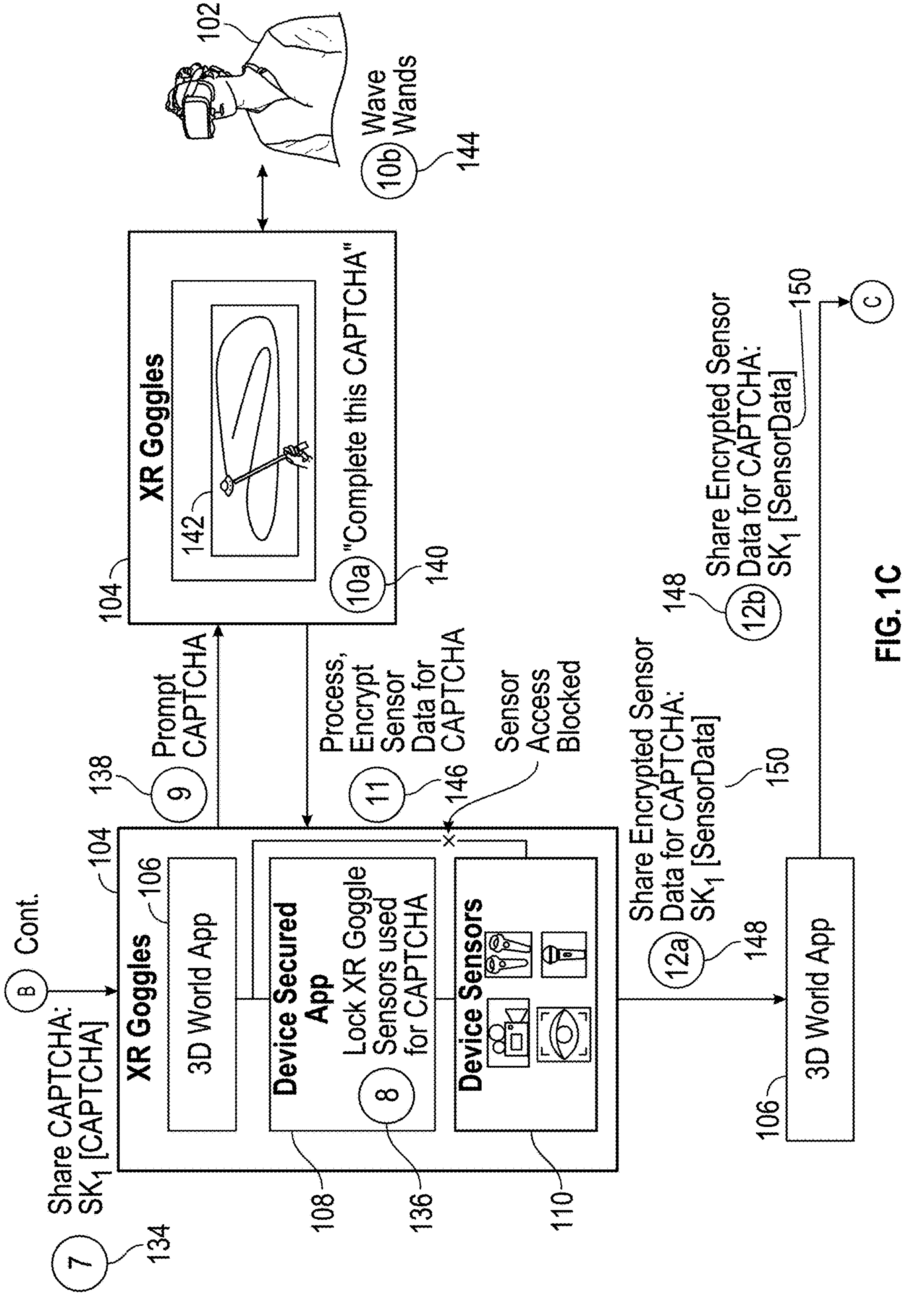
FIG. 1C continues the illustrative example of FIG. 1B of a verification server and related process for verifying a user device to access a resource of an application, in accordance with some embodiments of this disclosure.
Figure 1D:
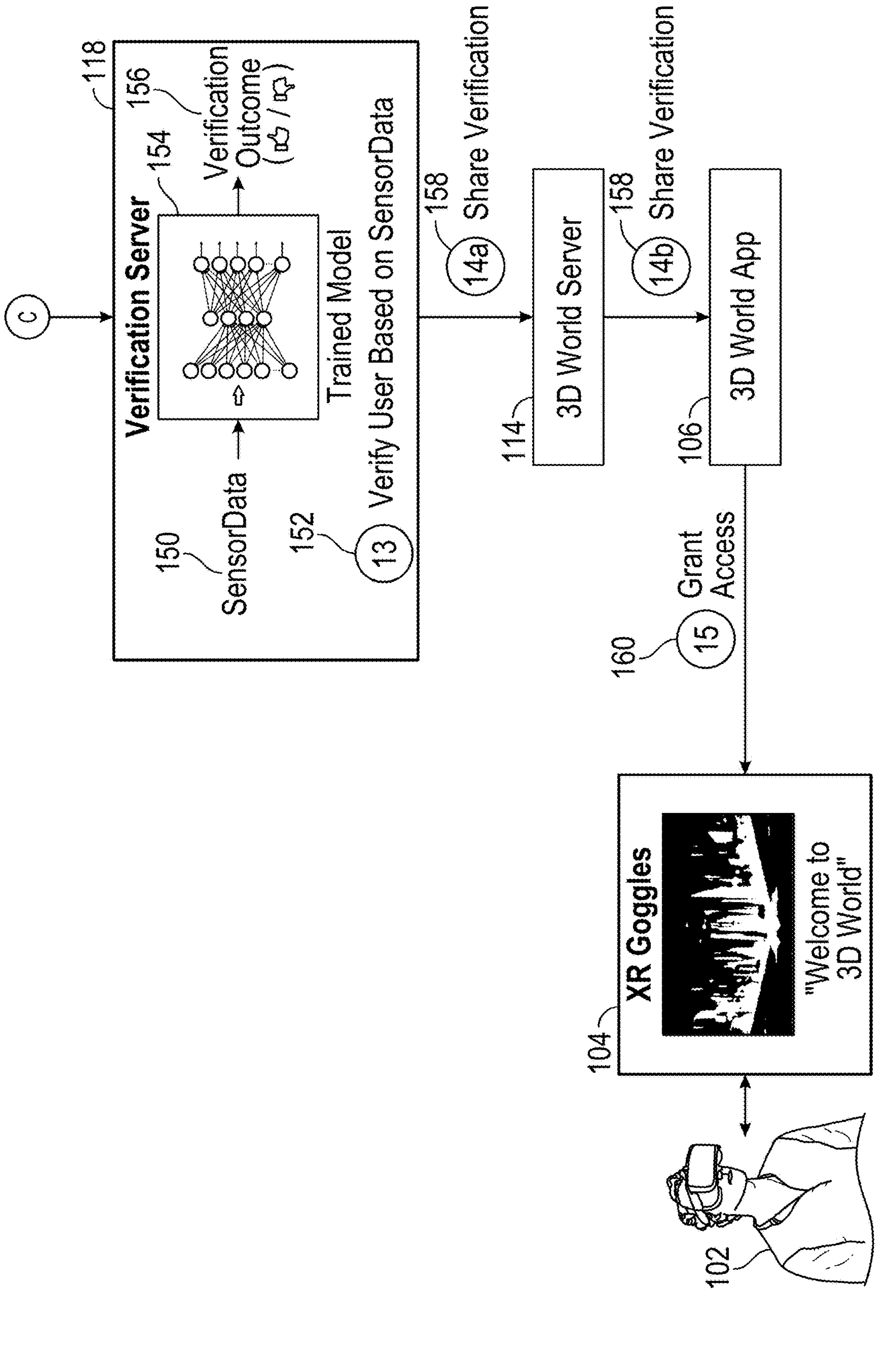
FIG. 1D continues the illustrative example of FIG. 1C of a verification server and related process for verifying a user device to access a resource of an application, in accordance with some embodiments of this disclosure.

FIG. 1 (a designation that is used to include at least the subject matter of FIGS. 1A, 1B, 1C, and 1D) shows an illustrative example of a verification server and related process for permitting a user to access a 3D space with enhanced security via a device with multiple sensors (e.g., a 3D-enabled or sensor-rich device). In some embodiments, user 102 accesses the 3D space using user device 104 (e.g., XR goggles, an XR head-mounted display (HUD), smart glasses, an immersive helmet, or any other suitable user or sensor-rich device). In some embodiments, the sensor-rich device may additionally or otherwise include any one or more of devices 202, 206, 207, 208, 209, and 220 as shown and described below in connection with FIG. 2, or the HMDs depicted in at least FIGS. 4-6. In some embodiments, the user 102 and 3D space may respectively correspond to user 1002 and client app (REE) 1004, as shown and described below in connection with FIG. 10.

In some embodiments, the sensor-rich device (e.g., user device 104) includes an application (e.g., 3D world app 106) and a secured application 108 (e.g., device secured app 108). In some embodiments, the application and the secured application 108 may respectively correspond to client app (REE) 1004 and trusted app (TEE) (i.e., trusted execution environment) 1006, as shown and described below in connection with FIGS. 8-10. The application may include a game, environment, service, social network, any other suitable component, or any combination thereof. For example, the application may operate in a rich execution environment (REE) (e.g., REE 802 or REE 902, as shown and described below in connection with FIGS. 8 and 9). In some embodiments, the application may thus be an application that can be programmed to execute many diverse actions and operations, which makes it a more easily compromised application compared to a secured application (e.g., device secured application 108, or any TA (trusted application) and/or application operating within a TEE). In contrast, the secured application has additional security protocols. For example, the secured application may operate on its own dedicated hardware and/or it may operate within a TEE (e.g., TEE 804 or TEE 904, as shown and described below in connection with FIGS. 8 and 9). In some embodiments, the dedicated hardware for the secured application includes a single-purpose chip, a dedicated region of a multi-purpose chip, an FPGA, other suitable hardware, or any combination thereof. In some embodiments, the secured application includes additional layers of security at the software level (e.g., including hashing, encryption, isolated execution environments, dedicated application-layer code, any other suitable software security, or any combination thereof) and/or the hardware level (e.g., including application-based functions or security measures that are physically encoded into memory of a device executing the application, any other suitable hardware security, or any combination thereof). In some embodiments, the secured application may be provided by a verification server or by an owner or operator of the verification server.

In some embodiments, the sensor-rich device includes device sensors 110. For example, device sensors 110 may include any one or more of a photo and/or video camera, one or more microphones, one or more haptic sensors, or one or more biometric sensors, any other suitable sensor, or any combination of the above. As used herein, a biometric sensor may refer to any sensor configured to track a user's gaze, facial expression, body temperature, perspiration, other suitable biometric property, or any combination thereof. As used herein, a biometric sensor may also or otherwise refer to any sensor configured to detect a user based on their pupil, iris, facial structure, skin tone, signature, fingerprint, hand characteristics, other physical characteristics, or any combination thereof.

In some embodiments, process 100 begins at 112, where the user device 104 (e.g., XR goggles) requests to log into an application (e.g., an unsecured 3D world app 106) executing on the user device. The request at 112 may also share sensor properties (e.g., such that device sensors 110 are made known to the receiver of the request). For example, the request may include data listing sensor types within the device and corresponding specifications (e.g., a camera recording at 60 fps with 1080p resolution, a haptic glove recording with 140 actuators and 10 psi sensitivity, and a thermometer with 0.1° F. precision and 100 ms response time). For another example, the data may include model numbers of the device or of the various sensor types, and the verification server may use a look-up table or other data stored in memory to retrieve data of the sensor types based on the corresponding model numbers. In some embodiments, the sensor properties also include an indication of whether each sensor is currently functioning properly. In some embodiments, the verification server determines properties of the possible verification challenges (e.g., expected success rates) based on specifications of the sensors within the device.

The user device may issue the request at 112 in response to a direct input from the user (e.g., choosing to "log in", opening an application, powering on the device, or any other suitable input), in response to a prompt from a server (e.g., a server of the application, a server of a verification provider, or any other suitable server), or in response to any other suitable input or prompt. In some embodiments, the request at 112 is passed to a server of the application (e.g., 3D world server 114). In some embodiments, the server of the application may correspond to 3D space API 1008, as shown and described below in connection with FIG. 10. In some embodiments, the aforementioned requests and all other communication to and from user device 104 (e.g., between the application and the server of the application or the verification server 118) may occur over communications network 209 through device I/O path 222 (e.g., of a user equipment 209), as described below in connection with FIG. 2.

In some embodiments, the 3D world app 106 is an insecure client-side or user-side app (e.g., executing on user device 104) that is supported by a remote server (e.g., the 3D world server 114). In turn, 3D world app 106 and 3D world server 114 are supported, in any combination, by the device secured app 108 and the verification server 118 for authorization or authentication (e.g., to determine whether a device/user can enter the secure 3D space). While the 3D world app 106 and 3D world server 114 respectively operate at the user device 104 and at a remote computing resource, various functions of the "3D world" or related systems (e.g., rendering a 3D/XR/VR/AR environment to a user, or requesting and performing a verification challenge to enter a 3D/XR/VR/AR environment) may be performed at one or both of the 3D world app 106 and the 3D world server 114. For example, a given configuration for performing various 3D world functions at the user device, the remote server, or a combination thereof may be particular to an owner/manager of the 3D world app. The particular details of these respective possible configurations generally do not affect the performance of secured app 108, verification server 118, and related verification architectures. Therefore, in the descriptions of FIG. 1 and in the descriptions of all other embodiments of the present disclosure, connecting the verification system to either one of the user device application or a server of the user device application is merely illustrative; in practice, the verification system (e.g., secured app 108 and verification server 118) may rely on the user device application, a server of the user device application, or both for verifying the user to enter a 3D/XR/VR/AR environment. Thus, in some embodiments, 3D world app 106 (or any other suitable device application) and 3D world server 114 (or any other suitable remote server) may be used interchangeably.

In some embodiments, process 100 continues at 116, where the server of the application (or, in some embodiments, the application itself) requests a verification challenge (e.g., a CAPTCHA verification) from a verification server 118. While a CAPTCHA verification is shown as the verification challenge in process 100, the specific use of a CAPTCHA verification is for illustrative purposes only; indeed, process 100 may operate using any number of possible verification challenges (e.g., any CAPTCHA, MFA, other suitable verification challenge, or combination thereof) without departing from the scope and spirit of the techniques described in connection with process 100 and related embodiments of the present disclosure. In some embodiments, the verification server 118 may correspond to server 204 or challenge API 1010, as respectively shown and described below in connection with FIGS. 2 and 10, and the verification server 118 may be configured to complete at least the processes 1500 and 1600, as respectively shown in FIGS. 15 and 16. In some embodiments, verification server 118 is configured to only receive verification requests from approved requesters.

In some embodiments, process 100 continues at 120, where the verification server 118 shares a public key ($PUK_1$) (e.g., directly, via a certificate authority, or via another suitable trusted holder of the public key) with the application (or, in some embodiments, with the application server). The verification server 118 is configured such that sharing the public key with the application causes the application to share the public key with the secured application 108, as shown at 120.

In some embodiments, process 100 continues at 122, where the verification server causes the secured application 108 to generate a symmetric key ($SK_1$) (or other suitable encryption layer) and encrypt the symmetric key using the public key. As used herein, a set of data (e.g., $SK_1$) that is encrypted (e.g., using $PUK_1$) may be indicated by bracketed text, e.g., $PUK_1[SK_1]$ indicates that the symmetric key $SK_1$ is encrypted by the public key $PUK_1$. Based on an encryption scheme consistent with that illustrated in process 100, the verification server 118 is configured to share the public key with the user device such that the verification server 118 can communicate securely with the secured application 108 via the application without permitting the application to decrypt or otherwise access the data provided by the verification server 118 or the data provided by the secured application 108.

Figure 8:
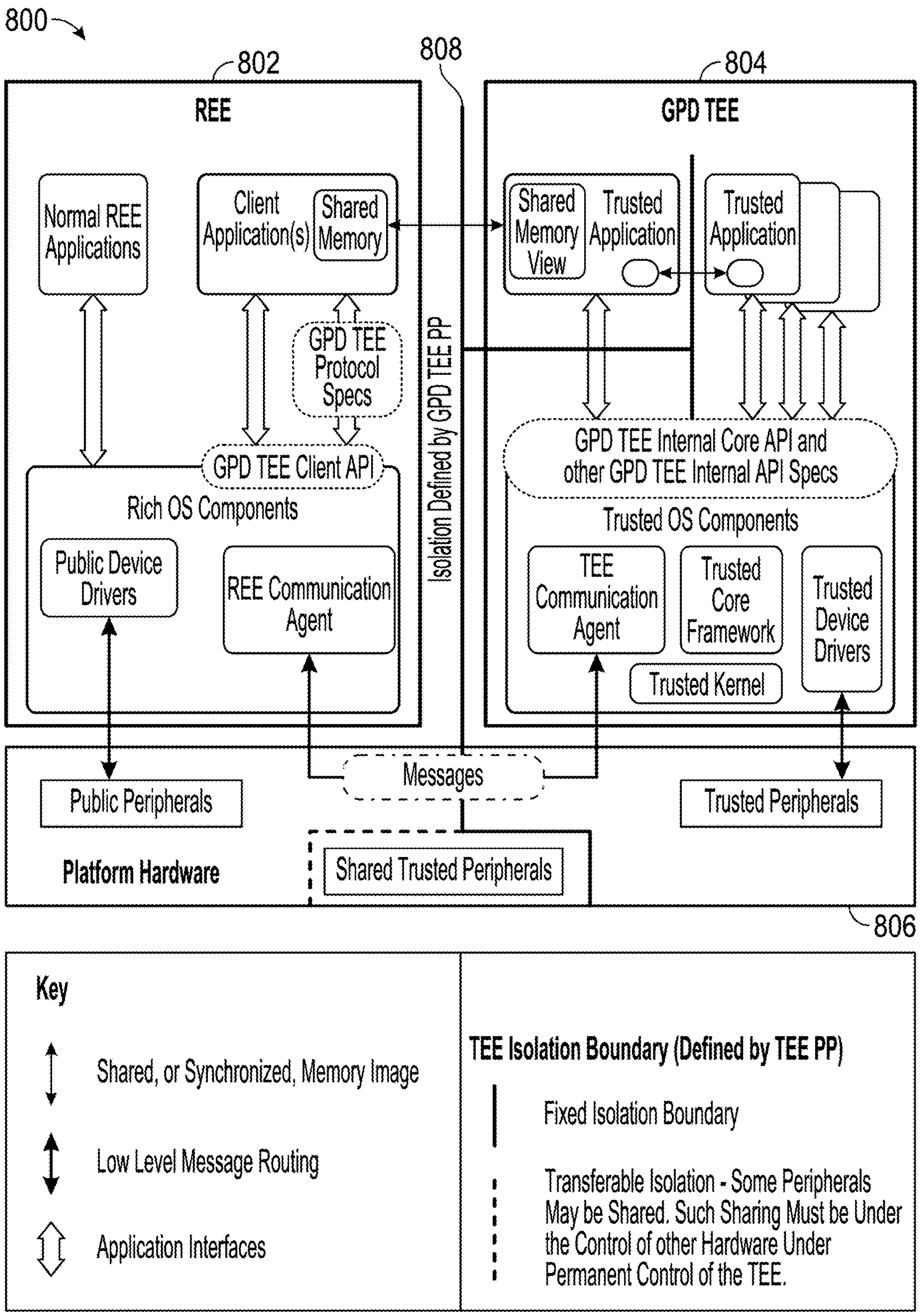
FIG. 8 shows illustrative execution environments for enhanced-security applications, in accordance with some embodiments of this disclosure.
Figure 9:
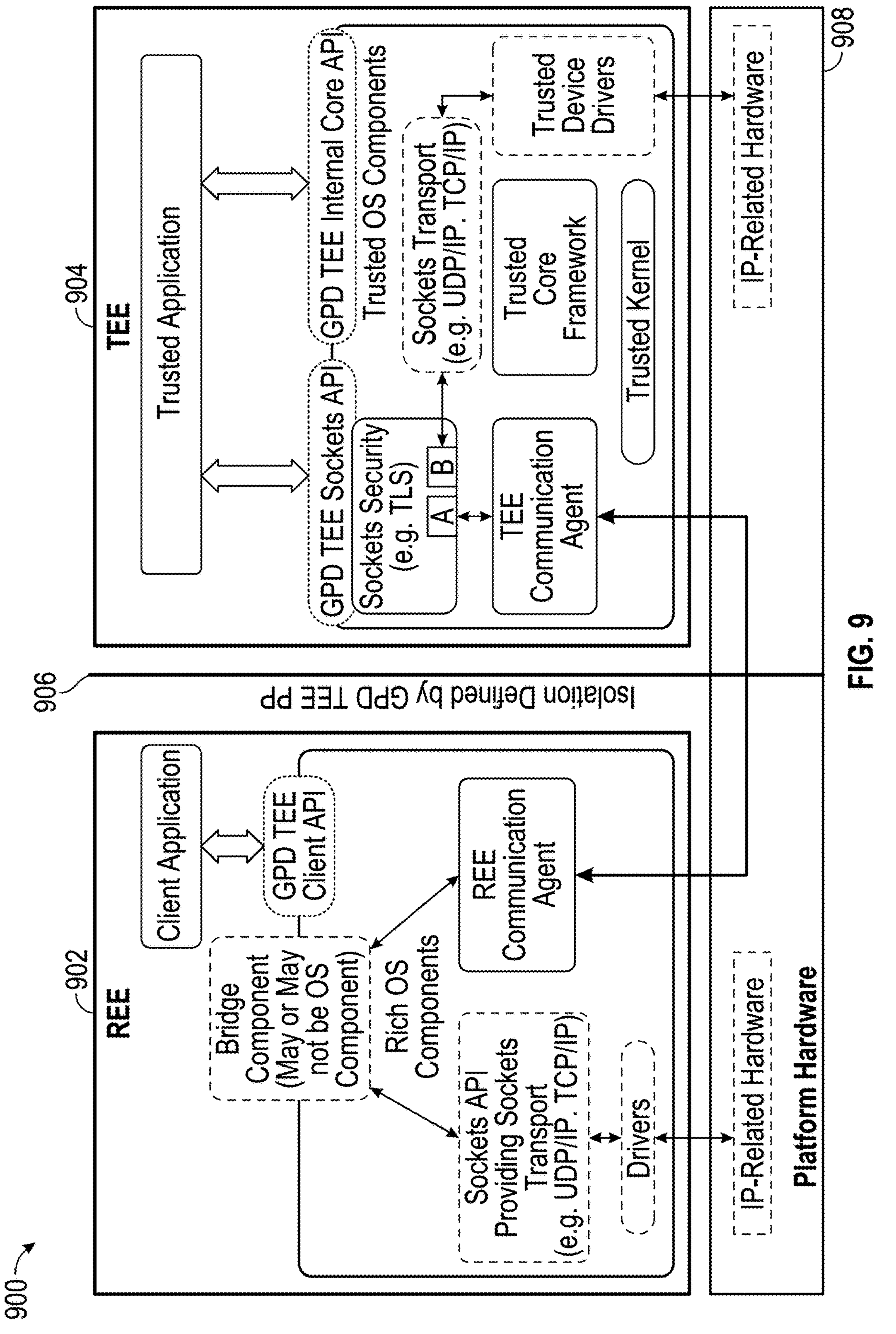
FIG. 9 shows illustrative socket architectures for enhanced-security applications, in accordance with some embodiments of this disclosure.

In some embodiments, process 100 continues at 124, where the verification server 118 causes the secured application 108 to share the encrypted symmetric key with the application, thus causing the application to share the encrypted key with the verification server at 124. The verification server 118 decrypts the encrypted symmetric key (e.g., using the private key corresponding to the public key with which the symmetric key was encrypted). In some embodiments, using the symmetric key, the verification server 118 and the secured application 108 freely share data (e.g., via the application) that is encrypted with the symmetric key while continuing to prevent the application from accessing the data (because the application lacks access to the un-encrypted symmetric key). In some embodiments, the verification server cannot communicate directly with the secured application (e.g., because the TEE in which the secured application operates does not have networking capabilities). Thus, the verification server encrypts the data (such that is accessible only to the secured application), communicates the encrypted data to the application (e.g., because the REE in which the application operates does have networking capabilities), and causes the application to share the encrypted data with the secured application (e.g., using the communication agents as shown in FIGS. 8-9).

In some embodiments, process 100 continues at 132, where the verification server 118 determines and encrypts the verification challenge. For example, verification server 118 may be configured to provide data characterizing device sensors 110 (e.g., model numbers, operating specifications, functional availability, resolution, dynamic range, any other sensor property, or any combination thereof) and a challenge database 126 as inputs to a trained model 128, where the trained model is configured to provide one or more verification challenges (e.g., CAPTCHA challenges 130) to be completed at the user device based on the inputs. In some embodiments, the challenge database 126 may include many possible CAPTCHA, MFA, and other suitable verification challenge, including at least those shown and described below in connection with FIGS. 3, 5, and 14. In some embodiments, the challenge database 126 may also include data characterizing possible challenges with respect to possible sensor-rich devices, and/or data characterizing expected success rates that are associated with given challenge-device combinations (e.g., as shown and described below in connection with FIG. 17). In some embodiments, the trained model may correspond to trained model 704, as shown and described below in connection with FIG. 7.

In some embodiments, an illustrative example for determining the verification challenge (e.g., as occurs at 132) is as follows. Upon receiving the device sensor properties at 112, the verification server 118 may determine that the device sensors 110 include, among other possible sensors and capabilities, a handheld controller, a camera with a corresponding computer vision package for identifying facial expressions, and a camera (which may be a separate camera or the aforementioned camera) with a corresponding computer vision package for tracking head pose and eye gaze. Based on at least these sensors and capabilities, and upon consideration of many challenge options present in the challenge database 126 (e.g., in view of which one or more available sensors can complete the challenge, and projected success rates associated with completing each of the many challenges using each of the one or more available sensors), the trained model 128 may output CAPTCHA challenges 130 (e.g., which may correspond to the CAPTCHA challenges 500). For example, the trained model 128 may evaluate a table of the challenge database 126 including binary flags indicating whether a given challenge is suitable for being completed by a given sensor. The trained model may otherwise or additionally evaluate a table of the challenge database 126 including an expected success rate, failure rate, uncertainty, or other relevant metric associated with a user attempting to complete the given challenge with the given sensor. Considering the device sensor 110 data, and data of the challenge database 126 (e.g., a list of possible challenges and corresponding properties of the challenges that specifically pertain to respective sensors of a list of possible sensors), trained model 128 may implement a supervised learning deep neural network (DNN), a convolutional neural network (CNN), a recurrent neural network (RNN), a linear regression, logistic regression, decision tree, support vector machine (SVM) algorithm, Bayes algorithm, k-nearest neighbor (KNN) algorithm, K-means algorithm, random forest algorithm, the network 1150, or any other statistical or AI/ML (e.g., supervised or unsupervised) architecture for determining a suitable challenge (e.g., one with an optimal trade-off between ease-of-use for a verifiable user and difficulty-of-successful-completion for an unverifiable user) based on data of the device sensors 110 and the challenge database 126.

In some embodiments, the one or more verification challenges to be completed at the user device are encrypted (e.g., using the symmetric key: $SK_1$[CAPTCHA]) and sent to the user device. As noted in FIG. 1 and discussed above, the encrypted CAPTCHA challenges may be sent to the application but may not be decrypted by the application.

In some embodiments, process 100 continues at 134, where verification server 118 causes the application to share the encrypted challenge with the secured application.

In some embodiments, process 100 continues at 136, where the verification server 118 causes the secured application 108 to lock at least one sensor (e.g., selected from device sensors 110) of the user device 104. As used herein, to "lock" a sensor may refer to restricting particular applications from accessing the sensor (e.g., any combination of sensor data, sensor characteristics, sensor functionality, or any other suitable sensor aspects). For example, as noted in FIG. 1, corresponding to the operation at 136, sensor access is blocked between the 3D world app 106 and device sensors 110. While particular applications are locked from accessing the sensor, the secured application 108 (e.g., by virtue of locking the sensor) remains connected to the sensor. As a result, the secured application 108 may record data from the sensor (e.g., in subsequent operations of process 100) such that the user device may securely provide the data needed for the verification challenge.

In some embodiments, process 100 continues at 138, where verification server 118 causes the secured application 108 to prompt a verification challenge (e.g., a CAPTCHA challenge) at a user interface (UI) of the user device (e.g., a UI of user device 104). In some embodiments, the prompt may occur within the secured application; in other embodiments, the prompt may occur within the application based on instructions from the secured application.

In some embodiments, process 100 continues at 140, where verification server 118 causes the UI of the user device to inform the user about the verification challenge (e.g., "complete the CAPTCHA" 140). In some embodiments, the verification challenge may be automatically completed (e.g., without prompting the user) and a corresponding message (e.g., "verifying now") may be displayed. If the verification challenge requires input from the user, then the user may provide the input at 140 (e.g., "wave hands"). For example, the user may be prompted with challenge 142 and may wave controllers 144 (e.g., which are equipped with position sensors) in an attempt to follow a trajectory that is displayed on the user device.

In some embodiments, as mentioned, the verification challenges do not require a prompt to the user. For example, using principles similar to those described below in connection with CAPTCHA 304, certain verification challenges may verify a user based on evaluating their interaction with a display on the user device 104 or based on evaluating a sensor background signal (e.g., where a "background signal" may refer to a signal that is measured when the user is not deliberately (e.g., in response to a prompt) providing an input to the particular sensor). In such embodiments, the user may simply request a resource of the application (e.g., by opening the application, logging into the application, or accessing a certain function of the application) and then be automatically verified without any further action based on a verification challenge that does not include an explicit prompt. In some illustrative embodiments, the verification server may verify a CAPTCHA challenge without prompting the user based on verifying that a computer-vision signal (e.g., recognition of a head, torso, skin, hair, iris, any other suitable body part, or any combination thereof) or a biometric signal (e.g., of a skin tone, a human body temperature, a skin conductivity, a fingerprint, any other suitable biometric signal, or any combination thereof) provides sufficient proof that the user device 104 is being operated by a human (e.g., user 102). Similarly, in some illustrative embodiments, the verification server may verify an MFA or other related "Is this person who they say they are?" challenge without prompting the user based on verifying that a computer-vision signal or a biometric signal (e.g., any of the computer-vision or biometric signals listed above) provides sufficient proof that the user device 104 is being operated by the same human (e.g., user 102) who has previously provided matching data associated with the person who they say they are.

In some embodiments, process 100 continues at 146, where verification server 118 causes the secured application 108 to record, process, and encrypt the verification challenge data (e.g., the hand-waving trajectory). For example, the secured application 108 may encrypt the verification challenge data using the symmetric key. In some embodiments (e.g., as shown and described below in connection with FIG. 18), the secured application 108 is configured to share the recorded verification challenge data with an application (e.g., through a back-feed to the application) that controls a UI of the user device 104 such that the user 102 may monitor their progress while attempting to provide the verification challenge data. For example, secured application 108 may write the recorded verification challenge data to an area in the REE that is accessible to other applications of the user device 104 (e.g., 3D world app 106).

In some embodiments, process 100 continues at 148, where verification server 118 causes secured application 108 to share the verification challenge data with the application (e.g., 3D world app 106) such that the application shares the verification challenge data with the verification server at 148. As shown, the sensor data (e.g., SensorData 150) is shared in an encrypted format (e.g., based on encryption by the symmetric key: $SK_1$[SensorData]). In some embodiments, SensorData 150 is the original sensor data recorded in response to completing the verification challenge (e.g., wave hands at 144); in other embodiments, SensorData 150 may be a hashed, encrypted, filtered, process, or other derived version of the original sensor data. In some embodiments, SensorData 150 may otherwise or additionally include an indication of whether the verification challenge was or was not completed successfully (e.g., with or without a corresponding confidence score).

In some embodiments, process 100 continues at 152, where verification server 118 verifies the user based on SensorData 150. In some embodiments, verification server 118 provides SensorData 150 as an input to trained model 154 (which is distinct from trained model 128, but may include similar components), and trained model 154 (e.g., which may correspond to the models of FIG. 7 and/or FIG. 11) processes the input to generate a verification outcome 156 including a binary representation of whether the user was verified (e.g., thumbs up) or was not verified (e.g., thumbs down). In some embodiments, the verification outcome 156 may also include a confidence score (e.g., representing how confident the verification server 118 is in the accuracy of the determination that the user is verified or not verified).

In some embodiments, process 100 continues at 158, where verification server 118 shares via network communication (e.g., over communication network equipment 209, over a process corresponding to connections 410, or using REE 802 or REE 902) the verification outcome with a server of the application (e.g., 3D world server 114), and verification server causes the server of the application to share the verification outcome with the application (e.g., 3D world ap 106) at 158.

In some embodiments, process 100 continues at 160, where, based on a successful verification outcome, verification server 118 causes the application to grant access to at least one resource of the application to the user device. For example, user 102 may be admitted to a protected environment of the application (e.g., the user 102 may receive a "welcome to 3*d* world" message on user device 104). Illustrative and non-limiting resources that the user may be granted access to include a simulation engine (e.g., a game, world, server, or other application), a particular aspect of a simulation engine (e.g., a level, user experience, virtual room, or other aspect), a user profile (e.g., for banking, reserving, checking in, checking out, accessing social media, uploading data, downloading data, communicating, or any other suitable profile-based environment), a shop (e.g., for completing a purchase or sampling a product), or any other suitable digital resource.

Figure 2A:
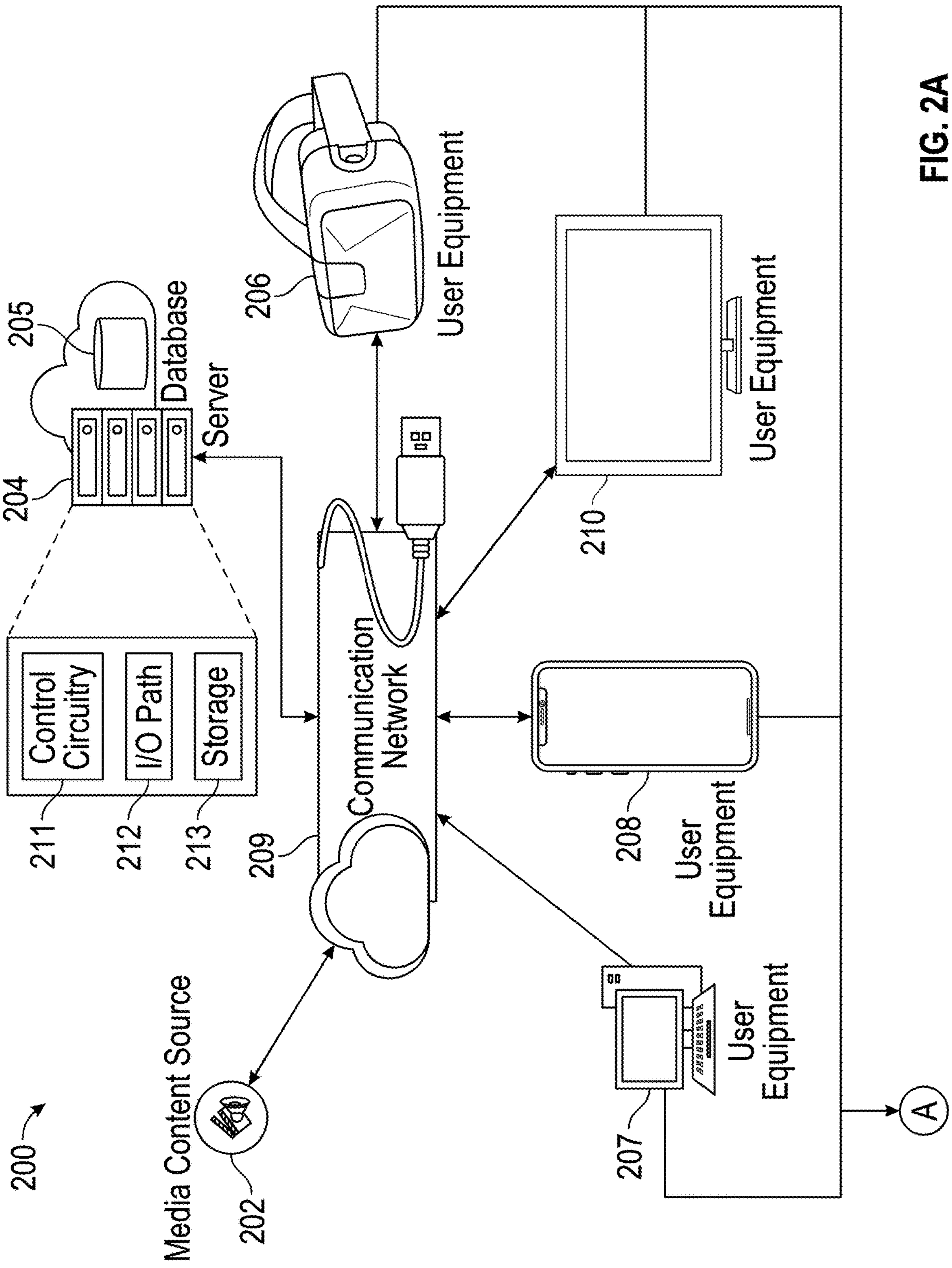
FIG. 2A describes illustrative devices, systems, servers, and related hardware for verifying a user, in accordance with some embodiments of the present disclosure.
Figure 2B:
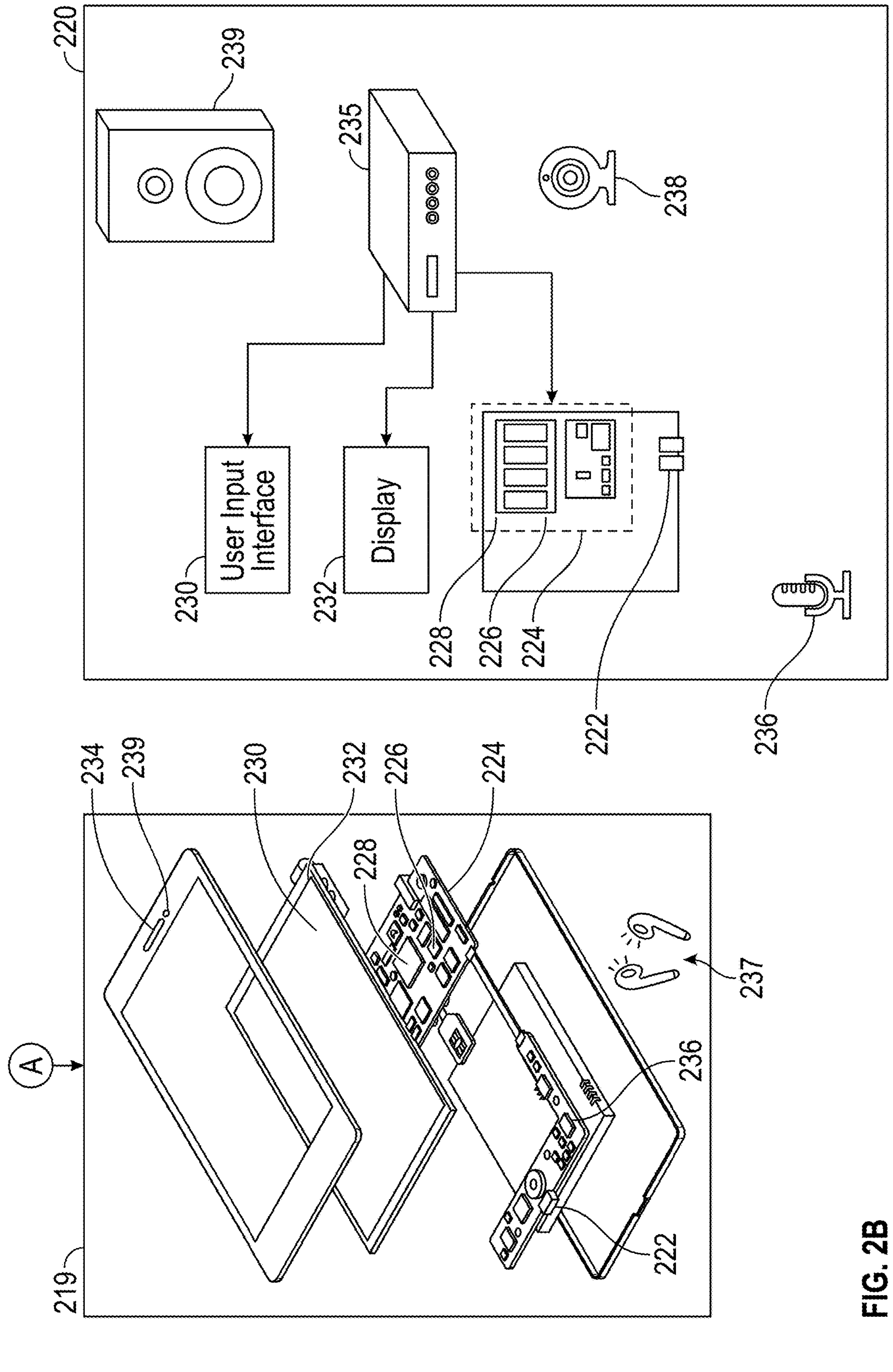
FIG. 2B describes other illustrative devices, systems, servers, and related hardware for verifying a user, in accordance with some embodiments of the present disclosure.

FIG. 2 (a designation that is used to include at least the subject matter of FIGS. 2A and 2B) describes illustrative devices, systems, servers, and related hardware for verifying a user, in accordance with some embodiments of the present disclosure. FIG. 2 shows generalized embodiments of illustrative user equipment 206, 207, 208, 210, 219 and 220, which may correspond to, e.g., user device 104 of FIG. 1. For example, despite being shown as an exploded smart phone device (e.g., corresponding to user equipment 208), this depiction is merely illustrative, and user equipment 219 may be a smartphone device, a tablet, a near-eye display device, an XR device, a VR device, an AR device or any other sensor-rich device capable of participating in a 3D environment (e.g., locally or over a communication network). In some embodiments, the sub-equipment shown within equipment 219 is representative of sub-equipment that may be included within each of the abovementioned devices that may correspond to equipment 219. In another example, user equipment 220 may be a user television equipment system or device. User equipment 220 may include set-top box 239. Set-top box 239 may be communicatively connected to microphone 236, audio output equipment (e.g., speaker or headphones 237), and display 232. In some embodiments, microphone 236 may receive audio corresponding to a voice of a video conference participant and/or ambient audio data during a video conference. In some embodiments, display 232 may be a television display or a computer display. In some embodiments, set-top box 236 may be communicatively connected to user input interface 230. In some embodiments, user input interface 230 may be a remote-control device. Set-top box 236 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment are discussed below in further connection with FIG. 2. In some embodiments, device 219 (e.g., user equipment 219) may comprise any suitable number of sensors (e.g., gyroscope, gyrometer, accelerometer, haptic sensor, temperature sensor, pressure sensor, etc.), and/or a GPS module (e.g., in communication with one or more servers and/or cell towers and/or satellites) to ascertain a location of device 2018. In some embodiments, device 219 comprises a rechargeable battery that is configured to provide power to the components of the device.

Each one of user equipment 219 and user equipment 220 may receive content and data via input/output (I/O) path 222. I/O path 222 may provide content (e.g., broadcast programming, on-demand programming, internet content, content available over a local area network (LAN) or wide area network (WAN), and/or other content) and data to control circuitry 224, which may comprise processing circuitry 226 and storage 228. Control circuitry 224 may be used to send and receive commands, requests, and other suitable data using I/O path 222, which may comprise I/O circuitry. I/O path 222 may connect control circuitry 224 (and specifically processing circuitry 226) to one or more communications paths (described below). I/O functions may be provided by one or more of these communications paths, but are shown as a single path in FIG. 2 to avoid overcomplicating the drawing. While set-top box 236 is shown in FIG. 2 for illustration, any suitable computing device having processing circuitry, control circuitry, and storage may be used in accordance with the present disclosure. For example, set-top box 236 may be replaced by, or complemented by, a personal computer (e.g., a notebook, a laptop, a desktop), a smartphone (e.g., device 208), an XR device, a tablet, a network-based server hosting a user-accessible client device, a non-user-owned device, any other suitable device, or any combination thereof.

Control circuitry 224 may be based on any suitable control circuitry such as processing circuitry 226. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 224 executes instructions for the media application stored in memory (e.g., storage 228). Specifically, control circuitry 224 may be instructed by the media application to perform the functions discussed above and below. In some implementations, processing or actions performed by control circuitry 224 may be based on instructions received from the media application.

In client/server-based embodiments, control circuitry 224 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 2, the instructions may be stored in storage 228, and executed by control circuitry 224 of a device 219.

In some embodiments, the media application may be a client/server application where only the client application resides on device 219, and a server application resides on an external server (e.g., server 204 and/or media content source 202). For example, the media application may be implemented partially as a client application on control circuitry 224 of device 219 and partially on server 204 as a server application running on control circuitry 211. Server 204 may be a part of a local area network with one or more of devices 219, 220 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 204 and/or an edge computing device), referred to as "the cloud." Device 219 may be a cloud client that relies on the cloud computing capabilities from server 204 to generate personalized engagement options in a VR environment. The client application may instruct control circuitry 224 to generate personalized engagement options in a VR environment.

Control circuitry 224 may include communications circuitry suitable for communicating with a server, edge computing systems and devices, a table or database server, or other networks or servers. The instructions for carrying out the above-mentioned functionality may be stored on a server (e.g., server 204). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (e.g., communication network 209). In addition, communications circuitry may include circuitry that enables peer-to-peer communication of user equipment, or communication of user equipment in locations remote from each other (described in more detail below).

Memory may be an electronic storage device provided as storage 228 that is part of control circuitry 224. As used herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 228 may be used to store various types of content described herein as well as media application data described above. Nonvolatile memory may also be used (e.g., to launch a boot-up routine and other instructions). Cloud-based storage (e.g., as described above) may be used to supplement storage 228 or instead of storage 228.

Control circuitry 224 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 224 may also include scaler circuitry for upconverting and downconverting content into the preferred output format of user equipment 219. Control circuitry 224 may also include digital-to-analog converter circuitry and analog-to-digital converter circuitry for converting between digital and analog signals. The tuning and encoding circuitry may be used by user equipment 219, 220 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 228 is provided as a separate device from user equipment 219, the tuning and encoding circuitry (including multiple tuners) may be associated with storage 228.

Control circuitry 224 may receive instruction from a user by way of user input interface 230. User input interface 230 may be any suitable user interface, such as a remote control, mouse, trackball, keypad, keyboard, touch screen, touchpad, stylus input, joystick, voice recognition interface, wand, shaker, haptic sensor, eye-tracker, or other suitable user input interfaces. Display 232 may be provided as a stand-alone device or integrated with other elements of each one of user equipment 219 and user equipment 220. For example, display 232 may be a touchscreen, touch-sensitive display, or projection display (e.g., onto a pair of goggles). In such circumstances, user input interface 230 may be integrated with or combined with display 232. In some embodiments, user input interface 230 includes a remote-control device having one or more microphones, buttons, keypads, any other components configured to receive user input or combinations thereof. For example, user input interface 230 may include a handheld remote-control device having an alphanumeric keypad and option buttons. In a further example, user input interface 230 may include a handheld remote-control device having a microphone and control circuitry configured to receive and identify voice commands and transmit information to set-top box 236.

Audio output equipment 234 may be integrated with or combined with display 232. Display 232 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 232. Audio output equipment 234 may be provided as integrated with other elements of each one of device 219 and device 220 or may be stand-alone units. An audio component of videos and other content displayed on display 232 may be played through speakers (or headphones) of audio output equipment 234. In some embodiments, audio may be distributed to a receiver (not shown), which processes and outputs the audio via speakers of audio output equipment 234. In some embodiments, for example, control circuitry 224 is configured to provide audio cues to a user, or other audio feedback to a user, using speakers of audio output equipment 234. There may be a separate microphone 236 or audio output equipment 234 may include a microphone configured to receive audio input such as voice commands or speech. For example, a user may speak letters or words that are received by the microphone and converted to text by control circuitry 224. In a further example, a user may voice commands that are received by a microphone and recognized by control circuitry 224. Camera 238 may be any suitable video camera integrated with the equipment or externally connected. Camera 238 may be a digital camera comprising a charge-coupled device (CCD) and/or a complementary metal-oxide semiconductor (CMOS) image sensor. Camera 238 may be an analog camera that converts to digital images via a video card.

The media application may be implemented using any suitable architecture. For example, it may be a stand-alone application wholly implemented on each one of user equipment 219 and user equipment 220. In such an approach, instructions of the application may be stored locally (e.g., in storage 228), and data for use by the application is downloaded on a periodic basis (e.g., from an out-of-band feed, from an internet resource, or using another suitable approach). Control circuitry 224 may retrieve instructions of the application from storage 228 and process the instructions to provide video conferencing functionality and generate any of the displays discussed herein. Based on the processed instructions, control circuitry 224 may determine what action to perform when input is received from user input interface 230. For example, movement of a cursor on a display up/down may be indicated by the processed instructions when user input interface 230 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 224 may allow a user to provide user profile information or may automatically compile user profile information. For example, control circuitry 224 may access and monitor network data, video data, audio data, processing data, participation data from a conference participant profile. Control circuitry 224 may obtain all or part of other user profiles that are related to a particular user (e.g., via social media networks), and/or obtain information about the user from other sources that control circuitry 224 may access. As a result, a user can be provided with a unified experience across the user's different devices.

In some embodiments, the media application is a client/server-based application. Data for use by a thick or thin client implemented on each one of user equipment 219 and user equipment 220 may be retrieved on-demand by issuing requests to a server remote to each one of user equipment 219 and user equipment 220. For example, the remote server may store the instructions for the application in a storage device. The remote server may process the stored instructions using circuitry (e.g., control circuitry 224) and generate the displays discussed above and below. The client device may receive the displays generated by the remote server and may display the content of the displays locally on device 219. This way, the processing of the instructions is performed remotely by the server while the resulting displays (e.g., that may include text, a keyboard, or other visuals) are provided locally on device 219. Device 219 may receive inputs from the user via input interface 230 and transmit those inputs to the remote server for processing and generating the corresponding displays. For example, device 219 may transmit a communication to the remote server indicating that an up/down button was selected via input interface 230. The remote server may process instructions in accordance with that input and generate a display of the application corresponding to the input (e.g., a display that moves a cursor up/down). The generated display is then transmitted to device 219 for presentation to the user.

In some embodiments, the media application may be downloaded and interpreted or otherwise run by an interpreter or virtual machine (run by control circuitry 224). In some embodiments, the media application may be encoded in the ETV Binary Interchange Format (EBIF), received by control circuitry 224 as part of a suitable feed, and interpreted by a user agent running on control circuitry 224. For example, the media application may be an EBIF application. In some embodiments, the media application may be defined by a series of JAVA-based files that are received and run by a local virtual machine or other suitable middleware executed by control circuitry 224. In some of such embodiments (e.g., those employing MPEG-2, MPEG-4, HEVC or any other suitable digital media encoding schemes), the media application may be, for example, encoded and transmitted in an MPEG-2 object carousel with the MPEG audio and video packets of a program.

As shown in FIG. 2, user equipment 206, 207, 208, 210 (which may correspond to, e.g., user device 104 of FIG. 1; user equipment 219 of FIG. 2) may be coupled to communication network 209. Communication network 209 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 209) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 2 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 202-11x, etc.), or other short-range communication via wired or wireless paths. The user equipment may also communicate with each other directly through an indirect path via communication network 209.

System 200 may comprise media content source 202, one or more servers 204, and/or one or more edge computing devices. In some embodiments, the media application may be executed at one or more of control circuitry 211 of server 204 (and/or control circuitry of user equipment 206, 207, 208, 210 and/or control circuitry of one or more edge computing devices). In some embodiments, the media content source and/or server 204 may be configured to host or otherwise facilitate video communication sessions between user equipment 206, 207, 208, 210 and/or any other suitable user equipment, and/or host or otherwise be in communication (e.g., over network 209) with one or more social network services.

In some embodiments, server 204 may include control circuitry 211 and storage 213 (e.g., RAM, ROM, Hard Disk, Removable Disk, etc.). Storage 213 may store one or more databases. Server 204 may also include an I/O path 212. I/O path 212 may provide video conferencing data, device information, or other data, over a local area network (LAN) or wide area network (WAN), and/or other content and data to control circuitry 211, which may include processing circuitry, and storage 213. Control circuitry 211 may be used to send and receive commands, requests, and other suitable data using I/O path 212, which may comprise I/O circuitry. I/O path 212 may connect control circuitry 211 (and specifically control circuitry) to one or more communications paths.

Control circuitry 211 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 211 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 211 executes instructions for an emulation system application stored in memory (e.g., the storage 213). Memory may be an electronic storage device provided as storage 213 that is part of control circuitry 211.

Figure 3:
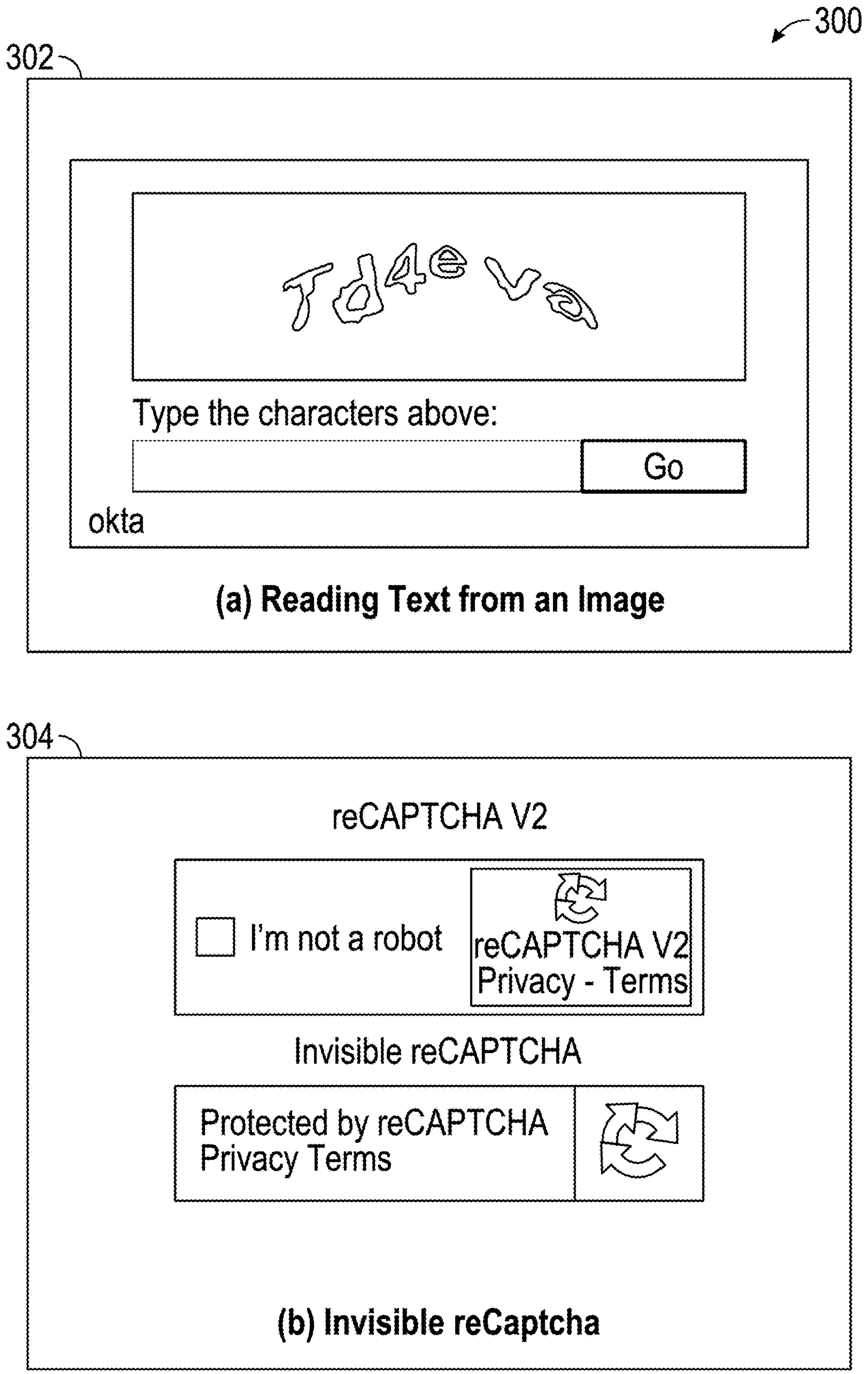
FIG. 3 shows illustrative examples of two-dimensional (2D) verification challenges, in accordance with some embodiments of this disclosure.

FIG. 3 shows illustrative examples of two-dimensional (2D) verification challenges. As used herein, a 2D verification challenge may refer to a challenge that is implemented outside of an AR, VR, XR, or related 3D environment. In some embodiments, these illustrative verification challenges detect evidence of human activity in order to fill out forms, enter authenticated databases/server environments, perform other suitable verification processes, or any combination thereof. Such CAPTCHA challenges may protect websites against bots and/or automated hacking tools. A principle behind 2D CAPTCHA is that malicious apps are very good at completing forms automatically, but are less capable of decoding texts, objects, shapes, or other features that are hidden in images. For example, challenge 302 prompts a user to type the distorted characters. In response to the characters being accurately typed (e.g., "Td4eva"), a server may verify the user based on their successful completion of challenge 302. However, it may be difficult for bots and/or automated hacking tools to decipher and correctly provide the distorted text, such that challenge 302 may prevent undesired users from accessing a protected environment. In some embodiments of the present disclosure, similar principles may extend to 3D CAPTCHA challenges (e.g., which may involve decoding of the abovementioned targets when they are hidden or otherwise presented in 3D volumes), as described above and as further described below.

Verification challenge 304 depicts another type of CAPTCHA challenge (e.g., an 'Invisible reCaptcha'). Verification challenge 304 may be referred to as a passive or unprompted challenge (e.g., consistent with the abovementioned verification challenges that do not prompt user 102), because a user minimally or indirectly engages with the challenge (e.g., by simply pressing the button next to 'I'm not a Robot'). A verification server or system may verify a user through verification challenge 304 by using a trained model (e.g., based on machine learning (ML) or artificial intelligence (AI), e.g., trained model 704) to detect how a user interacts with the webpage (e.g., by tracking mouse movements, click times, other suitable engagement with the UI, or any combination thereof). Because a bot and/or automated hacking tool may not make these "human" motions, the system may identify them as an undesired user and correspondingly block them from accessing a protected environment. In some embodiments of the present disclosure, similar principles may extend to 3D CAPTCHA challenges (e.g., which may involve detecting how a user interacts with a 3D environment or how sensors of a user device reflect physical operation within a 3D environment), as described above and as further described below.

An aspect of a verification challenge (e.g., a CAPTCHA, MFA, or other suitable verification challenge) is the difficulty of the task. For example (e.g., with reference to challenge 302), too much noise in an image may make it difficult even for a desired user (e.g., an authorized human) to successfully complete the challenge, while too little noise in the image may allow an attacker to feed the challenge to a processor with capabilities such as optical character recognition (OCR), object and feature recognition, or related functionality to successfully execute the challenge. Thus, in some embodiments, verification challenges are not deterministically successful, but rather are probabilistically successful. This probabilistic outcome may lead to an "arms race" between designers of verification challenges (and systems for delivering such challenges) and designers of verification challenge solvers (e.g., CAPTCHA solvers, MFA solvers, bots, hackers, attackers, other malicious entities, or any combination thereof).

In some embodiments of the present disclosure, a user is interacting with a 3D application using 3D-enabled glasses (e.g., XR, VR, or AR glasses; e.g., user device 102) that receive inputs (e.g., based on external hand-held controllers, gesture recognition that is incorporated into the glasses, bands or suits worn on the body, biometric sensors, haptic sensors, video-tracking devices, any other method/device that is suitable for providing an input, or any combination thereof). These devices may inherently house various sensors such as an inertial measurement unit (IMU) devices with accelerometers, gyroscopes, and other movement sensors (e.g., for tracking pose and position, or measuring velocity or acceleration associated with various movements), an IR camera for monitoring a user's eye (e.g., to track gaze, blink, saccades, or other suitable dynamics of the eye), an emotion detection camera, and other suitable body-monitoring units that are coupled with the 3D-enabled glasses to measure many possible physiological parameters (e.g., heart rate, temperature, skin conductivity, skin tone, perspiration, respiratory properties, fingerprint, body contours, any other suitable physiological parameter, or any combination thereof).

In some embodiments of the present disclosure, at least two solutions are provided for enhancing the security of verification challenges for use in 3D applications. A first solution includes identifying that an actor seeking access to a secure 3D space is a human rather than a bot (e.g., using a CAPTCHA verification challenge). A second solution includes identifying that an actor seeking access to a secure authenticated space is who they say they are (e.g., using an MFA verification challenge) (e.g., where the user is authorized based on their personal identification by an owner or managing entity of the secure space). It is worth noting that these two solutions, and related solutions as taught by the present disclosure, may use many of the same techniques; however, these two solutions are directed toward different problems. For example, a successful solution for identifying that a user is who they say they are does not necessarily identify that a human user was present to provide the identifying data; identifying that a user is not a bot does not necessarily identify that the user is who they say they are. In some embodiments, these solutions may be used in tandem to verify that a user is not a bot and is who they say they are.

In some embodiments of the present disclosure, one or more bio-mechanical parameters may be used for authenticating a user based on a verification challenge. In some embodiments, AI/ML techniques may be deployed for determining an appropriate verification challenge and/or evaluating whether a response to a verification challenge successfully verifies a user. For example, in response to a verification server receiving a request for a verification challenge from a sensor-rich device (e.g., the request from an API of the server or an API in communication with the server), the verification server may assess the sensors available on the device (e.g., using trained model 128 or 704) and deliver the challenge that best suits the broad possible sensor output that may be provided by the device. In some embodiments, the verification server may determine that a challenge best suits a device based on the verification serving determining with high confidence that the sensor-rich device can successfully complete the challenge. In some embodiments, a TEE is implemented in the XR equipment to protect the bio-mechanical data (e.g., to prevent it from being "sniffed" by hackers or to prevent it from being provided by spoofed XR equipment). For example, a trusted application (TA) (e.g., a secured application that may operate within the TEE) may lock one or more sensors and/or peripherals of the sensor-rich device that specified in the challenge, record and encrypt the data feed originating from these sensors/peripherals (e.g., the data feed for completing the verification challenge), and send the encrypted data to the verification server. The verification server may then decrypt the data and feed into a model (e.g., trained model 154 or 704). In some embodiments, the TA or TEE may duplicate or share the sensor/peripheral data feed with a different application (e.g., an unsecured application or an application operating within an REE) such that the different application may perform non-sensitive yet critical functions such as perspective-accurate rendering (e.g., to provide a user with visual, auditory, or tactile feedback of their actions while completing a verification challenge). In some embodiments, the verification server provides for receiving a human authentication signature (e.g., to be used as a password or as an input of an MFA challenge), where the signature may include multiple concurrent and/or sequential gestures, and provides for a model (e.g., trained model 154 or 704, or gesture recognition model 1114) that recognizes the entire signature based on the multiple concurrent and/or sequential gestures. In some embodiments, multiple gestures are performed concurrently and processed sequentially (e.g., to reduce computational burden and/or memory utilization), such that a single recognition model may be used to recognize each individual gesture based on a respective set of model weights (and/or another adjustable model parameter or parameter set) that are applied for each individual gesture. Thus, the model for recognizing the entire signature may include at least one adjustable parameter (e.g., a weighting, layer size, activation function, memory setting, or other suitable model parameter) that is respectively adjusted to recognize each gesture of the entire sequence.

In some embodiments, the present disclosure may protect entities delivering 3D experiences from disruption due to the presence of bots, unauthorized (e.g., not registered), or otherwise undesired users. For example, an application may want to permit only humans to take a tour of a 3D environment (e.g., a house, a rental unit, a vehicle, a park, a commercial space, an area, or any other suitable 3D environment), and the present disclosure may provide solutions to verify that only human users are permitted access to the 3D environment. In some embodiments, the verification server additionally offers secured features to verified users (e.g., offerings for sale, for making bookings, for joining groups, for accessing members-only promotions, for accessing limited-availability spaces, other suitable offerings, or any combination thereof).

Figure 4:
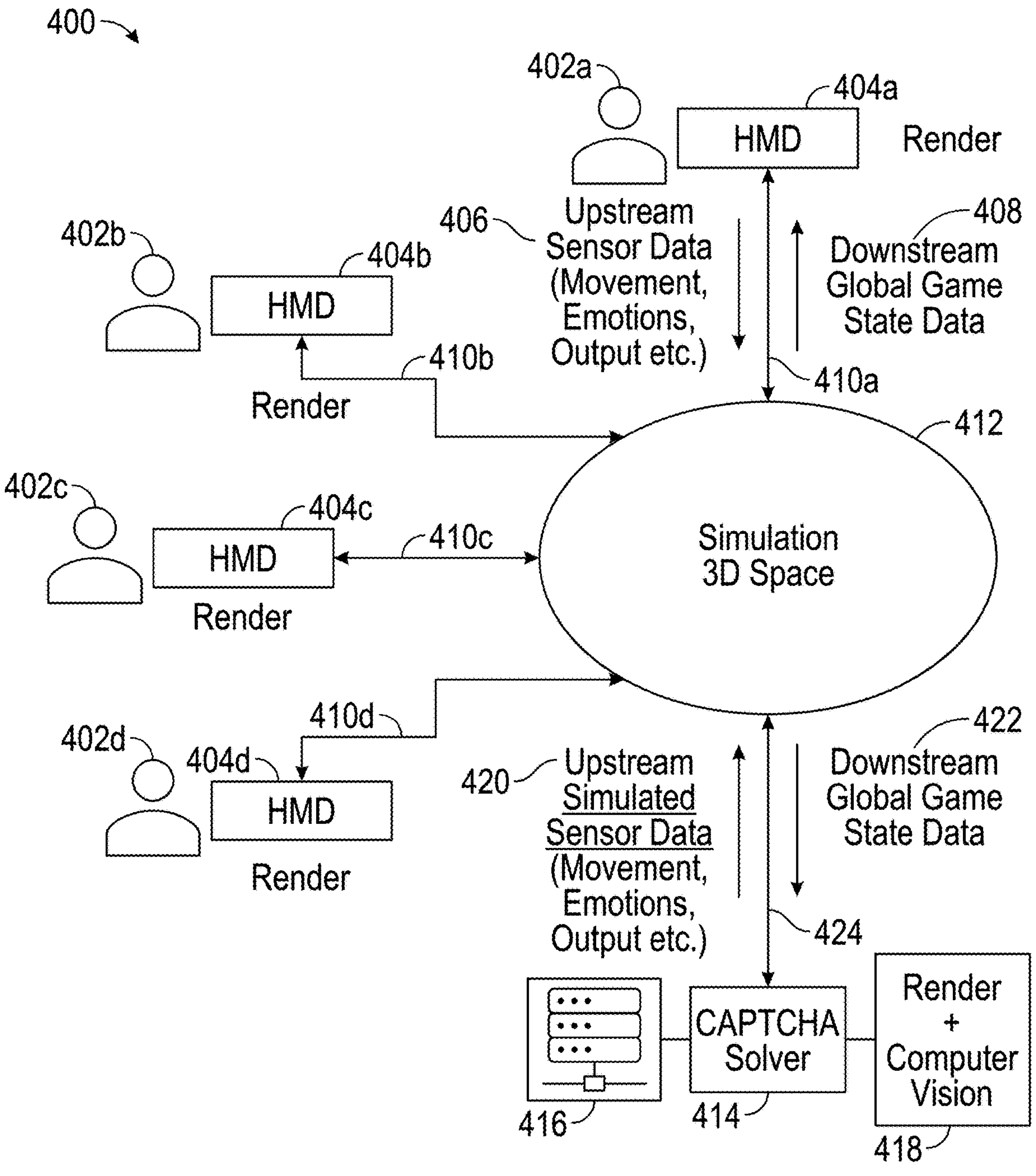
FIG. 4 shows an illustrative system architecture for accessing a three-dimensional (3D) space, in accordance with some embodiments of this disclosure.

FIG. 4 shows an illustrative system architecture for accessing a three-dimensional (3D) space, in accordance with some embodiments of this disclosure. In some embodiments, the system architecture protects against the bot attack/threat model as depicted in FIG. 4. In some embodiments, user 402, HMD 404, and simulation 3D space 412 may respectively correspond to user 102, user device 104, and 3D world app 106. As shown, multiple users 402, each with a respective head-mounted display (HMD) 404 (or other suitable sensor-rich device), may send upstream sensor data 406 (e.g., movement, emotions, responses to prompts, other suitable sensor data, or any combination thereof) to the simulation 3D space 412 and may receive downstream global data 408 (e.g., game state data, environment access data, user data, XR/VR/AR data, any other suitable data, or any combination thereof) via communications channels 410. For example, a host of the simulation 3D space 412 may provide the space for entertainment, commerce, social networking, or other suitable tasks.

In some embodiments, users 402 use HMDs 404 to send upstream sensor data 406 (e.g., head position, limb position, emotions, eye gaze direction, heart rate, other control inputs that affect the simulation, or any combination thereof) to the simulation 3D space 412. The simulation 3D space 412 processes the data obtained from one or more users 402 and sends downstream global simulation state data 408 to the HMD 404 or related equipment (e.g., controllers or other physiological sensors). This state data 408 may be used by the HMD 404 equipment to render (e.g., as shown by the "Render" label) a 3D scene back to the user 402 from their current perspective. An attacker (e.g., CAPTCHA solver 414) attempts to impersonate a human. For example, the attacker (e.g., a bot, hacker, or other malicious entity) provides simulated sensor data 420 (e.g., which is intended by the attacker to be indistinguishable from upstream sensor data 406) to the simulation 3D space 412, even though there is no real human movement or actuation behind this simulated sensor data. Thus, CAPTCHA solver 414 attempts to spoof the presence of a real human by creating the fake simulated sensor data 420. In response to providing simulated sensor data 420, if CAPTCHA solver 414 is not identified as an unverified and unauthorized user, then it will receive downstream global game state data 422 (which may correspond to downstream global game state data 408 and may include an image or other human-decodable puzzle). CAPTCHA solver 414 may then use processing equipment 416 and render+computer vision architecture 418 to understand and solve the verification challenge. In some embodiments, CAPTCHA solver 414 may iteratively modify and transmit sensor simulation data to the simulation 3D space 412 to "visually" search the 3D space, use scene metadata received in the simulation state, or otherwise leverage downstream global game state data 422 to determine an answer to the verification challenge. Without a verification server to provide enhanced security, the CAPTCHA solver 414 may successfully access the simulation 3D space 412. In other instances where CAPTCHA solver 414 fails to access the simulation 3D space 412, without a verification server to provide enhanced security, the CAPTCHA solver may waste resources of the 3D space (e.g., 3D world server 114) during iterative transmission of simulated sensor data 420.

In some embodiments, the verification server may leverage behavioral analysis in 3D portals to provide enhanced security of verification challenges. Such behavior analysis may capture sensor data from a sensor-rich device and then determine human activity using one or more models (e.g., one or more trained model 154 or 704, or gesture recognition model 1114) that are multi-input (e.g., may consider data that is simultaneously recorded by numerous sensors) and are tailored to detect responses that are generated by humans.

In some embodiments, by causing the verification to be executed within a TEE, the verification server may protect against the inherent vulnerability wherein attackers may easily compromise embedded sensors of a sensor-rich device. For example, operation within the TEE (e.g., based on requirements from the verification server or based on operating with a secured application provided by the verification server) may prevent attackers from gaining access to the peripherals (e.g., sensors or other devices connected to the core computing unit of the sensor-rich device) that generate the sensor data. As a result, the verification server may prevent attackers from replacing real sensor data with fake simulated data. In some approaches, the TEE protects against inherent peripheral vulnerability using hardware-based approaches, software-based approaches, firmware-based approaches, network-based approaches, or any combination thereof. Based on the architecture of the TEE, even if attackers gain physical access to a user device (e.g., user device 104), they cannot inject simulated sensor data to complete a verification challenge because a TA operating within the TEE would have locked the relevant one or more sensors, thereby preventing such an injection from occurring or returning an error should such an injection occur.

Figure 5:
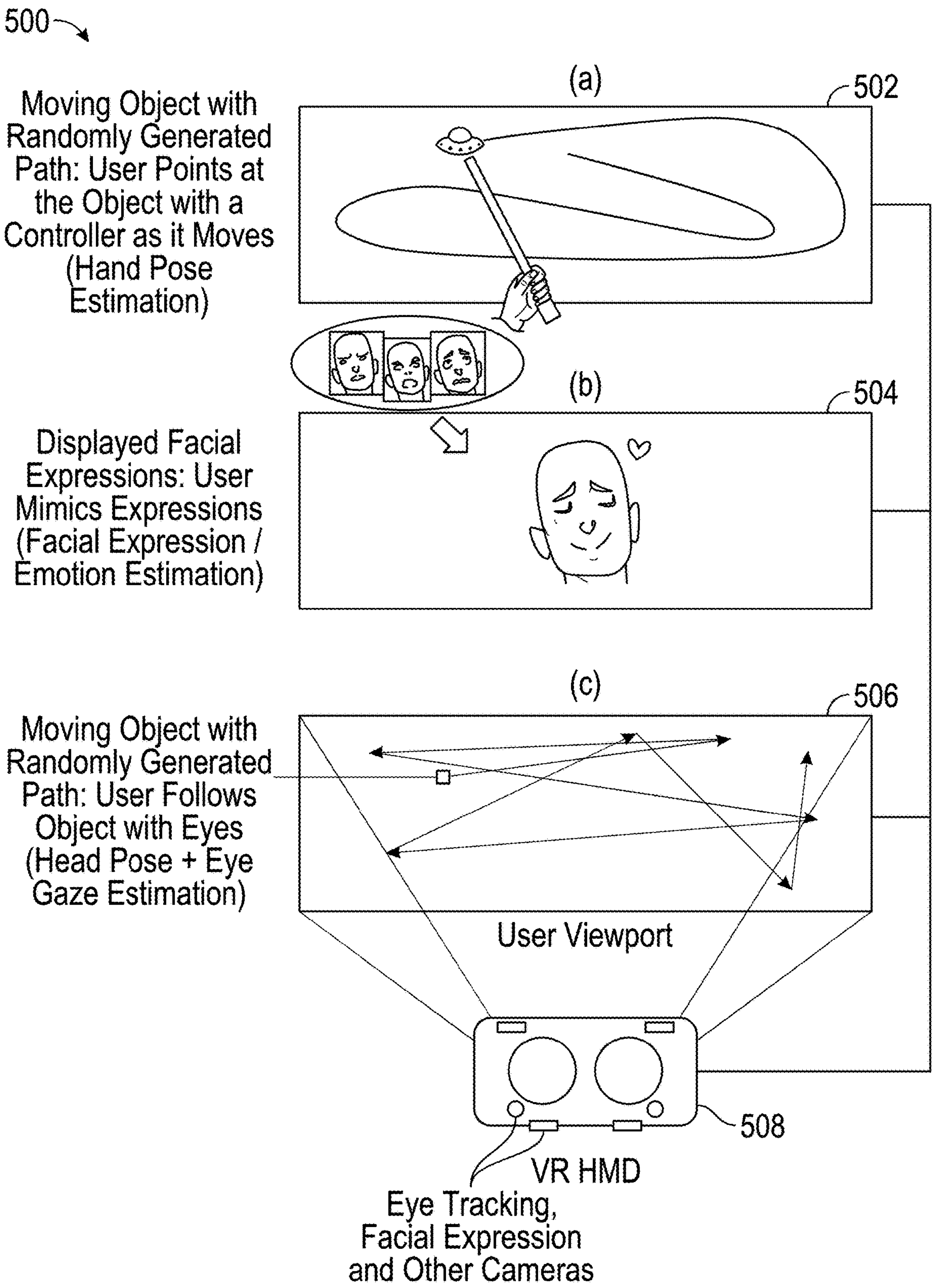
FIG. 5 shows illustrative examples of 3D verification challenges, in accordance with some embodiments of this disclosure.

FIG. 5 shows illustrative examples of 3D verification challenges, in accordance with some embodiments of this disclosure. In some embodiments, the challenges of FIG. 5 are stored in challenge database 126 and may correspond to the CAPTCHA challenges 130 or 142. These illustrative examples include, but are not limited to, challenge 502 (e.g., a haptic challenge prompting the user to trace a displayed trajectory), challenge 504 (e.g., a facial-recognition challenge prompting the user to replicate displayed facial expressions), and challenge 506 (e.g., a gaze-tracking challenge prompting the user to follow a displayed trajectory with their eyes). All of these challenges (and any related verification challenges, e.g., those using a sequence of gestures) may be performed by a user (e.g., user 102) on a user device (e.g., user device 104, user equipment 208, HMD 402, or VR HMD 508), where the user device is sensor-rich, 3D-enabled, or otherwise equipped to render the challenge prompt and record data that is used to successfully complete the challenge. All of these challenges (and any related verification challenges, e.g., those using a sequence of gestures) may be evaluated by a verification server using a model (e.g., trained model 154 or 704, or gesture recognition model 1114) that is configured to determine whether the sensor recorded data that suitably completes the challenge. In some embodiments, the verification sever may provide the model to a user device (e.g., user device 104) or a server of an application (e.g., 3D world server 114) such that more localized verification may be executed. When providing the model to a user device or a server of an application, the verification server may provide a sufficiently small and tractable model, such that it may be executed on a device without overly burdening memory, graphical processing, or computational units of the device.

In some embodiments, the rendering of challenges 502 and/or 506 (e.g., based on data provided by the verification server) involves generating an object on a screen of a sensor-rich device that moves unpredictably (e.g., at random in a 3D environment). In some embodiments, the random movement is only in a fixed 2D plane (e.g., through x- and y-dimensions), while in other embodiments, the random movement is through a 3D environment (e.g., through x-, y-, and z-dimensions, including includes movement in depth). In some embodiments, the verification server uses information about the device requesting the verification challenge (e.g., information about device sensors 110) as inputs to a model (e.g., trained model 128 or 704) that determines the verification challenge (e.g., choosing any one or more of the challenges shown in FIG. 5 or any related challenge, and/or tuning an aspect of the challenge including the number of dimensions through which movement occurs). For example, to complete verification challenge 502, the verification server may require the user to track movement of a rendered object with a mechanical response (e.g., pointing a finger, providing another suitable hand- or finger-based gesture, tracking on a controller or other haptic sensor, nodding a head, or any other suitable mechanical response). For another example, to complete verification challenge 506, the verification server may require the user to track movement of a rendered object with their eye gaze. In some embodiments, though not explicitly shown in FIG. 5, more than one object may be displayed in a verification challenge (e.g., where a user is prompted to track a specific one of multiple objects) or more than one controller may be used for sequential or simultaneous sensor data collection.

In some embodiments, challenge 504 prompts the user with facial expressions (e.g., that are unpredictably or randomly selected from a database of possible facial expressions) that they have to mimic. In response to the user making the facial expressions, the verification server may evaluate the corresponding sensor data (e.g., a video recording of the user's facial expression) to determine whether the user made the prompted facial expressions (e.g., using trained model 154 or 704, or gesture recognition model 1114). In some embodiments, challenge 504 additionally or otherwise prompts the user to make certain poses (e.g., including a position of the hands, feet, arms, legs, torso, head, neck, any other suitable body part, or any combination thereof). In response to the user attempting to replicate the certain poses, the verification server may evaluate the corresponding sensor data (e.g., movements recorded by controllers and/or trackers) to determine whether the user properly reproduced the prompted poses. In some embodiments, the collected sensor data may include expressions that the verification server determines based on an emotion detector that operates on camera data focused on the human face, or based on a position detector that operates on pose data from the HMD, controllers and other trackers. In some embodiments, the verification server makes such determinations (e.g., that the proper facial expression or pose was provided) based on comparison of the recorded data to the specific prompts.

In some embodiments, as another type of verification challenge that leverages data pertaining to facial expressions and/or emotions, the verification server may display content to the user that is expected to elicit certain emotions or reactions. In response to displaying the content, the verification server may determine whether the expected emotions or reactions were elicited (e.g., based on the facial expression and/or emotion data). In the aforementioned challenge and any other suitable challenges, additional physiological parameters (e.g., heart rate, perspiration, body temperature, oxygen saturation, exhalation properties, and other suitable physiological parameters) may also be measured by the user device and processed by the verification server to determine the presence of a human and/or of a specifically authorized human user.

In some embodiments, as another type of verification challenge that leverages data pertaining to facial properties, the verification challenge may include measuring pupil dilation in response to a reduction in lighting (or vice versa). For example, if the verification challenge occurs on an XR, VR, AR, or other 3D-enabled device in which the lighting on a user display can be controlled, the verification server may cause the lighting to be altered and then verify a user based on determining whether pupil dilation or pupil miosis was recorded as expected. Additional involuntary physiological reactions (e.g., saccadic eye movement, a blink rate, reacting to sudden movements, salivating, twitching, and other suitable physiological reactions) may similarly be used by the verification server to determine whether a human is behind a given verification request. As mentioned above, such challenges may be administered without a prompt and may automatically verify a user after they have done something to initiate a verification challenge (e.g., opening an application).

In some embodiments, the verification server may measure an involuntary human response without the verification sever causing any corresponding content to be displayed. For example, in response to the user requesting access to an authorized 3D space, the verification server may automatically prompt sensors of the user device to begin recording one or more physiological properties (e.g., saccadic eye movement, a blink rate, an iris scan, a facial structure, a posture, a skin tone, or any other physiological property) specific to a human presence or specific to the particular user. Thus, the verification server may verify a user (e.g., as having successfully completed a CAPTCHA or MFA challenge) based on the data that is recorded automatically (e.g., without requiring any active input from the user).

Figure 6:
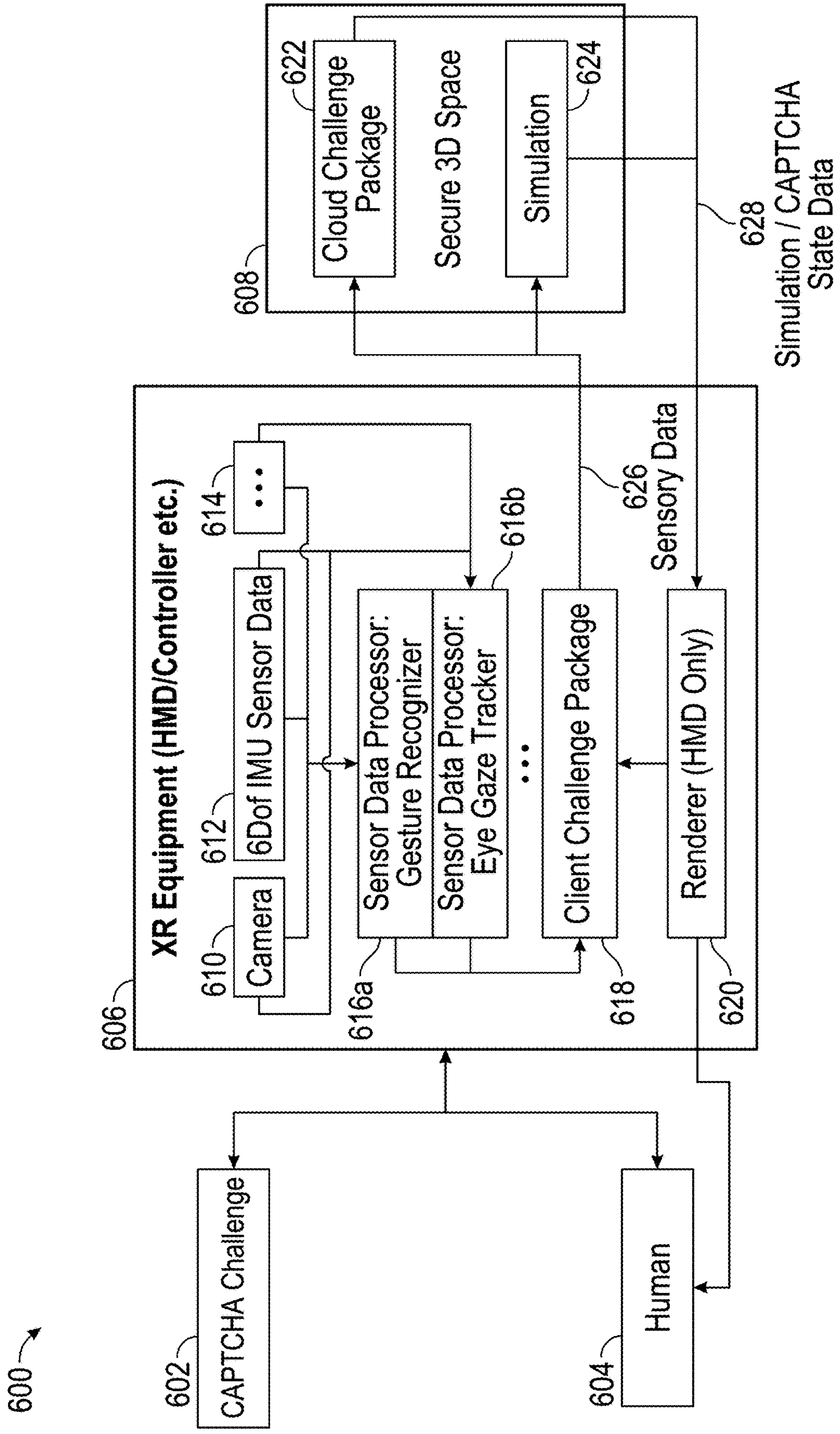
FIG. 6 shows an illustrative architecture for accessing a 3D space using a sensor-rich device, in accordance with some embodiments of this disclosure.

FIG. 6 shows an illustrative architecture for accessing a 3D space using a sensor-rich device, in accordance with some embodiments of this disclosure. While FIG. 6 specifically depicts an implementation in which the verification challenge is a CAPTCHA challenge, this specific type of verification challenge is merely used for illustrative purposes, and the illustrative architecture may be used for any suitable verification challenge (e.g., CAPTCHA, MFA, other suitable verification challenges, or any combination thereof). In some embodiments, CAPTCHA challenge 602 may correspond to CAPTCHA challenge 142 or any one or more of those described above in connection with FIG. 5. In some embodiments, human 604 may correspond to user 102. In some embodiments, XR equipment 606 may correspond to user device 104. In some embodiments, secure 3D space may correspond to 3D world app 106 and/or 3D world server 114. In some embodiments, the sensor data processors 616 and the client challenge package 618 may be provided by the verification server to the XR equipment 606 (e.g., for executing localized verification, as described above).

In some embodiments, in response to receiving CAPTCHA challenge 602 (e.g., based on a request or other input from human 604), the verification server may cause a component of the XR equipment 606 (e.g., a HMD, controller, camera other suitable sensor, or any combination thereof) to begin collecting user sensory data in a secure manner. The sensory data may be recorded from device sensor systems that record dynamic properties of the human 604 (such as head, limb, or other pose data from IMU 612, eye gaze direction or blink rate from IR camera 614, emotions from a camera that may focus on the human's facial features, and other physiological sensors configured to detect parameters including heart rate, skin response, perspiration, body temperature, related physiological parameters, or any combination thereof) rather than dynamic properties of the environment. For example, outward facing sensors (e.g., a LIDAR sensor or image sensor that is used to capture the environment for related processing, including simultaneous localization and mapping) may not be used because they are not capturing human response. However, as explained in more detail below, the verification server may use such outward facing sensors to determine an appropriate verification challenge based on environmental conditions (e.g., a density of nearby people, an area of available movement space, an ambient lighting, temperature, humidity, or wind speed, any other suitable environmental condition, or any combination thereof) that may be provided as inputs to a model (e.g., trained model 128 or trained model 704) used for determining a particular verification challenge. In some embodiments, the verification server may use one or more camera views of the environment to determine 6 degree-of-freedom human movement (e.g., based on analyzing optical data flow across video frames of a static scene with stationary objects) and correspondingly provide a verification challenge and/or determine whether recorded data successfully completes a verification challenge.

In some embodiments, the verification server may cause the sensor data from XR equipment 606 to be sent "raw" to on-device CAPTCHA challenge client package 618 (e.g., as provided by the verification server to the device), or it may be processed by any one or more of software packages 616 (e.g., the Gesture Recognizer, or the Eye Gaze Tracker) (e.g., as provided by the verification server to the device) prior to being received by the client package 618. The verification server may also cause client package 618 to send the sensor data (or a determination that was made based on the sensor data) in a secure manner to the CAPTCHA challenge cloud package 622 for analysis and determination of a human presence. In some embodiments, simulation state data is used (e.g., by renderer 620) to render a CAPTCHA challenge or otherwise support the verification process. For example, the simulation state data and the CAPTCHA data 628 may be shared between XR equipment 606 and the secure 3D space 608 via the communication link as shown in FIG. 6.

In some embodiments, the verification server causes the client challenge package 618 to lock one or more sensors (e.g., where the one or more sensors may correspond to any one or more of device sensors 110) of XR equipment 606 (e.g., where the locking may correspond to the process at 136, as shown in FIG. 1). The one or more sensors that are "locked" by the client challenge package 618 include at least that which is needed to record data and successfully complete the verification challenge (e.g., based on an analysis of the recorded human behavior or based on authenticating the recorded user as being who they say they are). In some embodiments, these sensors may be important for rendering the global simulation state (e.g., maintain the feel and immersion of simulation 624), such that the verification server may cause the sensor data to be shared with XR equipment 606 (e.g., as described above and as further described below in connection with FIG. 18).

In some embodiments, the verification server may require that the client challenge package 618 receives information about XR equipment 606 (e.g., a model number, a list of available sensors, a type of display, an IP address, processing capabilities any other suitable information, or any combination thereof) such that the client challenge package appropriately determines a CAPTCHA challenge (e.g., using a model provided by the verification server, such as model 154 or model 704). A critical factor that the verification server (or a secured application provided by the verification server) considers when determining a challenge is whether XR equipment 606 has the capabilities to collect the sensor data that is needed for completing that specific challenge. In some embodiments, the verification server leverages a large training data set containing information about a particular one or more sensors or peripheral devices (e.g., as are associated with XR equipment 606 or any other relevant user device) when determining the one or more sensors and the corresponding verification challenge from a larger set of sensor options and possible verification challenges (e.g., as provided in challenge database 126). In some embodiments, the verification server provides a minimum threshold for the probability of success (e.g., as described above and below, at least in connection with FIGS. 13 and 17) when determining the one or more sensors and the corresponding verification challenge from a larger set of sensor options and possible verification challenges (e.g., as provided in challenge database 126).

Figure 7:
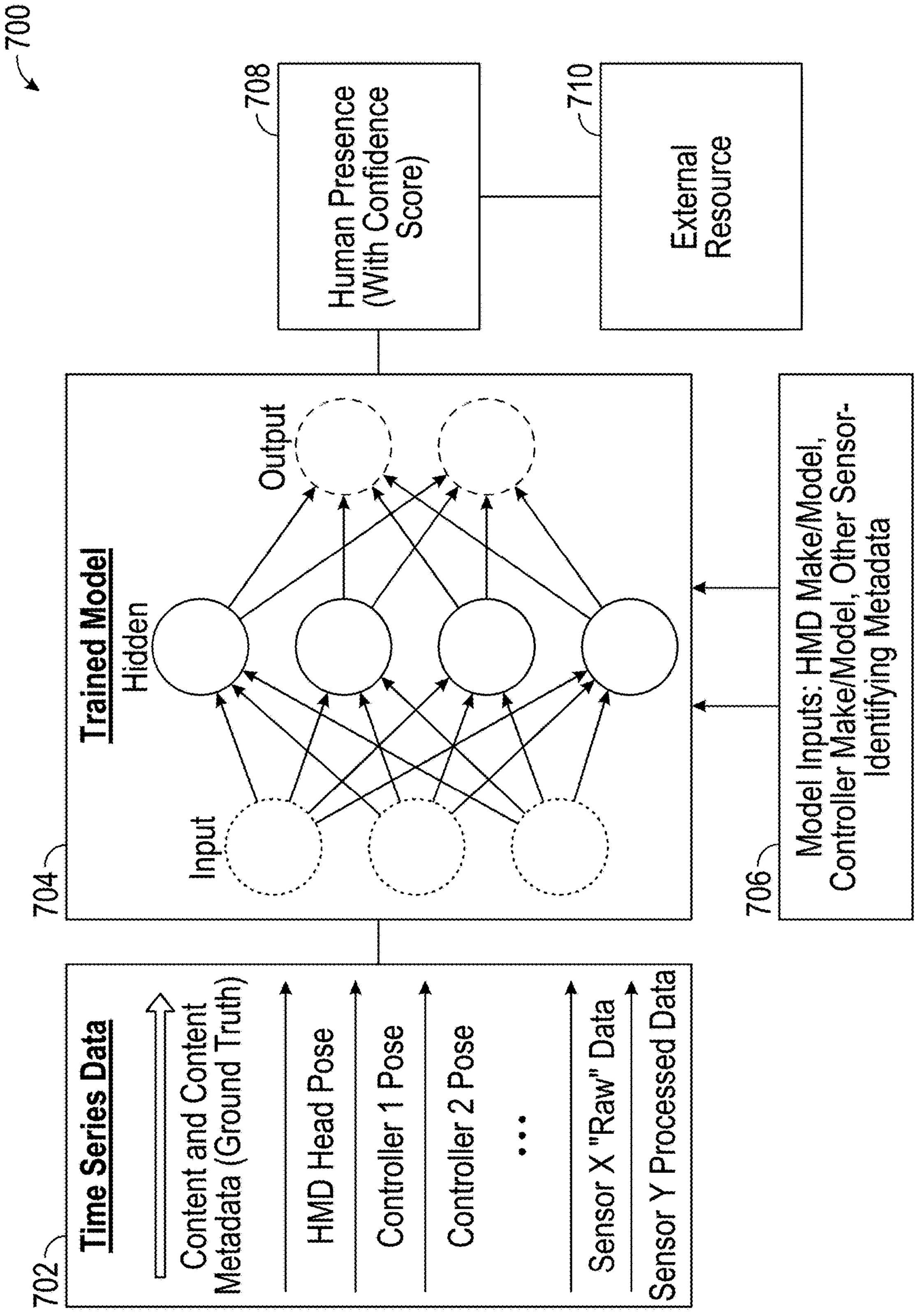
FIG. 7 shows an illustrative model for determining presence of a human, in accordance with some embodiments of this disclosure.

FIG. 7 shows an illustrative model for determining the presence of a human, in accordance with some embodiments of this disclosure. In some embodiments, trained model 704 may correspond to trained model 128, trained model 154, or gesture recognition model 1114. In some embodiments, trained model 704 may be trained at the verification server and configured by hosts, controllers, managers, operators, or software of the verification server. In some embodiments, trained model 704 is shared with a user device (e.g., user device 104, XR equipment 606, user equipment 208, HMD 404, VR HMD 508, or any other suitable device). For example, each sensor data processor 616 may include a trained model 704 (e.g., where each respective processor has a respective trained model 704, or where each respective processor is configured to adjust one or more parameters of trained model 704, such that the trained model is adjustably configured to execute the desired processing steps of each respective processor). In some embodiments, trained model 704 is a supervised learning deep neural network (DNN), a convolutional neural network (CNN), a recurrent neural network (RNN), a linear regression, logistic regression, decision tree, support vector machine (SVM) algorithm, Bayes algorithm, k-nearest neighbor (KNN) algorithm, K-means algorithm, random forest algorithm, or any other statistical or AI/ML (e.g., supervised or unsupervised) architecture. In some embodiments, as shown, trained model 704 receives as inputs time series data 702 and model inputs 706 and generates as an output a determination of a human presence 708 (with confidence score). In other embodiments, the trained model 704 may generate as an output a determination that a human is who they say they are (with confidence score) or another suitable determination that can be used for any verification or authentication process (e.g., CAPTCHA, MFA or other related processes).

In some embodiments, time series data 702 and model inputs 706 respectively include all the sensor data and device metadata that are needed to determine and complete a verification challenge. For example, model inputs 706 may include the make/model of a sensor-rich user device, the make/model of a controller or other sensor connected to the sensor-rich user device, functional sensor properties corresponding to these model inputs, any other sensor-identifying metadata, or any combination thereof. In some embodiments, trained model 704 may use at least model inputs 706 to determine a suitable verification challenge (e.g., using the techniques described above and further descried below). For example, time series data 702 may include content and content metadata (e.g., ground truth data), where the content and content meta data may include any combination of contextual information of the 3D space (e.g., 3D world app 106, simulation 3D space 412, or secure 3D space 608), background signals of the sensors, or any other relevant data. Time series data 702 may additionally include sensor data corresponding to a verification challenge (e.g., a HMD head pose, one or more controller poses, raw sensor data, processed sensor data, physiological data, biometric data, any other suitable sensor data, or any combination thereof). In some embodiments, trained model 704 may use at least time series data 702 to determine whether sensor data indicates successful completion of a verification challenge.

In some embodiments, to determine human presence 708 with high confidence, the trained model 704 is trained on labeled data that is collected from real human responses. In some embodiments, the trained model 704 is further trained on labeled data that is collected from artificial, spoofed, bot-generated, or related responses created by attackers, or that is generated by the verification server (or an entity connected to the verification server) to mimic such attacker-generated responses. For example, the training dataset used to train model 704 may include simulated sensor data that is generated by machines attempting to mimic human behavior responses. In a particular example, a CAPTCHA solver bot (e.g., CAPTCHA solver 414) may generate spatial (e.g., IMU) data while following a moving object in the environment, and because this spatial data was generated by a bot, it may pass through a robotic (e.g., not smooth, following a spiral, random, or otherwise unrealistic path, or not having a plausible reaction time) trajectory toward arriving at a destination coordinate. Thus, the verification server establishes trained model 704 such that it can determine whether verification challenge data is provided by intentional human movement or unauthorized sources. In some embodiments, the verification server shares the human presence 708 determination with external resource 710 (e.g., 3D world app 106, 3D world server 114, simulation 3D space 412, secure 3D space 608), such that a user is granted access to at least one aspect of external resource 710 in response to a successful verification outcome.

In some embodiments, as mentioned above and as further described below, the verification server loads the trained model 704 onto a local user device after the verification server has trained and validated the trained model. In these embodiments, the sensor data does not need to be sent to the verification server challenge cloud module; rather the evaluation of the verification challenge is executed by the user device (e.g., on device secured app 108 or trusted app (TEE) 1006). Furthermore, the verification server may load a given user device with a particular trained model 704 that is specific to the make/model of the user device (e.g., based on model inputs 706). In some embodiments, the verification server may generate a respective trained model 704 corresponding to each respective make/model of a user device. In other embodiments, the verification server may generate a trained model 704 with one or more adjustable parameters (e.g., a weighting, layer size, activation function, memory setting, or other suitable model parameter) where a respective configuration of the adjustable parameters corresponds to a respective user device, and the multiple possible configurations of the adjustable parameters corresponds to multiple possible user devices. Based on this specificity of the trained model 704, the verification server is able to deliver accurate and highly confident verification challenges to many possible user devices.

In some embodiments, the verification server is configured to provide a secure system (e.g., one that is invulnerable to modification or attacks by a bot/solver, whether assisted or unassisted by a human) for verification. For example, the verification server may securely determine a verification challenge and may configure the user device to provide secure sensor data for executing the verification challenge. Security features of the verification server include, but are not limited to: collecting sensor data in a secure manner; processing sensor data in a secure manner; sending verification challenges (e.g., to the user device) in a secure manner; receiving sensor data (e.g., from the user device, where the data is for completing a verification challenge) in a secure manner; and sending trained models (e.g., to the user device or a third-party server) in a secure manner.

In some embodiments, the verification sever provides secure infrastructure for at least collecting and processing sensor data by causing a Trusted Application (TA) (e.g., device secured app 108, or the applications shown within Global Platform Device (GPD) TEE 804 or TEE 904) to execute on the user device. As described above and as further described below, the TA is configured to lock peripheral and internal sensors into an exclusive operating mode wherein the sensor data may only be received by the TA. In some embodiments, the verification server causes the TA to execute inside a special isolated region (e.g., a trusted execution environment (TEE), such as GPD TEE 804 of TEE 904) of the user device. When operating on a user device, the verification server will cause an operating system of the user device to configure the TEE such that it can secure access to peripheral and internal sensors of the device (e.g., the sensors including cameras IMUs, thermostats, microphones, haptic sensors, any other suitable sensors, or any combination thereof). The verification server will cause the TEE to be instantiated using an area on the main processor of the user device that is separated from the main operating system (OS) of the user device. Using this infrastructure, the verification server provides a secure environment to record, process, and store data. In some embodiments, the verification server may act as or otherwise instruct a trusted application manager (TAM) that is a part of the TEE or otherwise manages the TEE. Through the TAM, the verification server and/or a device administrator (e.g., that operates on instructions from the verification server) may install and remove untrusted applications and TAs, approve or reject trust anchors (e.g., within a TA or TEE), approve or reject TA developers, or enact other suitable management policies to maintain a desired level of security. For example, the verification server and/or device administrator may manage the list of allowed TAMs by modifying a list of Trust Anchors on the device. The verification server and/or device administrator may maintain security through local intervention of the user device, remote intervention of the user device, or any combination thereof.

In some embodiments, the verification server places the peripheral or internal device sensor access into a secure environment (e.g., device secured app 108, or any suitable TA or TEE) to provide a barrier to attackers (e.g., bots, hackers, malicious entities, CAPTCHA/MFA solvers, or any other entity attempting to breach a security protocol) that may attempt to synthetically generate the data to pass the challenge. Therefore, the verification server may defend against attackers that spoof hardware data.

FIG. 8 shows illustrative execution environments for enhanced-security applications, in accordance with some embodiments of this disclosure. With particular reference to FIGS. 1 and 6, the peripherals and internal sensors (e.g., device sensors 110) of the user device may be locked by a TA during completion of a verification challenge, while the sensor data processing modules (e.g., sensor data processors 616) and other verification software operating on the user device (e.g., client challenge package 618) may be deployed by the verification sever as TAs. As shown in FIG. 8, the verification server may divide the Platform Hardware 806 of a device (e.g., user device 104, XR equipment 606, user equipment 208, HMD 404, VR HMD 508, or any other suitable device) into Public Peripherals (e.g., which are insecure and controlled by Rich Execution Environment (REE) 802), as shown on the left, Trusted Peripherals (e.g., which are managed by TEE), as shown on the right, and Shared Trusted Peripherals (e.g., which may be used by the REE only under the permission of a TEE firewall), as shown in the center. In some embodiments, the verification server requires that a sensor providing data for a verification challenge, either directly or indirectly (e.g., after post-processing by a TA), be a Trusted Peripheral or a Shared Trusted Peripheral. Because a TEE includes and extends upon other suitable security approaches, such as those including one or more Secure Element (SE), the verification server provides for many possible implementations to protect sensitive data. As shown in FIG. 8, an isolation boundary 808 may be defined by the GPD TEE Protection Profile (PP) and may totally or selectively prevent the REE and/or the Platform Hardware from connecting to (e.g., sharing data, sharing hardware, sharing software, securing/releasing devices, performing any other suitable task, or any combination thereof) the GDP TEE.

FIG. 9 shows illustrative socket architectures for enhanced-security applications, in accordance with some embodiments of this disclosure. In particular, FIG. 9 shows an illustrative TEE Socket API Architecture, including REE 902, TEE 904, Platform Hardware 906, and isolation boundary 908. As shown, the verification server configures the socket architecture such that the client has two Paths (e.g., Paths (A) and (B)) for communicating with a server (e.g., 3D world server 114, verification sever 118, server 204, simulation 3D space 412, secure 3D space 608, 3D space API 1008, challenge API 1010, any other suitable server, or any combination thereof) using network resources (e.g., communication network 209). By connecting the Sockets Security (e.g., TLS) to the TEE Communication Agent, the verification server instantiates a Path (e.g., Path (A)) such that the TEE uses TLS or similar transport-level encryption to communicate with the server. Moreover, the verification server permits the TEE Communication Agent operating in the secure environment to communicate with the REE communication agent operating in the unsecure environment (e.g., to exchange messages). Thus, the verification server may permit allowed system/software developers to write holistic applications that have both trusted components (e.g., device secured app 108, or one or more TA operating within one or more TEEs) as well as untrusted components (e.g., 3D world app 106, or any application operating in the REE) that may communicate with each other using the secure architecture provided by the verification server. Returning to Path (A), the verification server may cause the encrypted information to be tunneled by the REE using a socket (e.g., a TCP/UDP socket) to a network node that communicates with the outside world. As shown in Path (B), the verification server additionally provides TCP/UDP socket functionality to the TEE. In some embodiments, the verification server may permit UDP/IP, TCP/IP, and other functionality to occur within the REE without incurring security risks. Thus, the verification server may cause the Sockets Transport to occur in either the TEE, the REE, or both.

In some embodiments, the verification server creates a common source of trust between a server implementing the verification challenge (e.g., 3D world server 114, verification sever 118, server 204, simulation 3D space 412, secure 3D space 608, 3D space API 1008, challenge API 1010, any other suitable server, or any combination thereof) and the user device (e.g., user device 104, XR equipment 606, user equipment 208, HMD 404, VR HMD 508, or any other suitable device) completing the verification challenge. The common source of trust realizes the secure sharing or processed or unprocessed sensor data between the user device and a trained model (e.g., trained model 128, 154, or 704, or gesture recognition model 1114) configured to determine a verification challenge and/or outcome based on sensor data. In some embodiments, the verification server may cause or require the common source of trust to be validated (e.g., by a certification authority or CA). In some embodiments, the common source of trust provides for end-to-end encryption between the sensors of the user device and any software (e.g., deployed locally or at a remote server) operating on data from the sensors of the user device.

Figure 10A:
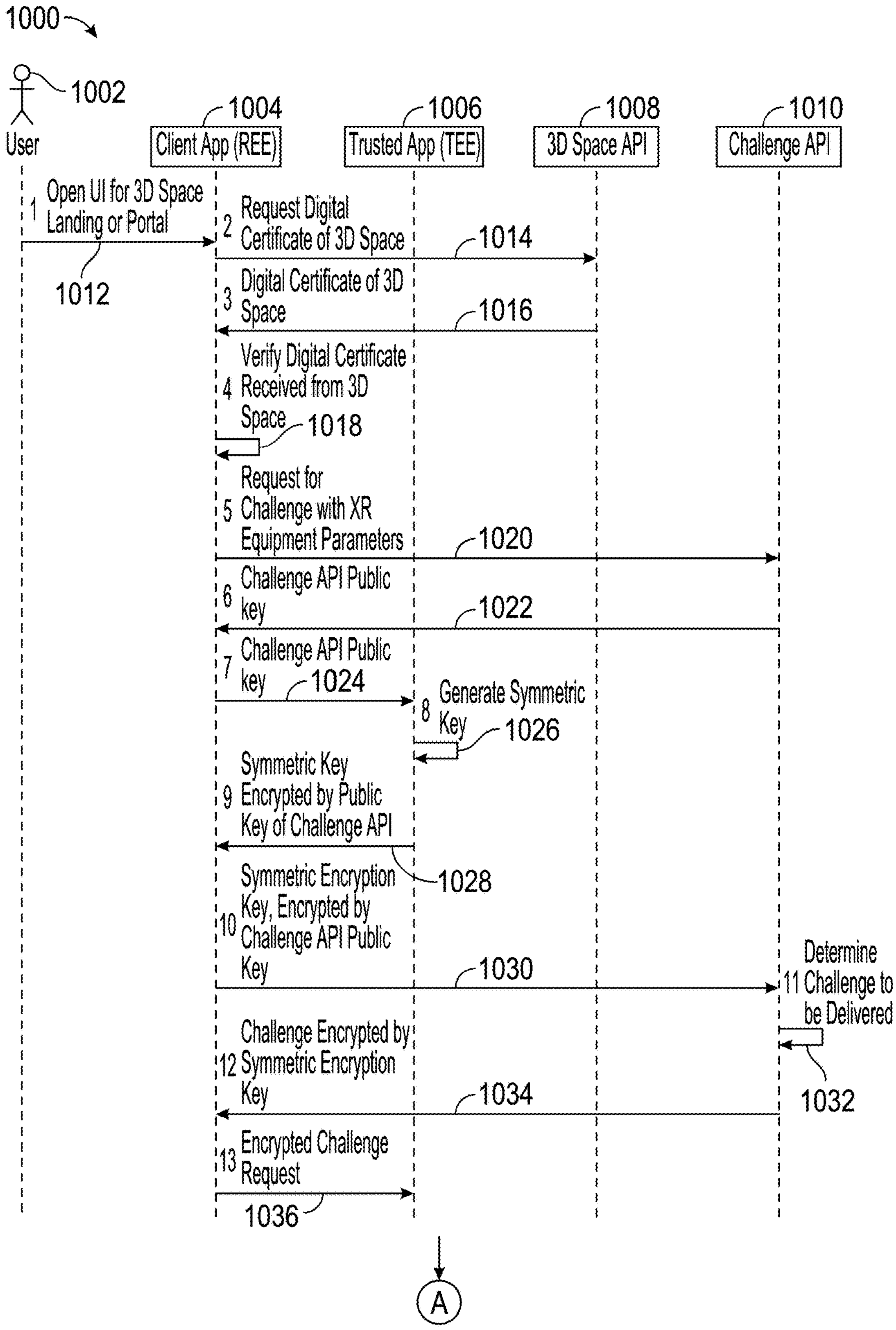
FIG. 10A is a flowchart of an illustrative process for accessing a 3D space with enhanced security, in accordance with some embodiments of this disclosure.
Figure 10B:
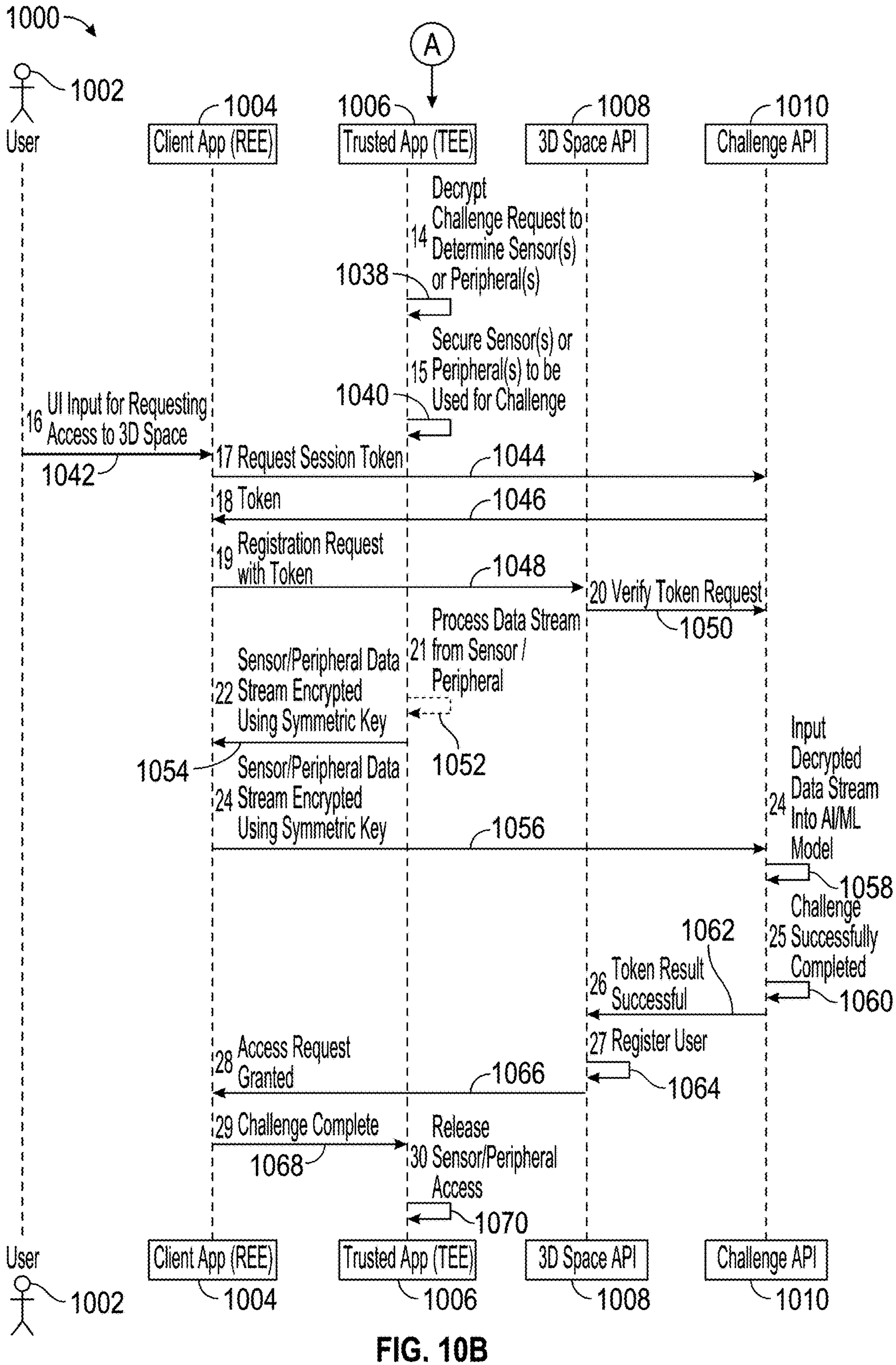
FIG. 10B continues the flowchart of FIG. 10A of an illustrative process for accessing a 3D space with enhanced security, in accordance with some embodiments of this disclosure.

FIG. 10 (a designation that is used to include at least the subject matter of FIGS. 10A and 10B) is a flowchart of an illustrative process for accessing a 3D space with enhanced security, in accordance with some embodiments of this disclosure. In some embodiments, the illustrative process of FIG. 10 includes actions that may be executed by user 1002, client app (REE) 1004, trusted app (TEE) 1006, 3D space API 1008, and challenge API 1010. In some embodiments, user 1002 may correspond to user 102, an operator of user equipment 206, 207, 208, 210, 219, and/or 220, user 402, or human 604; client app (REE) 1004 may correspond to 3D world app 106, REE 802, or REE 902; trusted app (TEE) 1006 may correspond to device secured app 108, TEE 804, or TEE 904; 3D space API 1008 may correspond to 3D world server 114, simulation 3D space 412, or secure 3D space 308; and challenge API 1010 may correspond to the verification server (e.g., verification server 118).

In some embodiments, the process of FIG. 10 the challenge API 1010 or a comparable verification server causes the process of FIG. 10 to be executed at a challenge API 1010 server, one or more other servers, a local device, or any combination thereof. Thus, even though certain actions in the process of FIG. 10 may occur at one or more applications or resources that are separate to the challenge API 1010, these actions may occur as a consequence of how the challenge API 1010 is configured to share and/or receive data. In other words, challenge API 1010 may execute a single action which then causes a series of other actions to occur as a consequence of the single action.

In some embodiments, the process of FIG. 10 at 1012 includes user 1002 opening a UI that requires verification (e.g., entering a 3D space, landing, or portal, or instantiating any other suitable application that requires a log-in, verification, authentication, or other suitable certification, or any combination thereof). For example, at 1012, the user may open an application and then have to verify themselves as not being a bot and/or being authorized to access an existing user profile.

In some embodiments, the process of FIG. 10 at 1014 includes client app (REE) 1004 requesting a digital certificate of a 3D space (or other suitable application or digital resource) to which the user desires access. In some embodiments, the digital certificate is requested from 3D space API 1008, as shown; in other embodiments, the digital certificate may be request from challenge API 1010, a certificate authority, or any other secure and suitable certificate provider.

In some embodiments, the process of FIG. 10 at 1016 includes 3D space API 1008 (or another suitable certificate provider) providing the digital certificate of the 3D space to the client app (REE) 1004. Based on client app (REE) 1004 receiving the digital certificate, the client app may be permitted to proceed through the remainder of the process of FIG. 10.

In some embodiments, the process of FIG. 10 at 1018 includes the client app (REE) 1004 verifying the digital certificate received from the 3D space. Based on client app (REE) 1004 verifying the digital certificate, the client app may trust the provider of the certificate and may determine that it is safe to proceed through the remainder of the process of FIG. 10.

In some embodiments, the process of FIG. 10 at 1020 includes requesting a verification challenge with XR equipment parameters. For example, the XR equipment parameters may correspond to data of the device sensors 110. Based on the XR equipment parameters, or other information regarding sensors of the user device executing client app (REE) 1004, the challenge API 1010 may determine a suitable one or more verification challenges to provide.

In some embodiments, the process of FIG. 10 at 1022 includes challenge API 1010 sharing a challenge API public key with client app (REE) 1004. Challenge API 1010 configures the public key sharing such that client app (REE) 1004 provides the challenge API public key to trusted app (TEE) 1006 at 1024. In some embodiments, client app (REE) 1004 is equipped with networking equipment and communications capabilities, whereas trusted app (TEE) 1006 is not, such that the trusted app may only share/receive data from the challenge API 1010 via the client app. In some embodiments, an encryption scheme is described as follows such that the trusted app (TEE) 1006 can share/receive data via the client app (REE) 1004 without that data being accessible to the client app.

In some embodiments, the process of FIG. 10 at 1026 includes trusted app (TEE) 1006 generating a symmetric key. For example, the symmetric key may permit trusted app (TEE) 1006 and challenge API 1010 to freely share data without allowing client app (REE) 1004 or other intervening resources to access the data.

In some embodiments, the process of FIG. 10 at 1028 and 1030 respectively includes trusted app (TEE) 1006 sharing the encrypted symmetric key (e.g., as encrypted by the public key) with client app (REE) 1004, and client app (REE) 1004 sharing the encrypted symmetric key with challenge API 1010. Though not explicitly shown, challenge API 1010 uses a private key (e.g., corresponding to the public key) to decrypt the encrypted symmetric key. Thereafter, challenge API 1010 may encrypt data (e.g., the verification challenge and a determination of whether the user is verified based on a response to the verification challenge) with the symmetric key and thus make the encrypted data available to trusted app (TEE) 1006, while the data remain inaccessible to client app (REE) 1004.

In some embodiments of the process of FIG. 10, at 1032, the challenge API 1010 determines a challenge to be delivered. In some embodiments, challenge API 1010 uses trained model 128 or trained model 704 to determine, based on data indicative of a plurality of sensors of the user device (e.g., device sensors 110 or model inputs 706), which one or more verification challenges to provide to the user 1002. In some embodiments, the challenge is at least one of a CAPTCHA or MFA challenge. In some embodiments, the challenge is any one or more of CAPTCHA challenges 130, CAPTCHA challenges 500, any other challenge described herein, or any other suitable challenge.

In some embodiments, the process of FIG. 10 at 1034 and 1036 respectively includes challenge API 1010 sharing the encrypted verification challenge (e.g., as encrypted by the symmetric key) (e.g., as determined at 1032) with client app (REE) 1004, and client app (REE) 1004 sharing the encrypted verification challenge with trusted app (TEE) 1006.

In some embodiments, the process of FIG. 10 at 1038 includes trusted app (TEE) 1006 decrypting the challenge request to determine one or more sensors or peripherals (e.g., device sensors 110, or one or more sensor of HMD 404, VR HMD 508, or XR equipment 606). For example, the challenge request may include instructions of which one or more sensors are to be used in completing the challenge.

In some embodiments, the process of FIG. 10 at 1040 includes trusted app (TEE) 1006 securing (e.g., locking) the one or more sensors or peripherals to be used in the verification challenge. For example, the action at 1040 may correspond to the action at 136. As mentioned, with the sensors or peripherals secured (e.g., locked), the sensors may only be controlled by the application securing the sensor and data feeds from the sensors may only be available to the application securing the sensor (unless the application securing the sensor shares the data with other applications of the device, as described above and as further below at least in connection with FIG. 18).

In some embodiments, the process of FIG. 10 at 1042 includes user 1002 receiving a UI input for requesting access to the 3D space. For example, user 1002 may be prompted with a message such as "Complete this CAPTCHA", as shown at 140. Therefore, user 1002 may be prepared to provide one or more inputs, gestures, or other data for successfully completing the verification challenge.

In some embodiments, the process of FIG. 10 at 1044 and 1046 includes the client app (REE) 1004 respectively requesting a token session from challenge API 1010 and receiving the token from challenge API 1010. In some embodiments, the process of FIG. 10 at 1048 and 1050 respectively includes the client app (REE) 1040 requesting from 3D space API 1008 a registration with the token, and 3D space API 1008 verifying the token request from challenge API 1010. For example, the actions 1044, 1046, 1048, and 1050 may secure the verification process by creating shared data that is verified by multiple stakeholders (e.g., the client app (REE) 1004, the 3D space API 1008, the challenge API 1010, any other suitable stakeholders, or any combination thereof).

In some embodiments, the process of FIG. 10 at 1052 includes the trusted app (TEE) 1006 processing a data feed from the at least one sensor or peripheral. For example, the data feed may capture an input, gesture, or other action from the user 1002 such that the user is verified as a human and/or who they say they are. In some embodiments, the data feed may include a recording of an environment surrounding the user 1002, a biometric representation of the user 1002, or any other suitable data (e.g., the way user 1002 interacts with the UI input at 1042) that is used toward determining that the user is a human and/or who they say they are. In some embodiments, the process of FIG. 10 at 1052 further includes the trusted app (TEE) sharing the data feed on the client app (REE) 1004 (e.g., such that user 1002 can interactively follow the data provided to complete the verification challenge).

In some embodiments, the process of FIG. 10 at 1054 and 1056 respectively includes the trusted app (TEE) 1006 encrypting (e.g., using the symmetric key) and sharing the at least one sensor or peripheral data with the client app (REE) 1004, and the client app (REE) 1004 sharing the encrypted data with the challenge API 1010. As mentioned, the client app (REE) 1004 receives and shares this data, but is not able to access the contents of the data based on not having access to the symmetric key (or any other suitable key that is used by the trusted app (TEE) 1006 to encrypt the data).

In some embodiments, the process of FIG. 10 at 1058 includes the challenge API 1010 decrypting the data feed and inputting it into an AI/ML model for verifying that the challenge (e.g., the CAPTCHA or MFA challenge) has been successfully completed. For example, the AI/ML model may correspond to trained model 154, trained model 704, or gesture recognition model 1114, and may generate as an output an indicator of a human presence (with confidence score) 708 or an indicator that a human is who they say they are (with confidence score). In some embodiments, the action at 1058 may correspond to the action at 152. In some embodiments, as further described above and below, the AI/ML model is configured to recognize a series of verification challenges, or a series of inputs, gestures, or other dataset corresponding to a signal verification challenge, using a single trained model. For example, the single trained model may be configured with a plurality of sets of adjustable weights, wherein the adjustable weights are adjusted for each challenge or input/gesture/dataset of a series of challenges or inputs/gestures/datasets.

In some embodiments, if the challenge API 1010 verifies that the challenge was successfully completed (e.g., the presence of a human is validated, or the veracity of a human being who they say they are is validated), then the process of FIG. 10 at 1060 includes generating an output indicating that the challenge was successfully completed. As a result, the remaining actions of the process of FIG. 10 are executed such that user 1002 is given access to at least one resource of client app (REE) 1004.

In some embodiments, the process of FIG. 10 at 1062 includes the challenge API 1010 providing to the 3D space API 1008 a token, which is indicative of the challenge having been successfully completed. In some embodiments, the process of FIG. 10 at 1064 includes the 3D space API 1008 registering the user. In some embodiments, the process of FIG. 10 at 1066 includes the 3D space API granting the access request at client app (REE) 1004. In some embodiments, the process of FIG. 10 at 1068 includes the client app (REE) 1004 indicating that the challenge is complete to the trusted app (TEE) 1006. In some embodiments, the process of FIG. 10 at 1070 includes the trusted app (TEE) 1006 releasing access to the secured at least one sensor or peripheral. After the process of FIG. 10 has completed the action at 1070, user 1002 has access to at least one resource of client app (REE) 1004, and the device of user 1002 is fully unlocked/unsecured (e.g., client app (REE) 1004 is permitted to use the device sensors). For example, the user may see a welcome message (e.g., “Welcome to 3D World”).

Figure 11A:
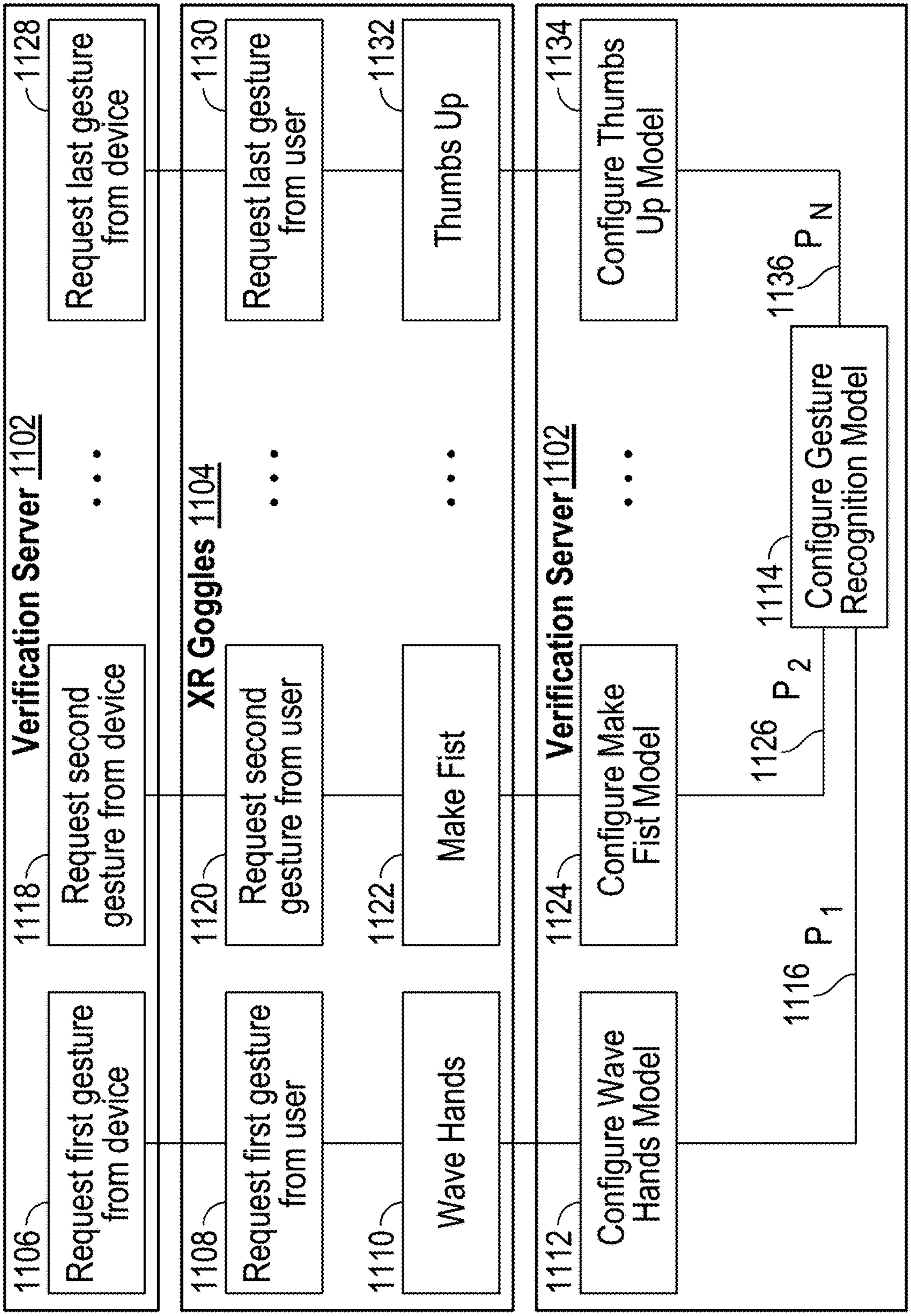
FIG. 11A is a depiction of an illustrative process for recording and analyzing a series of gestures, in accordance with some embodiments of this disclosure.
Figure 11B:
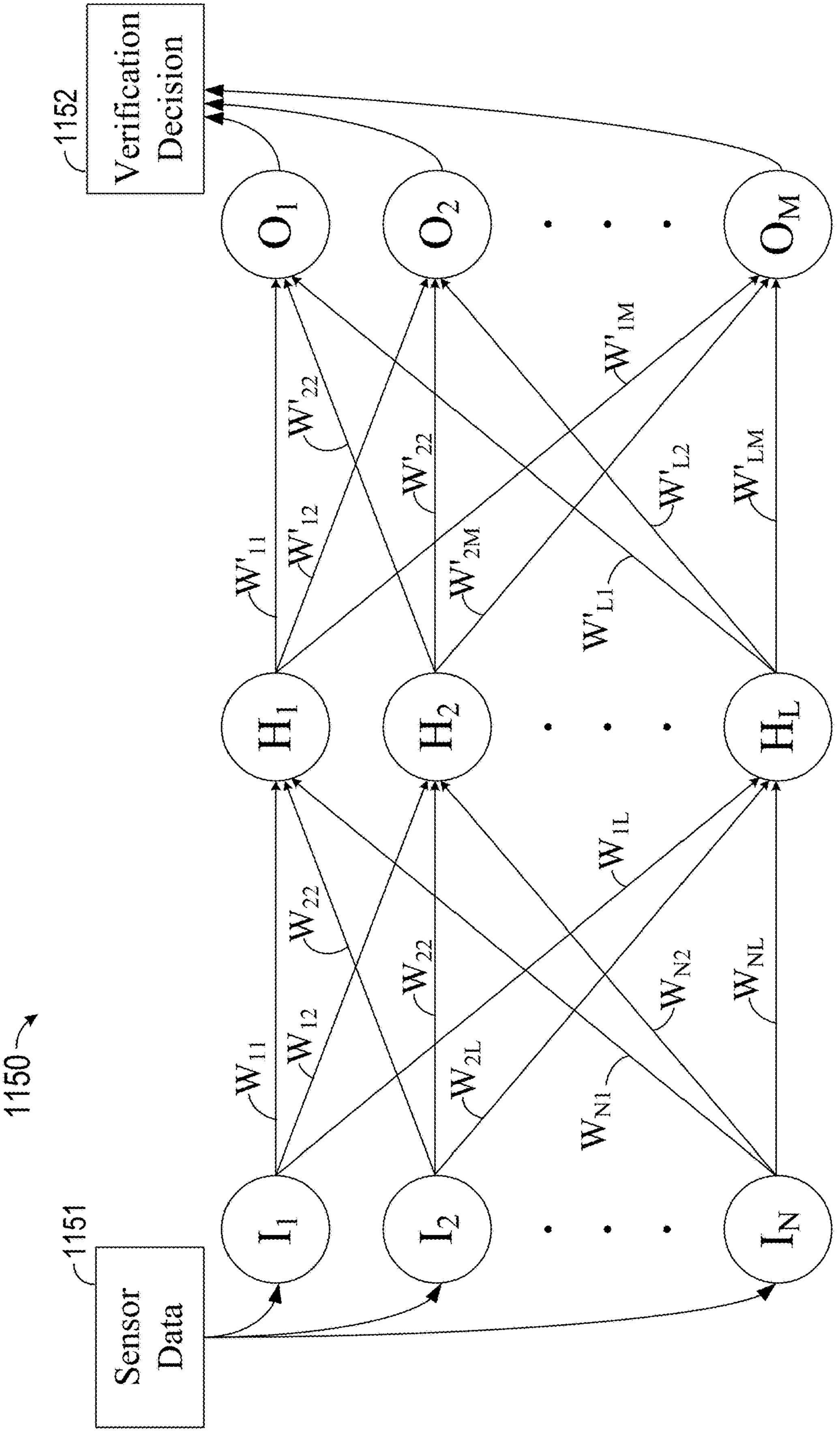
FIG. 11B is a depiction of an illustrative network for analyzing a series of gestures, in accordance with some embodiments of this disclosure.

FIG. 11 (a designation that is used to include at least the subject matter of FIGS. 11A and 11B) is a depiction of an illustrative process, network, and model for recording and analyzing a series of gestures, in accordance with some embodiments of this disclosure. In some embodiments, the process of FIG. 11 is performed at the verification server (e.g., verification server 1102, as shown); in other embodiments, the process of FIG. 11 is performed in whole or in part at the user device (e.g., XR goggles 1104). For example, the verification server 1102 may provide instructions to XR goggles 1104, such that the XR goggles may request a series of gestures, as shown, and/or the XR goggles may configure the gesture recognition model 1114 (e.g., after the gesture recognition model has been trained by the verification server and provided to the XR goggles). In some embodiments, verification server 1102 may correspond to verification server 118, and XR goggles 1104 may correspond to user device 104.

In some embodiments, the verification server 1102 requests a series of gestures from the XR goggles 1104 or another suitable user device. For example, the verification server 1102 may request a series of gestures to set a password for the user (e.g., to access a given application, such as is hosted by the 3D world server 114), or the verification server may request a series of gestures to enter a password (e.g., the previously set password). In response to each gesture being requested by the verification server 1102 (or, e.g., a secured application provided by the server), the XR goggles 1104 may request the corresponding gesture from the user and then record the user performing the gesture. In response to recording the gesture being performed, the verification server 1102 configures corresponding models (or corresponding sub-models or configurations of a broader model, e.g., as shown by network 1150). Configuring each of the corresponding models may include determining a set of weights (e.g., $P_1$, $P_2$, or $P_N$). These weights may be applied to a universal gesture recognition model 1114, which may be configured to recognize each respective gesture by only changing the set of weights that are applied to the model.

An illustrative example is as follows. Verification server 1102 requests a first gesture from a device at 1106. In response, XR goggles 1104 requests and records a first gesture from the user at 1108. In response, a user chooses to wave hands at 1110. XR goggles 1104 records the hand-waving data and transmits it to verification server 1102. In response, verification server 1102 configures a “wave hands” model 1112 and determines a corresponding set of weights, $P_1$ 1116, which are provided toward configuring gesture recognition model 1114. Because a series of gestures are needed, verification server 1102 proceeds to request a second gesture from the device 1118. In turn, XR goggles 1104 requests a second gesture from the user at 1120, and the user chooses to make a fist at 1122. nXR goggles 1104 records the fist-making data and transmits it to verification server 1102. In response, verification server 1102 configures a “make fist” model at 1124 and determines a corresponding set of weights, $P_2$ 1126, which are also provided toward configuring gesture recognition model 1114. The aforementioned processes are repeated until a suitable number of gestures has been provided. In the illustrative example of FIG. 11, N gestures are provided. For the $N^{th}$ gesture, XR goggles 1104 requests a last gesture from the device at 1128, and the device requests a last gesture from the user at 1130. The user chooses to provide a thumbs up at 1132, and XR goggles 1104 records the thumbs-up data and transmits it to verification server 1102. In response, verification server 1102 configures a “thumbs up” model at 1134 and determines a corresponding set of weights, $P_N$ 1136, which are provided such that the verification server 1102 has received sufficient data to configure gesture recognition model 1114.

In some embodiments, the gesture recognition model 1114 is configured with a single architecture (e.g., a supervised learning deep neural network (DNN), a convolutional neural network (CNN), a recurrent neural network (RNN), a linear regression, logistic regression, decision tree, support vector machine (SVM) algorithm, Bayes algorithm, k-nearest neighbor (KNN) algorithm, K-means algorithm, random forest algorithm, or any other statistical or AI/ML (e.g., supervised or unsupervised) architecture) including a plurality of adjustable weights. For example, the weights may control relationships between layers of the architecture (e.g., input layer to output layer, input layer to hidden layer, hidden layer to hidden layer, hidden layer to output layer, or any combination thereof), such that each respective plurality of adjustable weights may be configured for a specific recognition task. For example, when the plurality of weights $P_1$ are applied to the gesture recognition model 1114, the model is configured to recognize the hand-waving gesture; when the plurality of weights $P_2$ are applied to the gesture recognition model, the model is configured to recognize the fist-making gesture; and when the plurality of weights $P_N$ are applied to the gesture recognition model, the model is configured to recognize the thumbs-up gesture. In this manner, discrete model architectures are not required for each gesture of the series of gestures, and the resulting size of gesture recognition model 1114 may be feasible to load onto XR goggles 1104 (or other suitable local devices) and/or recognize gestures with only a short (e.g., on the order of milliseconds, or less than a few seconds) processing delay. In some embodiments, in addition to providing a plurality of weights, each configuration $P_i$ may provide settings for another adjustable parameter of the gesture recognition model (e.g., an activation function, a number of layers, a configuration of gates, a direction through which information propagates, any other suitable adjustable parameter, or any combination thereof).

In some embodiments, the XR goggles 1104 may record each gesture using a haptic sensor, controller, camera and computer vision algorithm for tracking spatiotemporal movement, any other suitable sensor or peripheral, or any combination thereof.

In some embodiments, illustrative network 1150 (e.g., which may correspond to gesture recognition model 1114) depicts how sensor data 1151 (e.g., which may correspond to SensorData 150) may be translated into a verification decision 1152 (e.g., which may correspond to "verify user based on SensorData" 152) based on the abovementioned plurality of weights. Sensor data 1151 may be provided to a plurality of inputs (e.g., $I_1$ to $I_N$), where the inputs may represent spatiotemporal data, pixel data, biometric data, haptic data, any other suitable input from peripheral or sensor, or any combination thereof.

In some embodiments, the network 1150 may be configured with any suitable number of inputs (e.g., corresponding to a number of gestures, a resolution of one or sensors, a resolution needed to make an accurate verification decision, or any other suitable number of inputs). Each input is connected to a node of a first hidden layer (e.g., $H_1$ to $H_L$), where the strength of the input-to-hidden-node connection is based on the corresponding weighting. For example the weights $W_{11}$, $W_{12}$, and $W_{1L}$ respectively determine the strength of the connections between input 1 and hidden layer nodes 1, 2, and L.

In some embodiments, the network 1150 may be configured with any suitable number of hidden layer nodes and any suitable number of hidden layers (e.g., more than one hidden layer may exist, despite only one hidden layer being shown in FIG. 11). In some embodiments, when a weighting is relatively large, the value at an input node strongly influences the state of a corresponding hidden node, and when a weighting is relatively small, the value at an input node minimally influences the state of a corresponding hidden node. As shown, there may be a distinct weighting associated with every respective input-to-hidden-node connection.

In some embodiments, the network 1150 may be configured with any suitable number of outputs (e.g., $O_1$ to $O_M$) (e.g., corresponding to a number of gestures, a number of possible verification decisions, a confidence score associated with the decisions, any other suitable output, or any combination thereof). The relationship between hidden layer nodes and outputs is similar to the relationship between inputs and hidden layer nodes (e.g., the influence of a hidden node on an output is based on the corresponding weighting, and each hidden-node-to-output connection may have a distinct weighting). As shown, the results generated at each output are coupled to the verification decision 1152, such that network 1150 determines an outcome to a verification challenge based on the results generated at one or more of the outputs.

In some embodiments, as mentioned, the weights of network 1150 may be specifically configured for a given task of the network (e.g., recognizing a single gesture). For example, the network may be trained on a first gesture, a matrix corresponding to the weights needed to evaluate that first gesture may be stored in memory, and this process may be repeated for any number of gestures to yield a corresponding number of matrices. Then, a trained model implementing network 1150 (e.g., trained model 154 or 704, or gesture recognition model 1114) may be configured to verify a series of gestures by successively implementing (e.g., for each gesture) each set of weights (e.g., as encoded in each matrix) stored in memory.

In some embodiments, though not explicitly shown in FIG. 11, additional parameters of network 1150 may be adjusted to further configure the network for determining a respective gesture recognition. For example, a number of hidden layers may be adjusted based on the given gesture to recognize. For another example, an activation function or a gate configuration (e.g., as is associated with one or more hidden layer nodes) may be adjusted based on the given gesture to recognize. For another example, a direction of information propagation (e.g., feedback loops between layers, or feedforward loops that skip particular layers) may be adjusted based on the given gesture to recognize.

Figure 12:
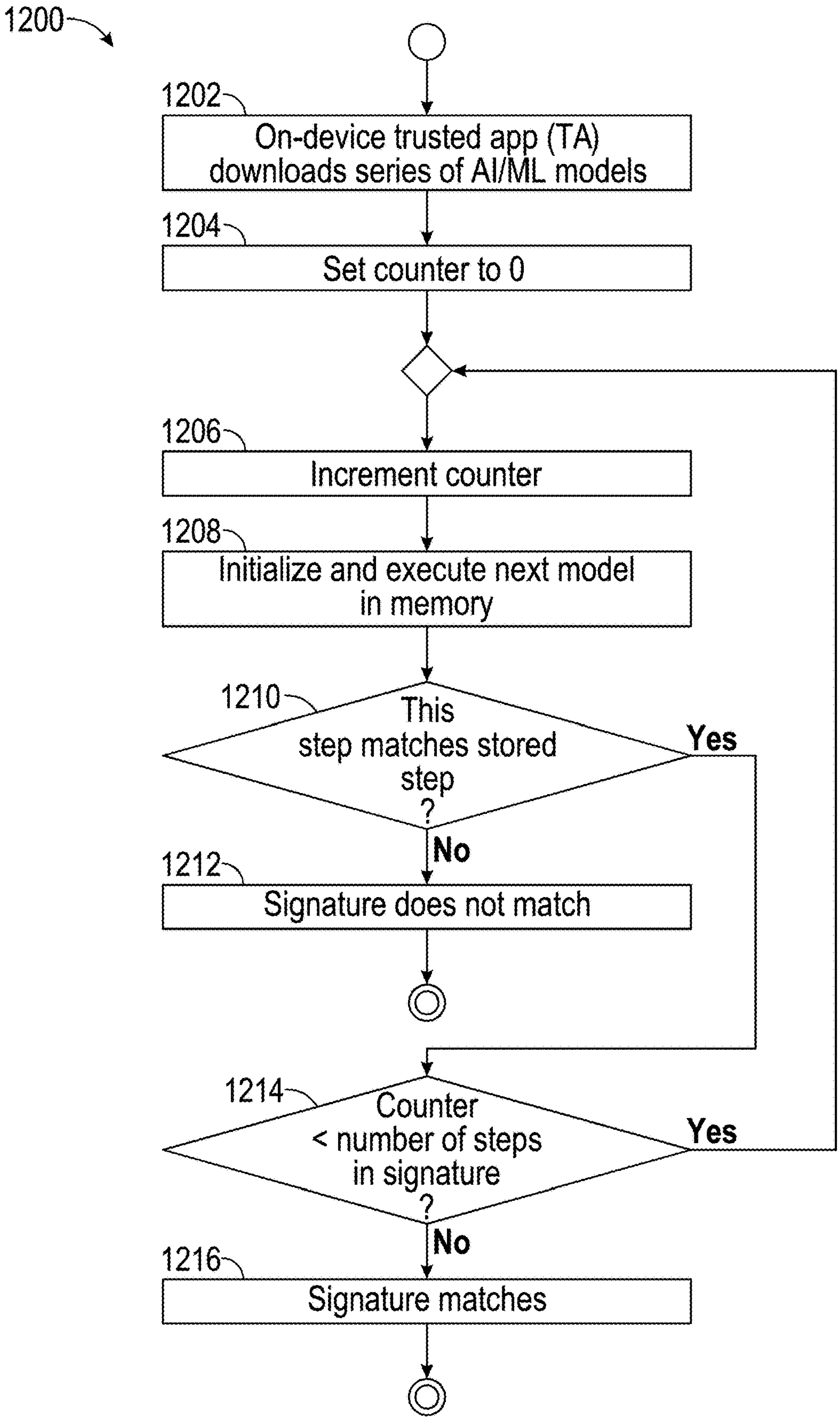
FIG. 12 is a flowchart of an illustrative process for evaluating a series of gestures, in accordance with some embodiments of this disclosure.

FIG. 12 is a flowchart of an illustrative process for evaluating a series of gestures, in accordance with some embodiments of this disclosure. In this illustrative process 1200, the verification server (e.g., verification server 118 or verification server 1102) provides a series of AI/ML models to a user device (e.g., user device 104 or XR goggles 1104). At 1202, the user device downloads the series of AI/ML models to a trusted app (TA) (e.g., device secured app 108, TEE 802 or 902, or trusted app (TEE) 1006). In some embodiments, the series of AI/ML models share a common architecture (e.g., as depicted in network 1150) and each model of the series of models only differs according to a plurality of weights or other adjustable parameter of the model. At 1204, the trusted app sets a counter to 0 to initialize the signature (e.g., gesture) recognition process. At 1206, the trusted app increments the counter (e.g., to '1') and at 1208 the trusted app initializes and executes the corresponding model (e.g., AI/ML model 1) in memory. At 1210, the trusted app determines whether the current step (e.g., the gesture being evaluated by the executing model) matches the stored step (e.g., a reference gesture that is stored in memory). In some embodiments, the stored step corresponds to a signature (e.g., password) that was provided by a user of the trusted app before the execution or process 1200. At 1212, if the signature at 1210 does not match, then the process 1200 is completed and the user is not verified. For example, based on the signature not matching, the trusted app determines that the user is not a human, or the user is not who they say they are. However, at 1214, if the signature at 1210 does match, the trusted app checks whether the counter is less than the number of steps (e.g., gestures) in the signature (e.g., it checks whether all gestures of the signature have been evaluated). If the counter is less than the number of steps in the signature, then process 1200 returns to 1206 and loads the next gesture of the series of gestures. However, if the counter is not less than the number of steps in the signature, then the trusted application determines at 1216 that the signature provided by the user matches the signature stored in memory. In some embodiments, the signature matching at 1216 corresponds to determining that a verification challenge (e.g., a CAPTCHA or an MFA) has been successfully completed.

Figure 13:
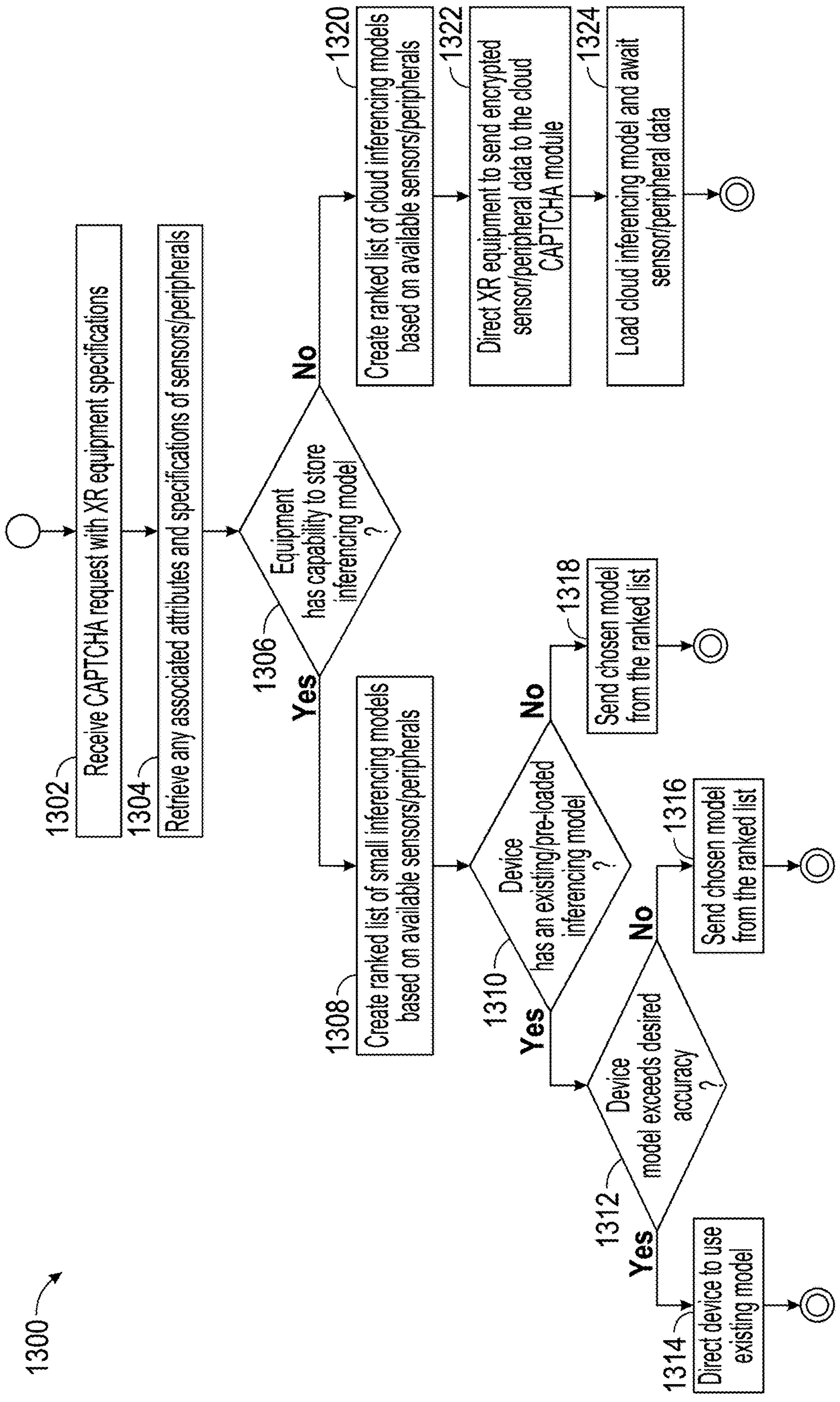
FIG. 13 is a flowchart of an illustrative process for determining a verification model, in accordance with some embodiments of this disclosure.

FIG. 13 is a flowchart of an illustrative process for determining and providing a verification model, in accordance with some embodiments of this disclosure. For example, process 1300 may be executed by the verification server (e.g., verification server 118 or challenge API 1010) and may occur at 132 or at 1032. In some embodiments, at 1302, the verification server receives a CAPTCHA (or other verification challenge) request, where the request includes XR equipment specifications (e.g., characterizing user device 102 and/or sensors of the user device). At 1304, the verification server accesses a database, look-up table, or other suitable memory that includes attributes and specifications associated with the sensors and/or device peripherals. For example, these attributes and specifications may correlate an XR device (e.g., based on a make, model, serial number, software version, other suitable device data, or any combination thereof) to a set of one or more sensors/peripherals on the XR device. The attributes and specifications may also include particular details of the sensors/peripherals (e.g., a resolution, range of possible signals, sensitivity to inputs, other suitable details, or any combination thereof). In some embodiments, a particular verification challenge may be determined based on these attributes and specifications.

In some embodiments, at 1306, the verification server determines whether the equipment (e.g., user device 102) has the capability to store an inferencing model (e.g., the trained models 128, 154, 704, the gesture recognition model 1114, the network 1150, the AI/ML model of FIG. 12, any other suitable inferencing model, or any combination thereof). Based on whether the equipment has the capability to store the inferencing model, the verification server may determine whether the verification challenge will be executed on the device (e.g., if the device can store the model) or at the verification server or another remote processor (e.g., if the device cannot store the model).

In some embodiments, the device can store the inferencing model, and at 1308, the verification server creates a ranked list of small (e.g., with a size that is suitable to be loaded onto the device) inferencing models based on the available sensors/peripherals. For example, the ranked list may be ordered in terms of a model size, an expected verification success rate, or a combination thereof, where the expected verification success rate is calculated according to a particular verification challenge that may be executed by one or more of the available sensors/peripherals. At 1310, the verification server determines whether the device has an existing or pre-loaded inferencing model (e.g., because the device has previously executed the processes of FIG. 1 or 10, or a related process). If the device has an existing/pre-loaded inferencing model, at 1312, the verification server determines whether the model meets the desired accuracy. If the model meets the desired accuracy, then the verification server at 1314 directs the device to use the existing model. However, if the verification server determines at 1312 that the model does not meet the desired accuracy, then the verification server sends the device a new model chosen from the ranked list at 1316. For example, the verification server may send the top model of the ranked list, such that a user (e.g., a human user or a user who is who they say they are) of the device has a maximum probability of successfully completing the verification challenge. Returning to 1310, if the verification server determines that the device does not have an existing/pre-loaded inferencing model, then at 1318, the verification server sends the device a new model chosen from the ranked list. In some embodiments, the action at 1318 may correspond to the action at 1316.

In some embodiments, the device cannot store the inferencing model, and at 1320, the verification server creates a ranked list of cloud inferencing models at 1320 based on the available sensors/peripherals at the device. After creating the ranked list (which, e.g., may be ranked in order of probability of successfully completing the verification challenge), the verification server at 1322 directs the XR equipment to send encrypted sensor/peripheral data to the cloud CAPTCHA module (or other cloud verification module). For example, the action at 1322 may correspond to the sharing encrypted sensor data at 148 or the processing, encryption, and sharing steps at 1052, 1054, and 1056. After directing the XR equipment to send the encrypted data, the verification server loads the cloud inferencing model and awaits sensor/peripheral data at 1324. For example, the verification server may load trained model 154 or 704, or gesture recognition model 1114 (e.g., including network 1150), and then input the sensor/peripheral data to the model after it has been received.

Figure 14:
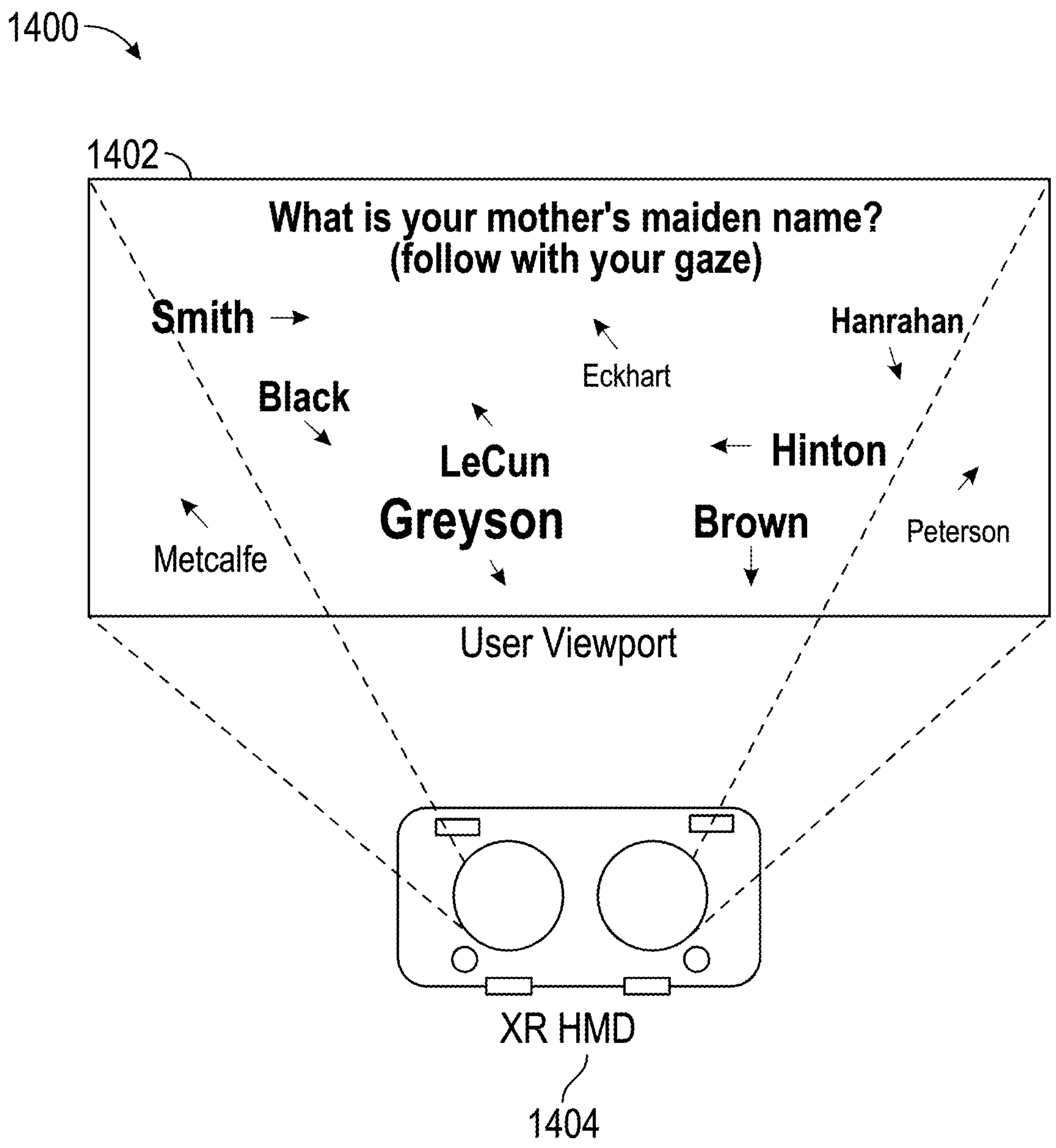
FIG. 14 is an illustrative example of a verification model for enhanced security in an environment with a high density of people, in accordance with some embodiments of this disclosure.

FIG. 14 is an illustrative example of a verification model for enhanced security in environments with a high density of people, in accordance with some embodiments of this disclosure. In some embodiments, the verification server determines to issue the verification challenge 1402 in response to a current condition or current environment of the user. For example, in a crowded area, to protect against someone peeping the user's screen and stealing confidential information therefrom, a secure verification challenge for crowded spaces may be shown, in accordance with verification challenge 1402 or other suitable verification challenges that are secured against visual peeping of information. In other embodiments, a different verification challenge may be chosen without departing from the spirit of FIG. 14 (e.g., the challenge selection is based on the user's current environment). For example, the verification server may determine an amount of space that is available to a user, and correspondingly select a verification challenge that requires less space. For another example, the verification server may determine a lighting of an environment of the user, and correspondingly select a verification challenge with a high probability of success based on the given lighting condition.

In some embodiments, FIG. 14 shows XR HMD 1404 (which may, e.g., correspond to user device 102) displaying verification challenge 1402. When completing verification challenge 1402, the user analyzes the prompt and provides a preconfigured answer such that the user may verify that they are who they say they are. For example, in verification challenge 1402, the user (e.g., user 104) would look at the correct answer and then shift their eyes in the direction indicated by the arrow most proximal to the correct answer. As a result, a peeping individual would not be able to discern the correct answer and thereby compromise the security of the data used in the verification challenge.

Figure 15:
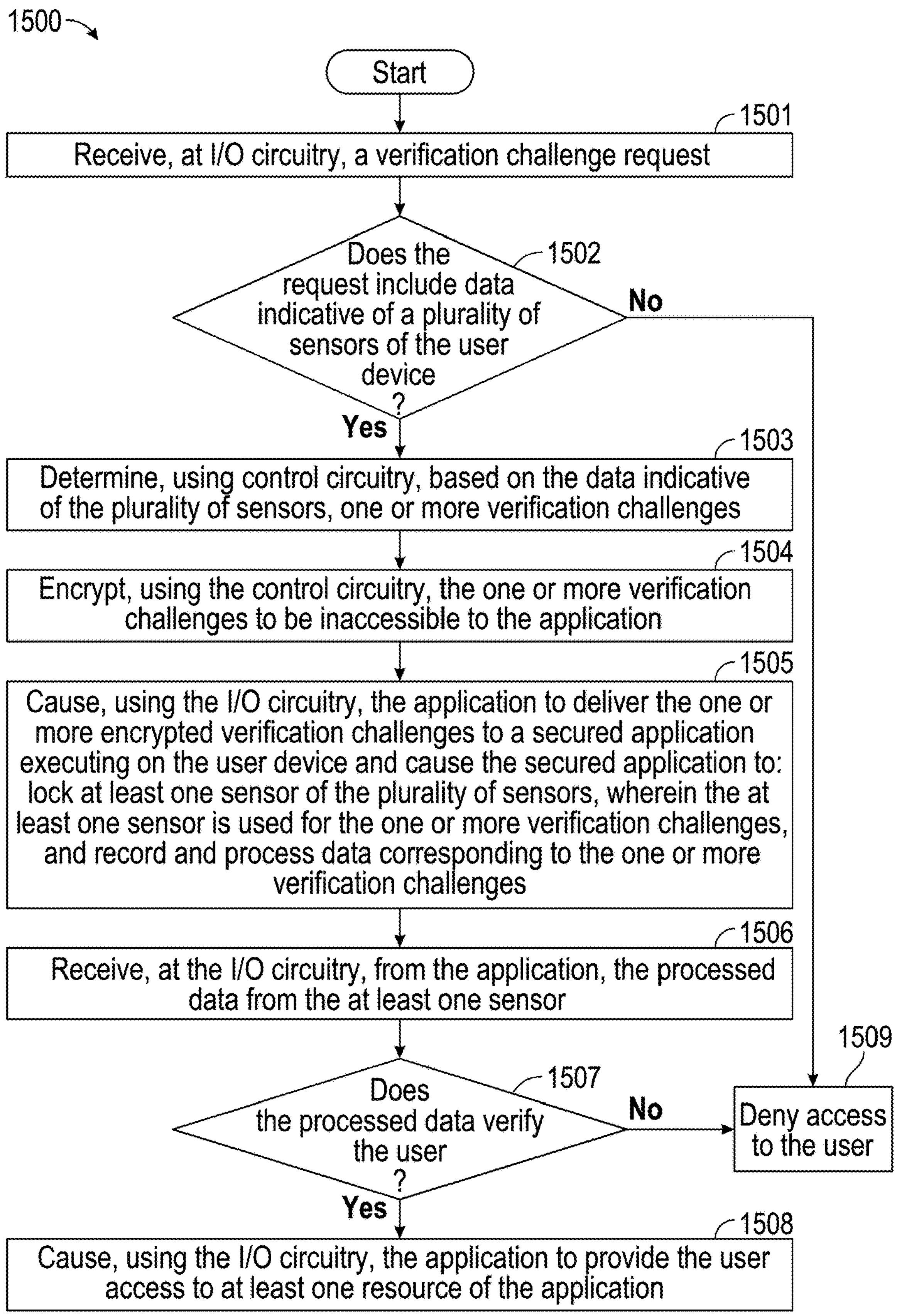
FIG. 15 is a flowchart of an illustrative process for verifying access to a 3D space, in accordance with some embodiments of this disclosure.

FIG. 15 is a flowchart of an illustrative process for verifying access to a 3D space, in accordance with some embodiments of this disclosure. In some embodiments, process 1500 is executed at a verification server (e.g., verification server 118), an application server (e.g., 3D world server 114), or at a device (e.g., user device 104, particularly a secured app, e.g., device secured app 108, operating thereon). In some embodiments, the verification challenge of process 1500 may include one or more MFA challenge, one or more CAPTCHA challenge, or a combination thereof. When the verification challenge includes an MFA challenge, the process 1500 may correspond to an initial operation (e.g., setting a password), a later operation (e.g., providing the previously set password), or both. In some embodiments, process 1500 may be executed in connection with at least the processes shown in FIG. 1 and/or FIG. 10. In some embodiments, I/O circuitry, as described in connection with process 1500, may refer to I/O path 222. In some embodiments, control circuitry, as described in connection with process 1500, may refer to any one or more of control circuitry 211 (e.g., of verification server 118) or control circuitry of user equipment 206, 207, 208, 210, 219, or 220 (e.g., which may correspond to user device 104).

At 1501, the input/output (I/O) circuitry of the verification server receives a verification challenge request (e.g., from a user device or a server of an application). For example, the user device may initiate the verification challenge request in response to the user turning on the device, opening an application of the device, choosing to log into an application, accessing a specific resource of the application, engaging a particular hardware of the application, performing any other suitable operation, or any combination thereof.

At 1502, control circuitry of the verification server determines whether the request includes data indicative of a plurality of sensors of the user device. If it is determined that the request does not include data indicative of a plurality of sensors of the user device, then at 1509, control circuitry of the verification server denies access to the user. For example, the verification server may deny access to the user based on determining, because there is no data indicative of a plurality of sensors on the user device, that the challenge request is unauthorized.

At 1503, if it is determined that the request does include data indicative of a plurality of sensors of the user device the verification server, then control circuitry of the verification server determines, based on the data indicative of the plurality of sensors, one or more verification challenges. For example, as mentioned above (e.g., at least in connection with FIGS. 1 and 7), the verification server may load a plurality of verification challenges and data indicative of the plurality of sensors into a trained model, and the trained model may provide a suitable verification challenge based on the inputs (e.g., where a suitable challenge uses one or more sensors of the user device, has a sufficiently high probability of success, is reflective of an environment from which the user device sent the request, is sufficiently small, meets any other suitability factor, or any combination thereof).

At 1504, control circuitry of the verification server encrypts the one or more verification challenges to be inaccessible to the application (e.g., 3D world app 106). Due to the encryption, information about the verification challenge may not be available to the application or any other undesired applications (e.g., spyware loaded by a malicious entity).

At 1505, I/O circuitry of the verification server, based on instructions from control circuitry of the verification server, causes the application to deliver the one or more encrypted verification challenges to a secured application (e.g., device secured app 108) executing on the user device and causes the secured application to lock at least one sensor of the plurality of sensors, wherein the at least one sensor is used for the one or more verification challenges, and causes the secured application to record and process data corresponding to the one or more verification challenges. Due to locking the sensor, data provided for the verification challenge may not be available to the application or any other applications (e.g., operating in an REE) besides the secured application (or other TAs or expressly permitted applications, e.g., operating in a TEE).

At 1506, I/O circuitry of the verification server receives, from the application, the processed data from the at least one sensor. At 1507, control circuitry of the verification server determines whether the processed data verifies the user. If the processed data does not verify the user, then control circuitry of the verification server denies access to the user at 1509. If the processed data does verify the user, then I/O circuitry of the verification server, based on instructions from control circuitry of the verification server, causes the application to provide the user access to at least one resource of the application at 1508. For example, at 1508, a user may be welcomed into a 3D environment (e.g., 3D world app 106, simulation 3D space 412, or secure 3D space 608).

Figure 16:
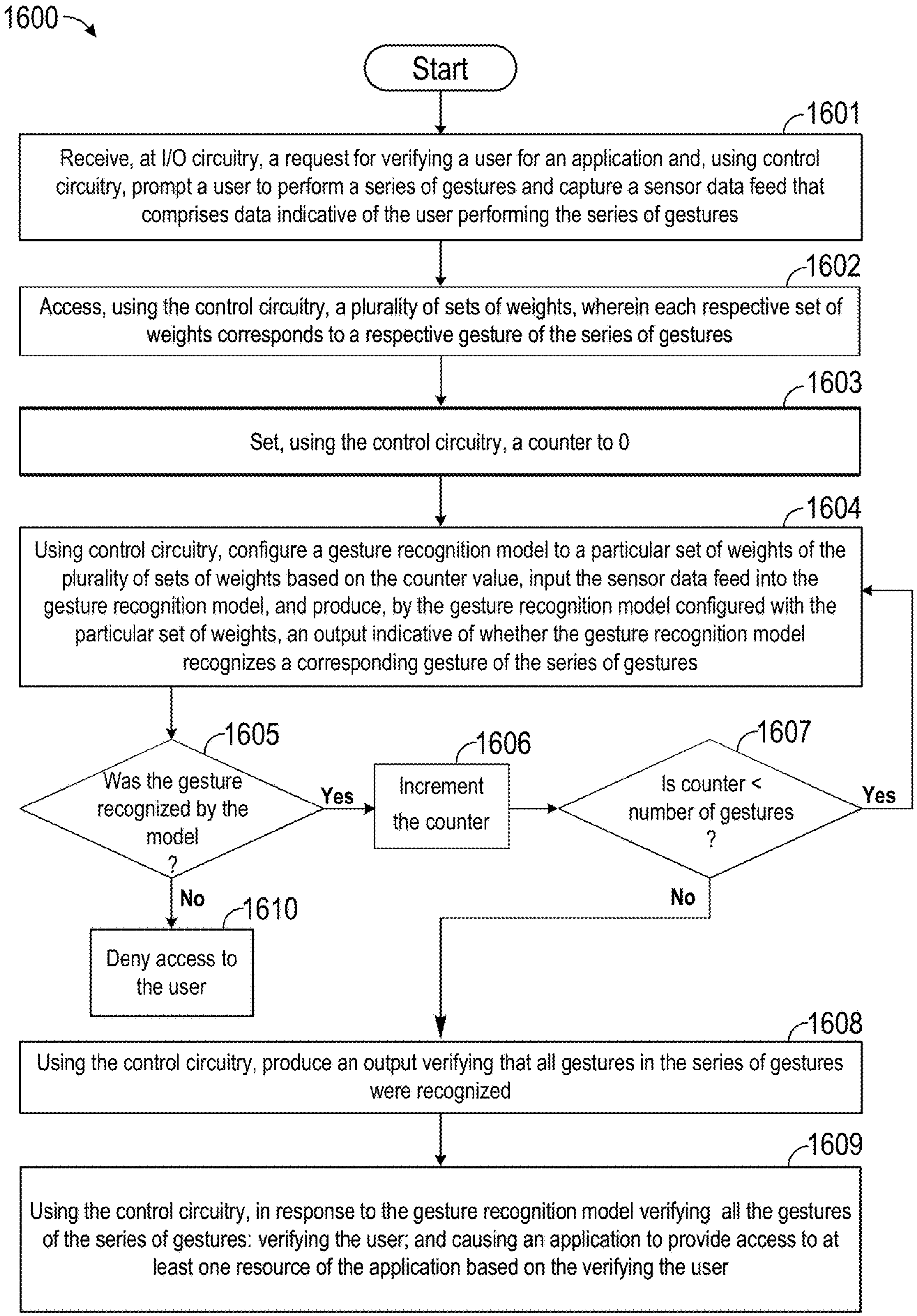
FIG. 16 is a flowchart of an illustrative process for providing a trained sequential signature recognition model, in accordance with some embodiments of this disclosure.

FIG. 16 is a flowchart of an illustrative process for providing a trained sequential signature recognition model (e.g., trained model 154 or 704, or gesture recognition model 1114), in accordance with some embodiments of this disclosure. In some embodiments, process 1600 is executed at a verification server (e.g., verification server 118), at an application server (e.g., 3D world server 114), at a device (e.g., user device 104, particularly a secured app, e.g., device secured app 108, operating thereon), or at any combination thereof. In some embodiments, the series of gestures of process 1600 may correspond to one or more MFA challenge, one or more CAPTCHA challenge, one or more "Is this person who they say they are?" challenge, or any combination thereof. When the verification challenge includes an "Is this person who they say they are?" challenge, the process 1600 may correspond to an initial operation (e.g., setting a password), a later operation (e.g., providing the previously set password), or both. In some embodiments, process 1600 may include or correspond to the illustrative process and network shown and described in connection with FIG. 11. In some embodiments, process 1600 may be executed in connection with at least the processes shown in FIG. 1 and/or FIG. 10. In some embodiments, I/O circuitry, as described in connection with process 1600, may refer to I/O path 222. In some embodiments, control circuitry, as described in connection with process 1600, may refer to any one or more of control circuitry 211 (e.g., of verification server 118) or control circuitry of user equipment 206, 207, 208, 210, 219 or 220 (e.g., which may correspond to user device 104).

At 1601, input/output (I/O) circuitry of the device receives a request for verifying a user for an application (e.g., on behalf of the application) and control circuitry of the device prompts a user to perform a series of gestures and captures a sensor data feed that includes the user performing the series of gestures. As used herein, the gestures may include any movement, action, response, signal, or other behavior that is captured in response to the prompt, using one or more sensor of the device (e.g., a controller, haptic sensor, optical sensor equipped with computer vision, any other suitable sensor, or any combination thereof).

At 1602, control circuitry of the device accesses a plurality of sets of weights, wherein each respective set of weights corresponds to a respective gesture of the series of gestures. In some embodiments, the control circuitry accesses a plurality of sets of values corresponding to a different adjustable parameter and adjusts the different adjustable parameter in place of or in addition to adjusting the plurality of sets of weights for recognizing each gesture of the series of gestures. In some embodiments, the plurality of weights (and/or the other adjustable parameter) may configure the gesture recognition model for a plurality of states, each state of the plurality of states including a corresponding set of weights for recognizing a respective gesture of the series of gestures, wherein the corresponding set of weights affects how the gesture recognition model processes the sensor data feed into an output indicative of whether the gesture recognition model recognizes the gesture. At 1603, control circuitry of the device sets a counter to 0 (e.g., the control circuitry initializes the device for recognition of the first gesture).

At 1604, control circuitry of the device configures the gesture recognition model to a particular set of weights of the plurality of sets of weights based on the counter value. For example, in the first iteration of process 1600, the control circuitry configures the model for a particular set of weights that is suitable to recognize the first gesture of the series of gestures. In addition, control circuitry of the device inputs the sensor data feed into the gesture recognition model and produces, by control circuitry executing the gesture recognition model configured with the particular set of weights, an output indicative of whether the gesture recognition model recognizes a gesture, corresponding to the counter value, of the series of gestures. In some embodiments, control circuitry of the device uses the model to provide a binary indicator, with or without an associated confidence score, of whether the input gesture corresponding to the counter value matches the corresponding gesture that the model is configured to recognize. In some embodiments, in an initial iteration of process 1600, configuring the gesture recognition model includes loading a pre-trained gesture recognition model. In some embodiments, configuring the gesture recognition model includes determining which particular set of weights (and/or which other adjustable parameter of the model), among the plurality of set of weights, is suitable to recognize a particular gesture of the series of gestures.

At 1605, control circuitry of the device inspects whether the output indicated that the gesture was recognized by the model. If the gesture was not recognized by the model, then at 1610, control circuitry of the device denies access to the user (e.g., access to the application is denied). If the gesture was recognized by the model, then at 1606 control circuitry of the device increments the counter.

At 1607, control circuitry of the device determines whether the counter is less than the number of gestures. If the counter is less than the number of gestures, then control circuitry of the device returns to 1604, reconfigures the gesture recognition model with a next set of weights of the plurality of set of weights (e.g., the weights corresponding to a gesture based on the counter value), and repeats the abovementioned processes at 1604, 1605, 1606, and 1607. If the counter is not less than the number of gestures, then at 1608 control circuitry of the device produces an output verifying that all gestures of the series of gestures were verified. At 1609, in response to the gesture recognition model recognizing all the respective gestures of the series of gestures, control circuitry of the device verifies the user and causes an application to provide access to at least one resource of the application based on the verifying the user.

In some embodiments, the operations at 1602, 1603, 1604, 1605, 1606, and 1607 may correspond to the operation at 1507 of determining whether the processed data verifies the user.

In some embodiments, method 1600 also includes training the gesture recognition model. For example, training the gesture recognition model may include providing training data including labelled gestures provided by humans and labelled gestured provided by non-human entities (e.g., bots or other malicious entities) and simulating human behavior. Thus, the gesture recognition model may be configured to discern between authentic human-generated data and synthetic non-human-generated data.

Figure 17:
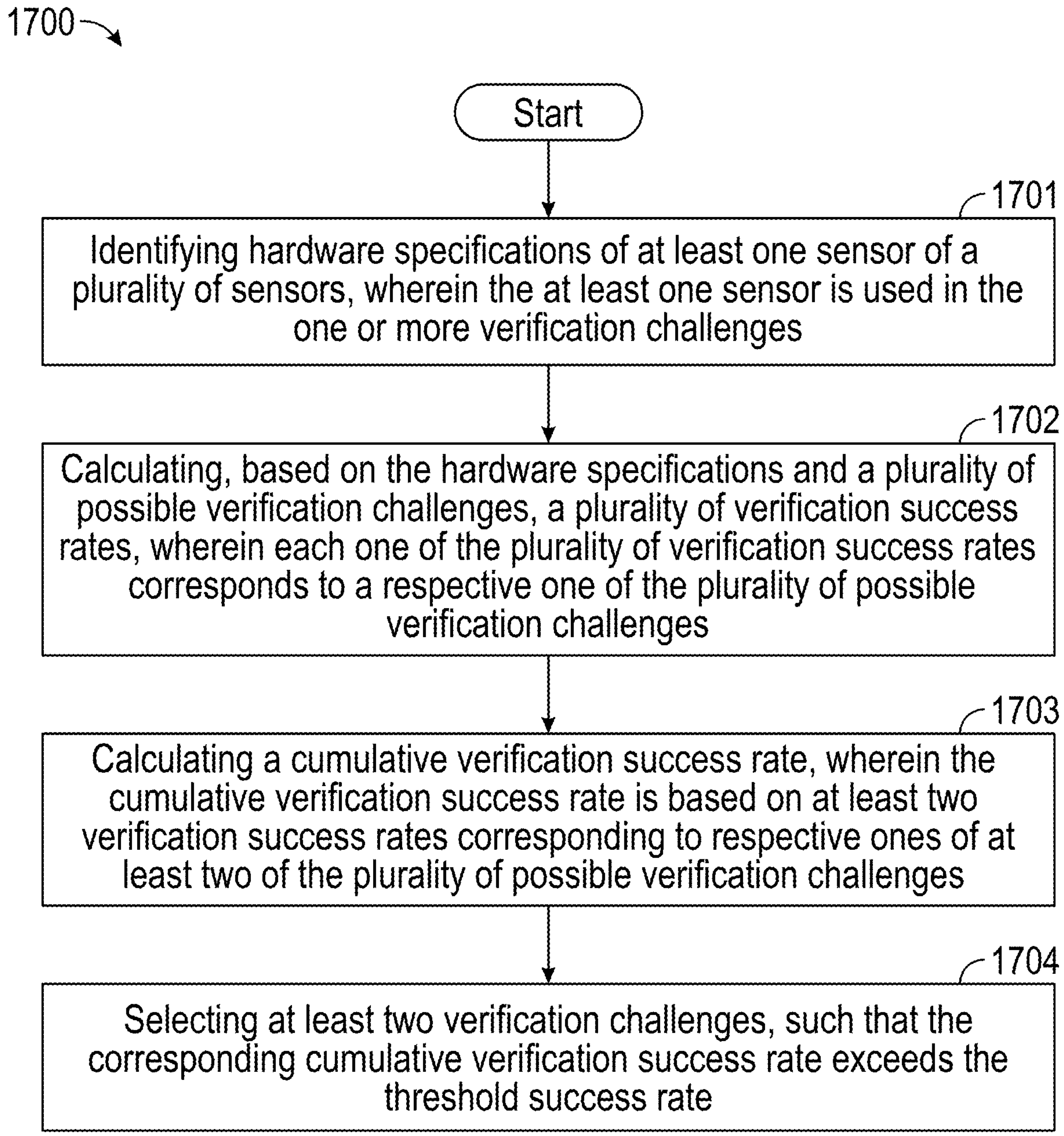
FIG. 17 is a flowchart of an illustrative process for selecting verification challenges, in accordance with some embodiments of this disclosure.

FIG. 17 is a flowchart of an illustrative process for selecting verification challenges, in accordance with some embodiments of this disclosure. In some embodiments, process 1700 may correspond to the operation at 1503 of determining, based on the data indicative of the plurality of sensors, one or more verification challenges. In some embodiments, process 1700 is executed at control circuitry of a verification server (e.g., verification server 118), an application server (e.g., 3D world server 114), a device (e.g., user device 104, particularly a secured app, e.g., device secured app 108, operating thereon), or any combination thereof. In some embodiments, process 1700 may be executed in connection with at least the processes shown in FIG. 1 and/or FIG. 10. In some embodiments, control circuitry, as described in connection with process 1500, may refer to any one or more of control circuitry 211 (e.g., of verification server 118) or control circuitry of user equipment 206, 207, 208, 210, 219, or 220 (e.g., which may correspond to user device 104).

At 1701, the verification sever identifies hardware specifications of at least one sensor of a plurality of sensors (e.g., the plurality of sensors indicated at 1502), wherein the at least one sensor is used in the one or more verification challenges. At 1702, the verification server calculates, based on the hardware specifications and a plurality of possible verification challenges, a plurality of verification success rates, wherein each one of the plurality of verification success rates corresponds to a respective one of the plurality of possible verification challenges. For example, the verification server may execute this calculation based on a mapping of possible verification challenges (e.g., on a vertical axis) versus available sensors (e.g., on a horizontal axis) where cells of the mapping correspond to success or confidence rates (e.g., based on outcomes derived during training of a model, e.g., trained model 128 or 704, at the verification server).

At 1703, the verification server calculates a cumulative verification success rate, wherein the cumulative verification success rate may be based on at least two verification success rates corresponding to respective ones of at least two of the plurality of possible verification challenges. In some embodiments, the cumulative verification success rate may be equal to the net probability of successfully completing each of the at least two verification challenges (e.g., if each of two challenges has a 90% success rate, the cumulative verification success rate may be 81%, or equivalently 90%×90%) (e.g., wherein a successful verification includes successful completion of both verification challenges). In some embodiments, the cumulative verification success rate may be equal to one minus the net probability of failing each of the at least two verification challenges (e.g., if each of two challenges has a 10% failure rate, the cumulative verification success rate may be 99%, or equivalently 1−10%×10%)

(e.g., wherein a successful verification includes successful completion of any one of the verification challenges).

At 1704, the verification server selects at least two verification challenges, such that the corresponding cumulative verification success rate exceeds the threshold success rate. Based on a relevant success criterion (e.g., to successfully complete all the challenges, at least one of the challenges, or any threshold number of challenges), the verification server can optimize between ease-of-use for a verifiable user and difficulty-of-successful-completion for an unverifiable user in view of many possible verification challenges using any number of the multiple sensors of the user device.

Figure 18:
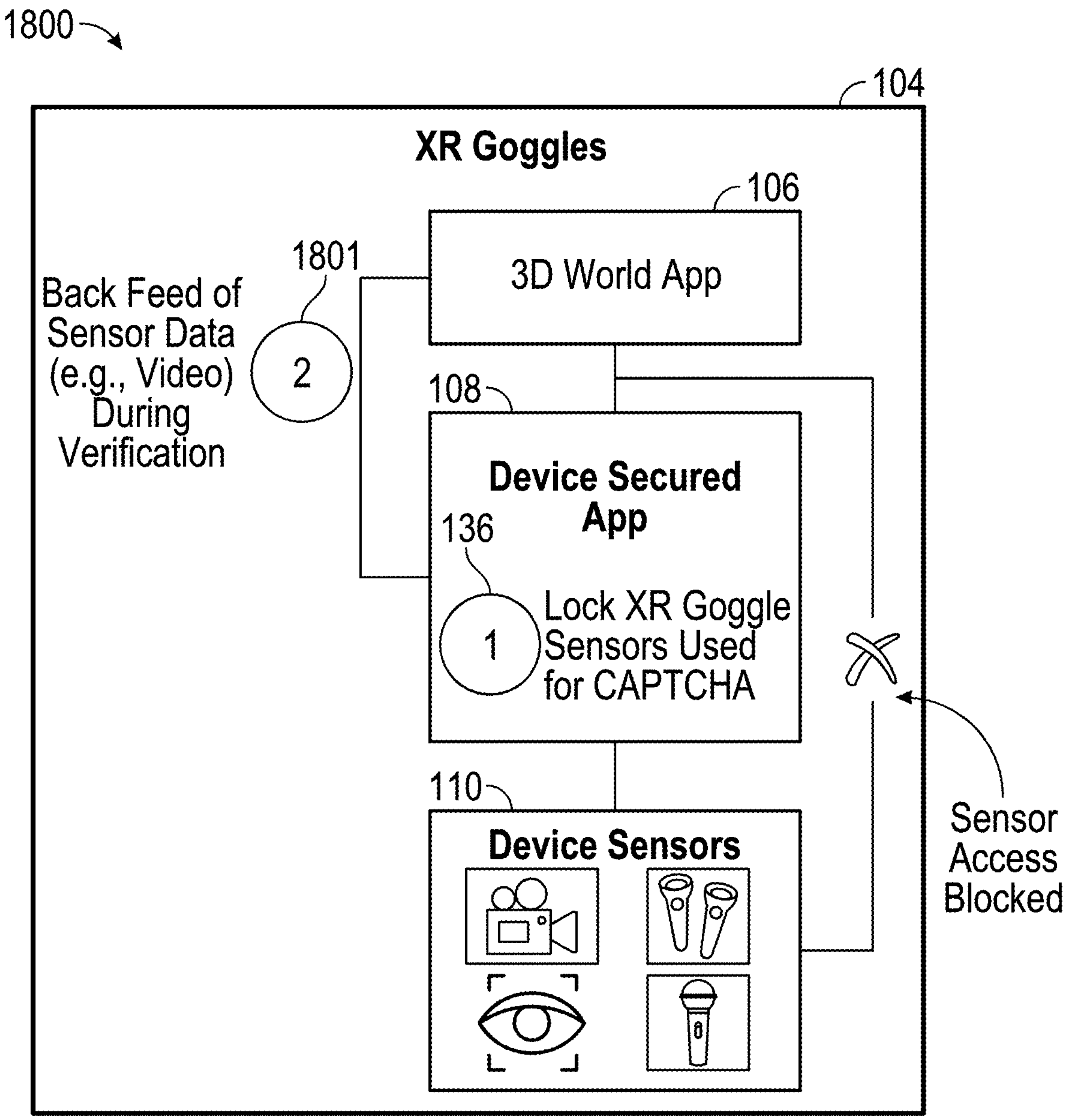
FIG. 18 is an illustrative example of sharing locked sensor data, in accordance with some embodiments of this disclosure.

FIG. 18 is an illustrative example of sharing locked sensor data, in accordance with some embodiments of this disclosure. In some embodiments, the configuration of FIG. 18 may occur at 1505 (e.g., while recording data corresponding to the one or more verification challenges) or at 1601 (e.g., while capturing a sensor data feed that comprises the user performing the series of gestures). FIG. 18 recalls the architecture of FIG. 1, namely user device 104, 3D world app 106, device secured app 108, and device sensors 110. After the device secured app 108 locks the device sensors 110 of the user device 104 (e.g., as shown by the "X" breaking the connection between device sensors and 3D world app, and the corresponding annotation "sensor accessed blocked"), the device secured app may create a back feed of sensor data 1801 (e.g., where the data may be raw or processed data) that is shared with the 3D world app. For example, the back feed may share the video data or other data (e.g., recorded from device sensors 110) with the 3D world app 106, where sharing the data includes sharing data that is used for completion of a verification challenge. For example, sharing the data may specifically include copying the data to a shared or "read-only" memory area (e.g., where the application may read data but not write, delete, edit, or otherwise modify data). In some embodiments, based on the back feed of sensor data 1801, the user can track their actions on a display of user device 104 (or any other suitable user device/equipment) while they are providing an input to a verification challenge (e.g., for visual feedback of haptic, trajectory, gaze-tracking, or controller-based responses).

It is noted that the processes described herein (e.g., including but not limited to the processes of FIGS. 1, 11-13, and 15-17) may be executed at a verification server, a user device, an application server, any other suitable server, any other suitable device, or any combination thereof. Insofar as certain processes, actions, operations, steps, or related activities are described herein as occurring at a verification server, at a device, or at another suitable entity, these descriptions are merely illustrative and do not limit embodiments of the present disclosure from being performed on other devices, servers, or combinations thereof, without departing from the scope of the present disclosure.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving a request for verifying a user for an application;

prompting the user to perform a series of gestures;

capturing a sensor data stream that comprises data indicative of the user performing the series of gestures;

accessing a plurality of sets of weights, wherein each respective set of weights corresponds to a respective gesture of the series of gestures;

(a) configuring a gesture recognition model with a first set of weights of the plurality of sets of weights;

(b) inputting the sensor data stream into the gesture recognition model;

(c) producing, by the gesture recognition model configured with the first set of weights, an output indicative of whether the gesture recognition model recognizes a first gesture of the series of gestures;

(d) in response to the gesture recognition model producing an output indicative of the first gesture being recognized:

configuring the gesture recognition model with a next set of weights of the plurality of sets of weights; and repeating steps (a)-(d), for the gesture recognition model modified with the next set of weights, until the gesture recognition model produces outputs verifying that all gestures of the series of gestures were recognized;

in response to the gesture recognition model producing an output verifying that all the gestures of the series of gestures were recognized:

verifying the user; and causing the application to provide access to at least one resource of the application based on the verifying the user.

2. The method of claim 1, wherein receiving the request for verifying the user for the application comprises receiving a request comprising data indicative of a plurality of sensors of the user device, wherein prompting the user to perform the series of gestures is based on the data indicative of the plurality of sensors of the user device.

3. The method of claim 2, wherein weights of the plurality of sets of weights are based on the data indicative of the plurality of sensors of the user device.

4. The method of claim 2, wherein prompting the user to perform the series of gestures comprises causing a secured application executing on the user device to lock at least one sensor of the plurality of sensors on the user device, wherein:

the at least one sensor is used for providing the series of gestures; and while it is locked by the secured application, the at least one sensor is inaccessible to the application.

5. The method of claim 4, wherein capturing the sensor data stream that comprises data indicative of the user performing the series of gestures comprises causing the secured application to:

record the sensor data stream from the at least one locked sensor; and store the recorded sensor data stream such that the stored data is inaccessible to the application.

6. The method of claim 5, further comprising:

receiving, at the application, an encrypted version of the gesture recognition model, the encrypted version of the gesture recognition model comprising an encrypted version of the plurality of sets of weights; and providing, using the application, the encrypted version of the gesture recognition model to the secured application, such that the secured application executes the gesture recognition model.

7. The method of claim 6, further comprising:

generating, at the secured application, a symmetric key, wherein the symmetric key is inaccessible to the application; and encrypting and decrypting the encrypted version of the gesture recognition model and the encrypted version of the plurality of sets of weights using the symmetric key.

8. The method of claim 4, further comprising sharing, using the secured application, the sensor data stream on the application, while the application cannot access the at least one sensor, such that the data from the at least one sensor is made available to the user via the application.

9. The method of claim 1, wherein configuring the gesture recognition model with the first set of weights of the plurality of sets of weights further comprises configuring at least one other adjustable parameter, the at least one other adjustable parameter selected from a group of parameters including an activation function, a number of layers, a configuration of gates, and a direction through which information propagates, wherein configuring the gesture recognition model with the next set of weights further comprises adjusting the at least one other adjustable parameter.

10. The method of claim 1, further comprising determining success probabilities associated with recognizing each respective gesture, wherein in response to not recognizing at least one gesture of the series of gestures, the method further comprises:

determining a confidence score associated with the sensor data stream based on the success probabilities associated with each recognized gesture; and in response to the confidence score exceeding a threshold value, verifying the user and causing an application to provide access to at least one resource of the application based on the verifying the user.

11. The method of claim 1, further comprising training the gesture recognition model to determine whether the series of gestures are generated by a human or by a software program designed to mimic human inputs, based on providing training data comprising representative data generated by humans and representative data generated by software programs designed to mimic human inputs.

12. A system comprising:

input/output circuitry configured to receive a request for verifying a user for an application and prompt the user to perform a series of gestures; and control circuitry configured to:

capture a sensor data stream that comprises data indicative of the user performing the series of gestures;

access a plurality of sets of weights, wherein each respective set of weights corresponds to a respective gesture of the series of gestures;

(a) configure a gesture recognition model with a first set of weights of the plurality of sets of weights;

(b) input the sensor data stream into the gesture recognition model;

(c) produce, by the gesture recognition model configured with the first set of weights, an output indicative of whether the gesture recognition model recognizes a first gesture of the series of gestures;

(d) in response to the gesture recognition model producing an output indicative of the first gesture being recognized:

configure the gesture recognition model with a next set of weights of the plurality of sets of weights; and repeat steps (a)-(d), for the gesture recognition model modified with the next set of weights, until the gesture recognition model produces outputs verifying that all gestures of the series of gestures were recognized;

in response to the gesture recognition model produce an output verifying that all the gestures of the series of gestures were recognized:

verify the user; and cause the application to provide access to at least one resource of the application based on the verifying the user.

13. The system of claim 12, wherein the input/output circuitry is further configured:

to receive the request for verifying the user for the application by receiving a request comprising data indicative of a plurality of sensors of the user device, such that prompting the user to perform the series of gestures is based on the data indicative of the plurality of sensors of the user device.

14. The system of claim 13, wherein the control circuitry is further configured such that weights of the plurality of sets of weights are based on the data indicative of the plurality of sensors of the user device.

15. The system of claim 13, wherein the input/output circuitry is further configured such that prompting the user to perform the series of gestures comprises causing a secured application executing on the user device to lock at least one sensor of the plurality of sensors on the user device, wherein:

the at least one sensor is used for providing the series of gestures; and while it is locked by the secured application, the at least one sensor is inaccessible to the application.

16. The system of claim 15, wherein the control circuitry is further configured such that capturing the sensor data stream that comprises data indicative of the user performing the series of gestures comprises causing the secured application to:

record the sensor data stream from the at least one locked sensor; and store the recorded sensor data stream such that the stored data is inaccessible to the application.

17. The system of claim 16, wherein the control circuitry is further configured such that:

receiving, at the application, an encrypted version of the gesture recognition model, the encrypted version of the gesture recognition model comprising an encrypted version of the plurality of sets of weights; and providing, using the application, the encrypted version of the gesture recognition model to the secured application, such that the secured application executes the gesture recognition model.

18. The system of claim 12, wherein the control circuitry is further configured to determine success probabilities associated with recognizing each respective gesture, wherein in response to not recognizing at least one gesture of the series of gestures, the control circuitry is further configured to:

determine a confidence score associated with the sensor data stream based on the success probabilities associated with each recognized gesture; and in response to the confidence score exceeding a threshold value, verify the user and cause an application to provide access to at least one resource of the application based on the verifying the user.

19. The system of claim 12, wherein the control circuitry is further configured to train the gesture recognition model to determine whether the series of gestures are generated by a human or by a software program designed to mimic human inputs, based on providing training data comprising representative data generated by humans and representative data generated by software programs designed to mimic human inputs.

* * * * *